(12) United States Patent
Kirsch et al.

(10) Patent No.: US 10,738,240 B2
(45) Date of Patent: Aug. 11, 2020

(54) THIADIAZOLOQUINOXALINE DERIVATIVES

(71) Applicant: Merck Patent GmbH, Darmstadt (DE)

(72) Inventors: Peer Kirsch, Seeheim-Jugenheim (DE); Andreas Ruhl, Rossdorf (DE); Susann Gunst, Darmstadt (DE); Michael Junge, Pfungstadt (DE); Ursula Patwal, Reinheim (DE); Mila Fischer, Muehltal (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/571,645

(22) PCT Filed: Apr. 13, 2016

(86) PCT No.: PCT/EP2016/000609
§ 371 (c)(1),
(2) Date: Nov. 3, 2017

(87) PCT Pub. No.: WO2016/177449
PCT Pub. Date: Nov. 10, 2016

(65) Prior Publication Data
US 2018/0142153 A1    May 24, 2018

(30) Foreign Application Priority Data
May 6, 2015    (DE) .................. 10 2015 005 800

(51) Int. Cl.
*C09K 19/34* (2006.01)
*C09K 19/40* (2006.01)
(Continued)

(52) U.S. Cl.
CPC .......... *C09K 19/3497* (2013.01); *C09K 19/40* (2013.01); *C09K 19/52* (2013.01);
(Continued)

(58) Field of Classification Search
CPC ...................................................... C09K 19/34
See application file for complete search history.

(56) References Cited

U.S. PATENT DOCUMENTS

2009/0308380 A1* 12/2009 Palmer .................. H01L 27/301
126/704
2014/0303379 A1  10/2014 Santarelli
(Continued)

FOREIGN PATENT DOCUMENTS

CN    103936967 A  *  7/2014
CN    103936967 A      7/2014
(Continued)

OTHER PUBLICATIONS

Lee Y et al: "Synthesis and photovoltaic properties of low-bandgap alternating copolymers consisting of 3-hexylthiophene and [1,2,5] thiadiazolo[3,4—g]quinoxaline derivatives", Organic Electronics, Elsevier, Amsterdam, NL, vol. 11, No. 5, May 1, 2010 ;(May 1, 2010), pp. 846-853, (Year: 2010).*
(Continued)

*Primary Examiner* — Chanceity N Robinson
(74) *Attorney, Agent, or Firm* — Millen White Zelano and Branigan, PC

(57) ABSTRACT

The present invention relates to thiadiazoloquinoxaline derivatives of the formula I,
(Continued)

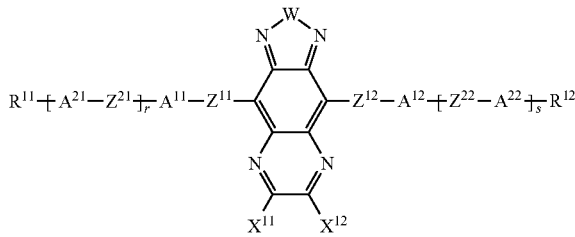

in which $R^{11}$, $R^{12}$, $A^{11}$, $A^{12}$, $A^{21}$, $A^{22}$, $Z^{11}$, $Z^{12}$, $Z^{21}$, $Z^{22}$, W, $X^{11}$, $X^{12}$, r and s have the meanings indicated in Claim 1, to processes and intermediates for the preparation thereof, to the use of the compounds of the formula I for optical, electro-optical and electronic purposes, in particular in liquid-crystal media and in devices for regulating the passage of energy from an outside space into an inside space, and to these LC media and the devices comprising these media.

13 Claims, 1 Drawing Sheet

(51) Int. Cl.
G02F 1/1347 (2006.01)
C09K 19/60 (2006.01)
C09K 19/52 (2006.01)

(52) U.S. Cl.
CPC .......... C09K 19/60 (2013.01); G02F 1/13475 (2013.01); C09K 2219/13 (2013.01)

(56) References Cited

U.S. PATENT DOCUMENTS

2016/0085108 A1  3/2016  Junge
2016/0108317 A1  4/2016  Kirsch
2016/0257885 A1  9/2016  Junge

FOREIGN PATENT DOCUMENTS

| WO | 2013005177 A1 | 1/2013 | |
| WO | 2014180525 A1 | 11/2014 | |
| WO | 2014187529 A1 | 11/2014 | |
| WO | WO-2014180525 A1 * | 11/2014 | ......... G02F 1/13475 |
| WO | 2015055274 A1 | 4/2015 | |

OTHER PUBLICATIONS

Stefan Ellinger et al: "Donor-Acceptor-Donor-based [pi]-Conjugated Oligomers for Nonlinear Optics and Near-IR Emission", Chemistry of Materials, vol. 23, No. 17, Sep. 13, 2011 (Sep. 13, 2011), US, pp. 3805-3817, XP055283410, ISSN: 0897-4756.
Elif Kose Unver et al: "Synthesis of new donor-acceptor polymers containing thiadiazoloquinoxaline and pyrazinoquinoxaline moieties: low-band gap, high optical contrast, and almost black colored materials", Tetrahedron Letters, vol. 52, No. 21, May 1, 2011 (May 1, 2011), GB, pp. 2725-2729, XP055283402, ISSN: 0040-4039.
Vellaiappillai Tamilavan et al: "Thiadiazoloquinoxaline-Based Narrow Energy Gap Molecules for Small Molecule Solar Cell Applications", Bulletin of the Korean Chemical Society, vol. 34, No. 2, Feb. 20, 2013 (Feb. 20, 2013), KR, pp. 661-664, XP055281977, ISSN: 0253-2964.
Lee Y et al: "Synthesis and photovoltaic properties of low-bandgap alternating copolymers consisting of 3-hexylthiophene and [1,2,5]thiadiazolo[3,4-g]quinoxaline derivatives", Organic Electronics, Elsevier, Amsterdam, NL, vol. 11, No. 5, May 1, 2010 (May 1, 2010), pp. 846-853, XP026999935, ISSN: 1566-1199.
English machine translation of CN103936967A published Jul. 23, 2014 to Zhou Ming-jie of Oceans King Lighting Science.
International Search Report PCT/EP2016/000609 dated Jul. 4, 2016.

* cited by examiner

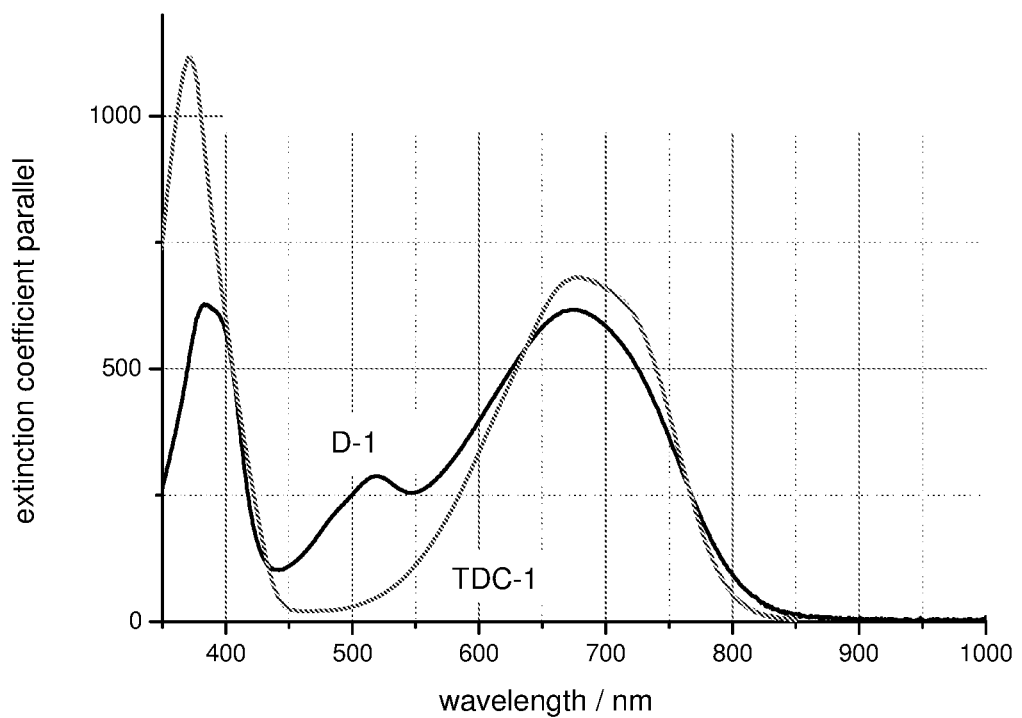

THIADIAZOLOQUINOXALINE DERIVATIVES

The present invention relates to thiadiazoloquinoxaline derivatives, to processes and intermediates for the preparation thereof, to the use thereof for optical, electro-optical and electronic purposes, in particular in liquid-crystal (LC) media and in devices for regulating the passage of energy from an outside space into an inside space, and to these LC media and the devices containing these media.

Liquid crystals are used in particular as dielectrics in display devices, since the optical properties of such substances can be influenced by an applied voltage. Electro-optical devices based on liquid crystals are extremely well known to the person skilled in the art and can be based on various effects. Devices of this type are, for example, cells having dynamic scattering, DAP (deformation of aligned phases) cells, TN cells having a twisted nematic structure, STN ("supertwisted nematic") cells, SBE ("superbirefringence effect") cells, OMI ("optical mode interference") cells and guest-host cells.

The last-mentioned devices based on the guest-host effect were described for the first time by Heilmeier and Zanoni (G. H. Heilmeier et al., Appl. Phys. Lett., 1968, 13, 91f) and have since then found widespread use, principally in LC display elements. In a guest-host system, the LC medium comprises one or more dichroic dyes in addition to the liquid crystal. Owing to the directional dependence of the absorption by the dye molecules, the transparency of the liquid crystal to light can be modulated if the dyes change their alignment together with the liquid crystal.

Besides use in LC displays, devices of this type are known as switching elements for regulating the passage of light or energy, for example from WO 2009/141295 and WO 2010/118422; a device for regulating the passage of energy is in the present application taken to mean a device which regulates the passage of energy through an area which is arranged within a structure of relatively lower energy transmissivity. For example, the area of relatively high energy transmissivity can be a glass area or an open area, and the structure of lower energy transmissivity which contains the area of higher energy transmissivity can be a wall.

The device preferably regulates the passage of energy from insolation, either directly or indirectly.

The regulated passage of energy takes place from an outside space, preferably the environment exposed directly to insolation, into an inside space, for example a building or a vehicle, or another unit which is substantially sealed off from the environment.

For the purposes of the present invention, the term energy is taken to mean, in particular, energy by electromagnetic radiation in the UV-A, VIS and NIR region. In particular, it is taken to mean energy by radiation which is not absorbed or is only absorbed to a negligible extent by the materials usually used in windows (for example glass). According to the definitions usually used, the UV-A region is taken to mean a wavelength of 320 to 380 nm, the VIS region is taken to mean a wavelength of 380 nm to 780 nm and the NIR region is taken to mean a wavelength of 780 nm to 2000 nm. Correspondingly, the term light is generally taken to mean electromagnetic radiation having wavelengths between 320 and 2000 nm.

For the purposes of the present invention, a dichroic dye is taken to mean a light-absorbing compound in which the absorption properties are dependent on the alignment of the compound with the direction of polarisation of the light. A dichroic dye compound in accordance with the present invention typically has an elongate shape, i.e. the compound is significantly longer in one spatial direction (longitudinal axis) than in the other two spatial directions.

In the area of devices for regulating the passage of energy from an outside space into an inside space, a number of different technical solutions have been proposed in past years.

An advantageous solution is the use of switching layers comprising a liquid-crystalline medium in combination with one or more dichroic dyes. By application of a voltage, a change in the spatial alignment of the molecules of the dichroic compound can be achieved in these switching layers, causing a change in the transmission of the switching layer owing to their direction-dependent absorption. A corresponding device is described, for example, in WO 2009/141295.

Alternatively, such a change in transmission can also be achieved without electrical voltage by a temperature-induced transition from an isotropic state of the liquid-crystalline medium to a liquid-crystalline state, as described, for example, in US 2010/0259698.

The prior art discloses liquid-crystal media for display elements of the guest-host type which comprise cyanobiphenyl derivatives and one or more dichroic dyes (WO 2009/141295 and WO 2010/118422). For the same application, U.S. Pat. Nos. 6,033,598 and 5,762,824 describe LC media which, besides one or more dichroic dyes, comprise one or more compounds each consisting of three ring elements which are substituted by one or more fluorine atoms.

It is furthermore known to design devices containing a switching layer comprising a liquid-crystalline medium comprising at least one dichroic dye in such a way that the energy absorbed by the dye is partly re-emitted as fluorescence radiation, which is itself directed to a solar cell which converts it into electrical energy (WO 2009/141295).

Furthermore, thiadiazoloquinoxaline derivatives are already generally known for various uses, for example in *J. Mater. Chem. C,* 2014, 2, 5133-5141 for use as constituent in polymers for organic semiconductors, in *Chem. Mater.* 2012, 24, 2178-2185 for use as OLED materials. In *Bull. Korean Chem. Soc.* 2013, 34(2), 661-664, the following compound is described as electron donor in the active layer of organic solar cells:

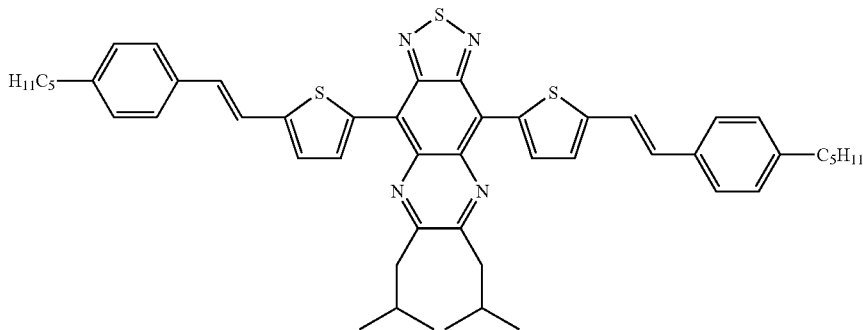

Rylene dyes have been described for use in the above-mentioned devices, for example in WO 2009/141295, WO 2013/004677 and WO2014/090373. However, rylene dyes generally have some disadvantages, in particular they often have low solubility in LC media, result in low low-temperature stability of the liquid-crystal mixture and often exhibit low colour purity, which, in particular, makes use in windows more difficult, where, for architectonic reasons, the aesthetic impression is important and the purest colours possible are desired.

The invention is based on the object of providing novel dichroic dyes which do not exhibit the above-mentioned disadvantages, or only do so to a small extent, and in addition have at least one, preferably several of the following desired properties: good solubility of the dyes in the liquid-crystalline medium, good light and temperature stability and high anisotropy of the absorption, i.e. a high capacity of the dye to align with the liquid crystal. In addition, the dyes should have strong light absorption in the VIS and/or NIR region of light. Furthermore, the invention was based on the object of providing compounds which not only have a favourable combination of the applicational parameters, but also, in addition, are distinguished by particularly high colour purity.

Surprisingly, it has been found that one or more of the requirements mentioned above are satisfied by compounds of the formula I.

The present invention thus relates to compounds of the formula I,

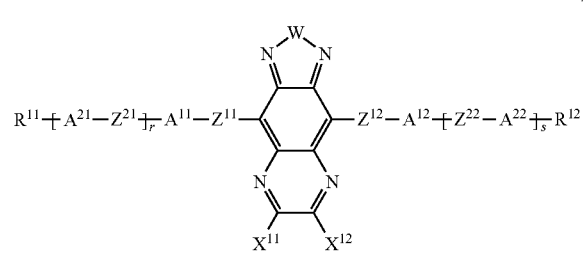

I in which
W denotes S or Se,
$X^{11}$, $X^{12}$, identically or differently, denote H, alkyl having 1-6 C atoms, in which one or more H atoms may be replaced by F and one or more $CH_2$ groups may be replaced by —O— or —S— in such a way that no O or S atoms are adjacent, perfluoroalkyl having 1-6 C atoms, halogen, CN, $SF_5$, an aryl or heteroaryl group, which may be substituted by one or more radicals L, and alternatively the groups $X^{11}$ and $X^{12}$ together also denote a straight-chain or branched alkylene group having 2 to 10 C atoms, in which one, several or all H atoms may be replaced by F,
$R^{11}$, $R^{12}$, identically or differently, denote F, straight-chain or branched alkyl having 1 to 25 C atoms, in which, in addition, one or more non-adjacent $CH_2$ groups may be replaced, independently of one another, by —C($R^z$)=C($R^z$)—, —C≡C—, —N($R^z$)—, —O—, —S—, —CO—, —CO—O—, —O—CO— or —O—CO—O— in such a way that O and/or S atoms are not linked directly to one another, and in which, in addition, one or more H atoms may be replaced by F, Cl, Br, I or CN,
$R^z$ on each occurrence, identically or differently, denotes H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO— or —O—CO—O— in such a way that O and/or S atoms are not linked directly to one another, and in which, in addition, one or more H atoms may be replaced by F or Cl,
$A^{11}$, $A^{12}$ each, independently of one another, denote an aryl or heteroaryl group, which may be substituted by one or more radicals L,
$A^{21}$, $A^{22}$ are each, independently of one another, defined like $A^{11}$ or denote a cyclic alkyl group having 3 to 10 C atoms, in which 1 to 4 $CH_2$ groups may be replaced by O in such a way that no two O atoms are adjacent,
L on each occurrence, identically or differently, denotes OH, $CH_2OH$, F, Cl, Br, I, —CN, —$NO_2$, $SF_5$, —NCO, —NCS, —OCN, —SCN, —C(=O)N($R^z$)$_2$, —C(=O)$Y^1$, —C(=O)$R^z$, —N($R^z$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl,
$Z^{11}$, $Z^{12}$ on each occurrence, identically or differently, denote a single bond, —$CR^{x1}$=$CR^{x2}$—, —C≡C— or —C(O)—,
$Z^{21}$, $Z^{22}$ are on each occurrence, identically or differently, defined like $Z^{11}$ or denote —O—, —S—, —$CR^{y1}R^{y2}$, —$CF_2O$—, —$OCF_2$—, —C(O)—O—, —O—C(O)—, —O—C(O)—O—, —$OCH_2$—, —$CH_2O$—, —$SCH_2$—, —$CH_2S$—, —$CF_2S$—, —$SCF_2$—, —($CH_2$)$_{n1}$—, —$CF_2CH_2$—, —$CH_2CF_2$—, —($CF_2$)$_{n1}$—, —CH=CH—COO— or —OCO—CH=CH—, $R^{x1}$, $R^{x2}$, independently of one another, denote H, F, Cl, CN or alkyl having 1-12 C atoms,
$R^{y1}$, $R^{y2}$ each, independently of one another, denote H or alkyl having 1-12 C atoms,
r, s, independently of one another, denote 0, 1, 2 or 3,
n1 denotes 1, 2, 3 or 4,
with the proviso that the compound of the formula

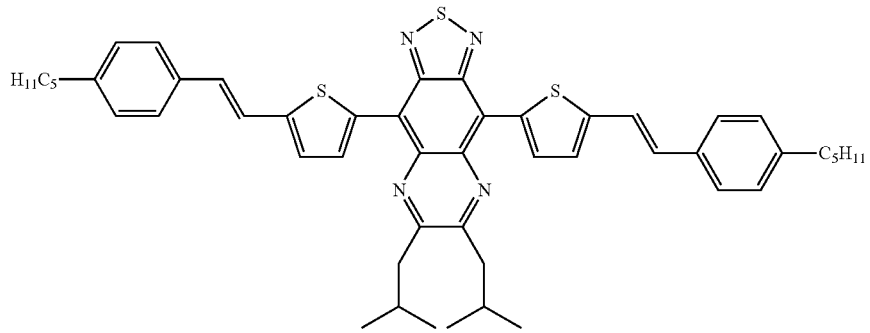

is excluded.

The invention furthermore relates to the use of dichroic dyes of the formula I and LC media as described above and below for optical, electro-optical and electronic purposes, in particular in devices for regulating the passage of energy from an outside space into an inside space.

The invention furthermore relates to an LC medium comprising
a dye component A) comprising one or more compounds of the formula I and optionally further dichroic dyes,
a liquid-crystalline component B), also referred to below as "LC host mixture", comprising one or more, preferably two or more mesogenic compounds.

Preference is given to LC media in which component B) is an LC compound or an LC mixture which has a nematic liquid-crystal phase.

The invention furthermore relates to processes and intermediates for the preparation of the compounds of the formula I.

The invention furthermore relates to devices for regulating the passage of energy from an outside space into an inside space.

Above and below, the following meanings apply:

The term "organic group" denotes a carbon or hydrocarbon group.

The term "carbon group" denotes a mono- or polyvalent organic group containing at least one carbon atom, where this either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having 3 or more atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN and in which one or more non-adjacent $CH_2$ groups may each be replaced, independently of one another, by —C($R^z$)=C($R^z$)—, —C≡C—, —N($R^z$)—, —O—, —S—, —CO—, —CO—O—, —O—CO—, —O—CO—O— in such a way that O and/or S atoms are not linked directly to one another.

$R^z$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO— or —O—CO—O— and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl and perfluorohexyl.

Preferred alkenyl groups are, for example, ethenyl, propenyl, butenyl, pentenyl, cyclopentenyl, hexenyl, cyclohexenyl, heptenyl, cycloheptenyl, octenyl and cyclooctenyl.

Preferred alkynyl groups are, for example, ethynyl, propynyl, butynyl, pentynyl, hexynyl and octynyl.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy and n-dodecoxy.

Preferred amino groups are, for example, dimethylamino, methylamino, methylphenylamino and phenylamino.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se. A ring system of this type may also contain individual non-conjugated units, as is the case, for example, in the fluorene basic structure.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are derived, for example, from the parent structures benzene, biphenyl, terphenyl, [1,1':3',1''] terphenyl, naphthalene, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b] thiophene, dithienothiophene, dihydrothieno [3,4-b]-1,4-dioxin, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are F, Cl, Br, I, —CN, —$NO_2$, —NCO, —NCS, —OCN, —SCN, —C(=O)N($R^z$)$_2$, —C(=O)$Y^1$, —C(=O)$R^z$, —N($R^z$)$_2$, in which $R^z$ has the meaning indicated above, and $Y^1$ denotes halogen, optionally substituted silyl or aryl having 6 to 40, preferably 6 to 20, C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^{y1}$, —$OR^{y1}$, —CO—$R^{y1}$, —O—CO—$R^{y1}$, —O—CO—$R^{y1}$ or —O—CO—$R^{y1}$, in which $R^{y1}$ has the meaning indicated above.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

A further preferred embodiment of the invention relates to compounds of the formula I in which $R^{11}$, $R^{12}$, $A^{11}$, $A^{12}$, $A^{21}$, $A^{22}$, $Z^{11}$, $Z^{12}$, $Z^{21}$, $Z^{22}$, W, $X^{11}$ and $X^{12}$ have the meanings indicated above for formula I, with the proviso that, if r and s are identical, at least one of the groups $A^{11}$ and $A^{12}$, or
$R^{11}$ and $R^{12}$, or
$A^{21}$ and $A^{22}$, or
$Z^{11}$ and $Z^{12}$, or
$Z^{21}$ and $Z^{22}$, or
$X^{11}$ and $X^{12}$ is different from one another, or that r denotes 0, 1 or 2 and s denotes r+1.

In a further preferred embodiment, W in formula I stands for —S—.

In a particularly preferred embodiment, $X^{11}$ and $X^{12}$ each stand, independently of one another, for H, $CH_3$, $C_2H_5$, F, Cl, $CF_3$, $OCF_3$, —CN or together 1,4-butylene, 1,3-hexafluoropropylidene or 1,4-octafluorobutylidene, very particularly preferably both stand for $CH_3$.

$Z^{11}$ and $Z^{12}$ preferably stand, independently of one another, for a single bond, —CH=CH—, —CF=CF— or —C≡C—, very particularly preferably for a single bond.

$Z^{21}$ and $Z^{22}$ preferably denote, independently of one another, a single bond, —$CH_2CH_2$—, —$CF_2CF_2$—, —CH=CH—, —CF=CF—, —C≡C—, —$OCH_2$—, —$CH_2O$—, —$OCF_2$— or —$CF_2O$—, particularly preferably —$OCF_2$—, —$CF_2O$— or a single bond, and very particularly preferably a single bond.

$A^{11}$, $A^{12}$, $A^{21}$, $A^{22}$ preferably on each occurrence, identically or differently, represent an aryl group having 6 to 15 C atoms or a heteroaryl group having 2 to 15 C atoms, which may be substituted by one or more radicals L. $A^{11}$, $A^{12}$, $A^{21}$, $A^{22}$ are particularly preferably selected on each occurrence, identically or differently, from groups, optionally substituted by radicals L, derived from the parent substances benzene, fluorene, naphthalene, pyridine, pyrimidine, thiophene, thiadiazole, dihydrothienodioxin, benzothiophene, dibenzothiophene, benzodithiophene, cyclopentadithiophene, thienothiophene, indenothiophene, furan, benzofuran, dibenzofuran and quinoline, very particularly preferably benzene, naphthalene, thiadiazole and thiophene.

Particularly preferred substituents L are, for example, F, Cl, CN, $CH_3$, $C_2H_5$, $OCH_3$, $CF_3$, $OCF_3$, $OCHF_2$, $OC_2F_5$, furthermore phenyl.

The groups $R^{11}$ and $R^{12}$ are preferably, independently of one another, F, a straight-chain alkyl or alkoxy group having 1 to 15 C atoms or a branched alkyl or alkoxy group having 3 to 20 C atoms, in which, in addition, one or more H atoms may be replaced by F. $R^{11}$ and $R^{12}$ very particularly preferably each, independently of one another, denote a straight-chain alkyl or alkoxy group having 1 to 10 C atoms or a branched alkyl or alkoxy group having 3 to 15 C atoms.

The groups $R^{x1}$ and $R^{x2}$ are preferably on each occurrence, identically or differently, H, F or an alkyl group having 1 to 6 C atoms. $R^{x1}$ and $R^{x2}$ are particularly preferably on each occurrence, identically or differently, H or F, very particularly preferably H.

The indices r and s are preferably, independently of one another, equal to 1, 2 or 3, particularly preferably equal to 1 or 2, very particularly preferably equal to 1.

Preferred embodiments of the formula I are the following formulae I-1, I-2 and I-3:

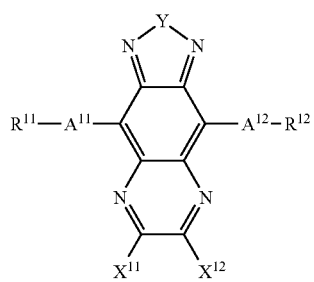

I-1

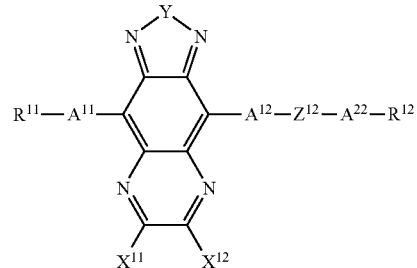

I-2

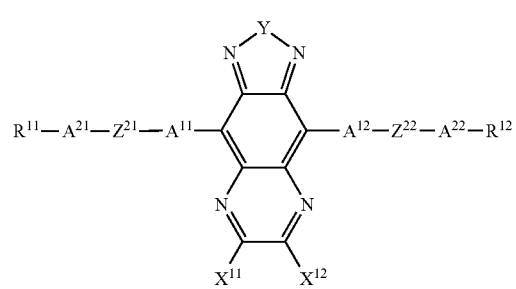

I-3 where the groups occurring have the meanings indicated above.

For the formulae I-1, I-2 and I-3, it is preferred that at least one $A^{11}$ or $A^{12}$ bonded directly to thiadiazoloquinoxaline stands for 1,4-phenylene, 2,6-naphthylene or a sulfur-containing heteroaryl group, particularly preferably for thiophene. The groups may be substituted by one or more radicals L.

Preferred embodiments of compounds of the formulae I-1, I-2 and I-3 are preferably selected from the compounds of the formulae I-1-1 to I-1-10, I-2-1 to I-2-12 and I-3-1 to I-3-10,

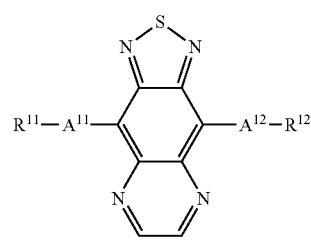

I-1-1

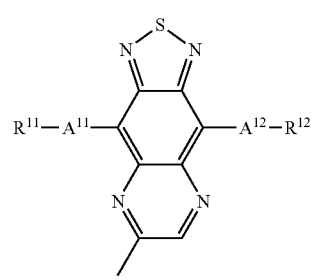

I-1-2

I-1-3 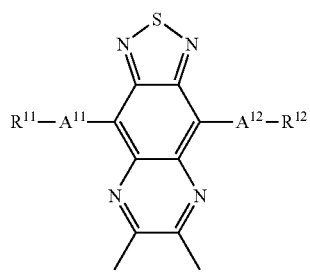
I-1-4 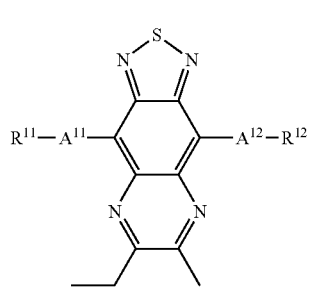
I-1-5 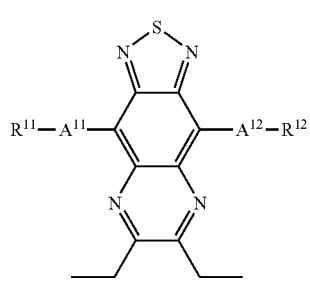
I-1-6 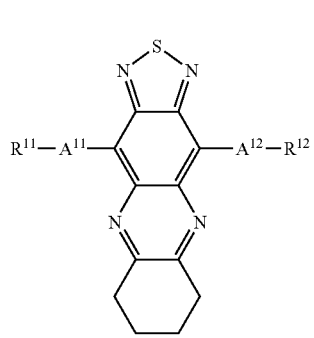
I-1-7 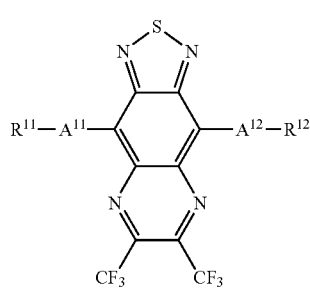
I-1-8 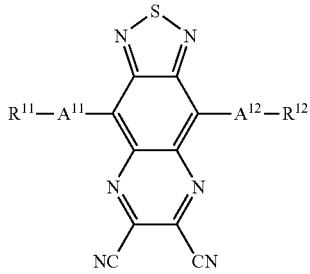
I-1-9 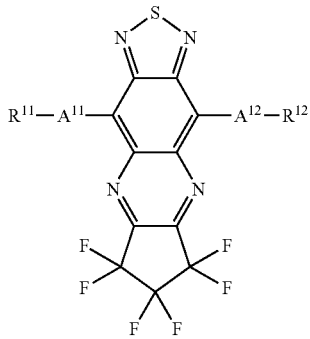
I-1-10 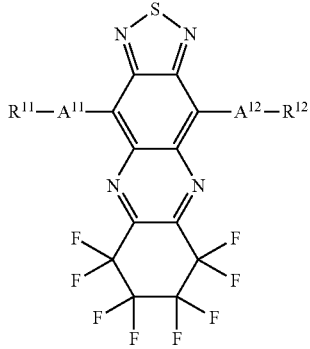
I-2-1 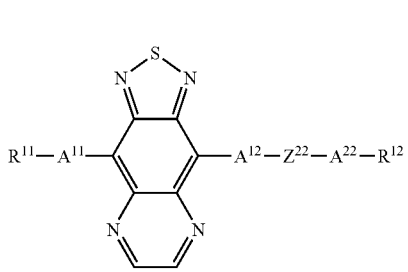
I-2-2 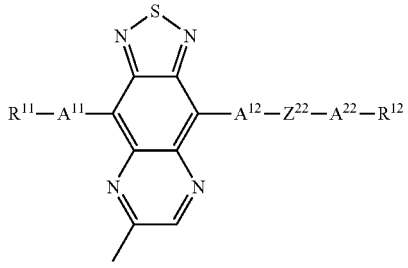

I-2-3 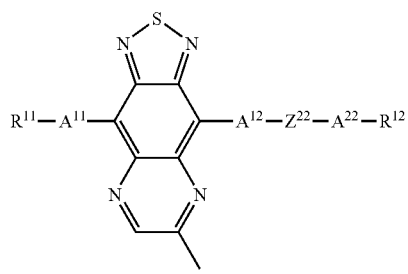
I-2-4 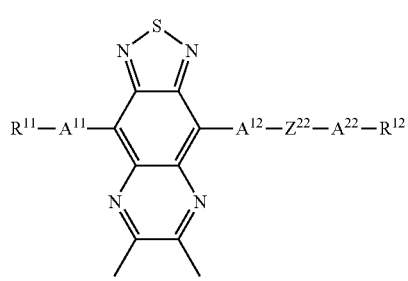
I-2-5 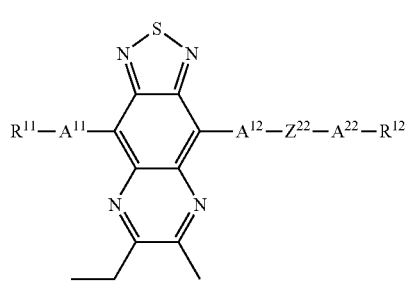
I-2-6 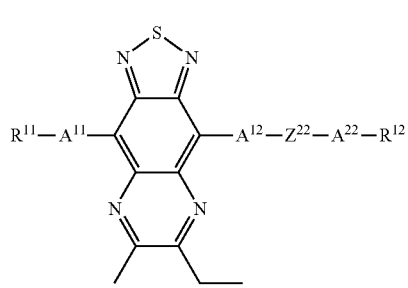
I-2-7 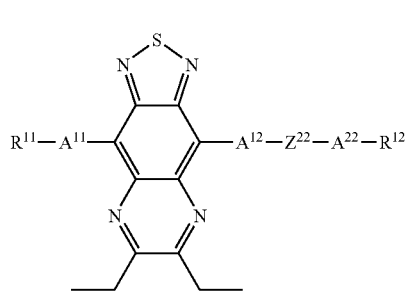
I-2-8 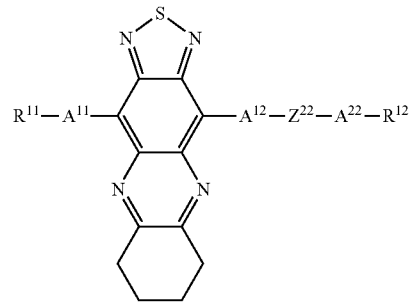
I-2-9 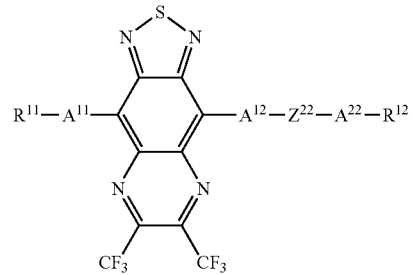
I-2-10 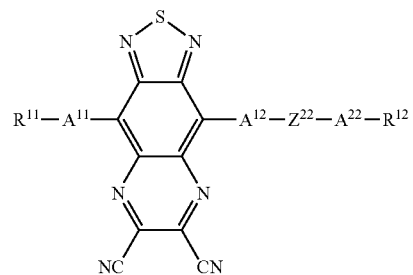
I-2-11 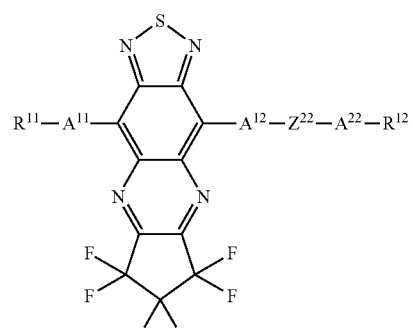
I-2-12 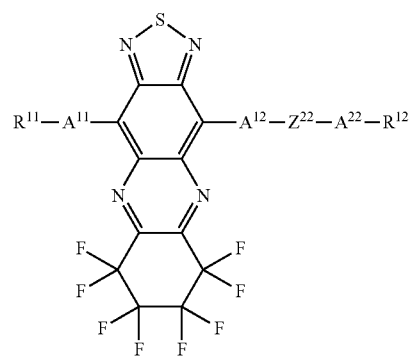

I-3-1
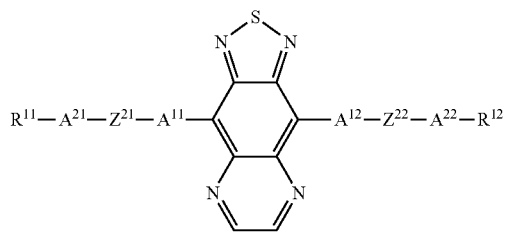
I-3-2
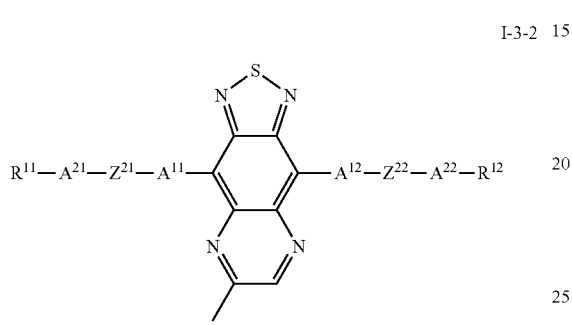
I-3-3
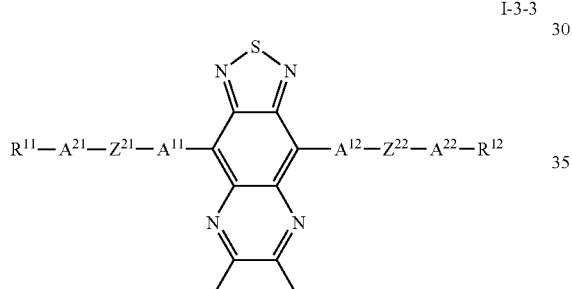
I-3-4
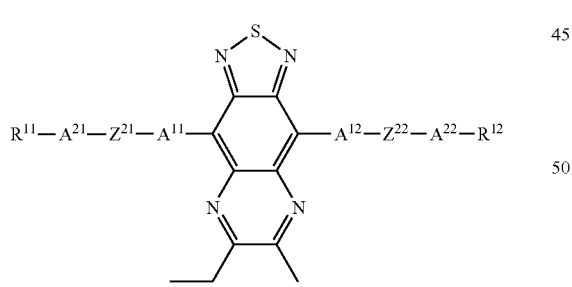
I-3-5
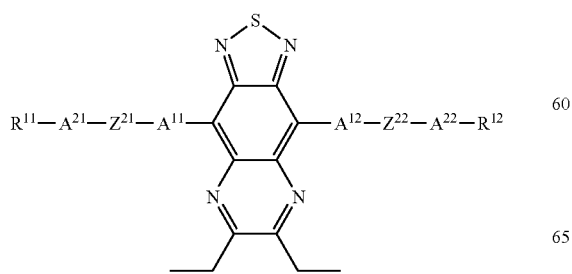
I-3-6
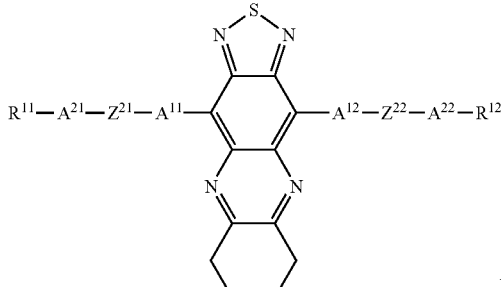
I-3-7
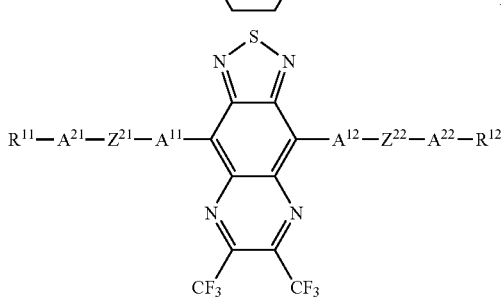
I-3-8
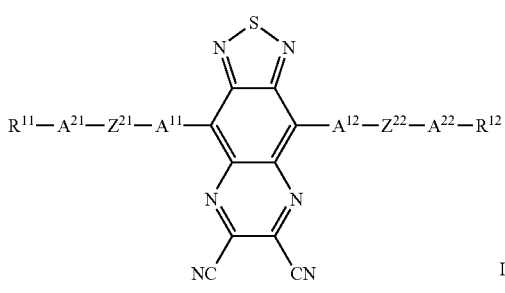
I-3-9
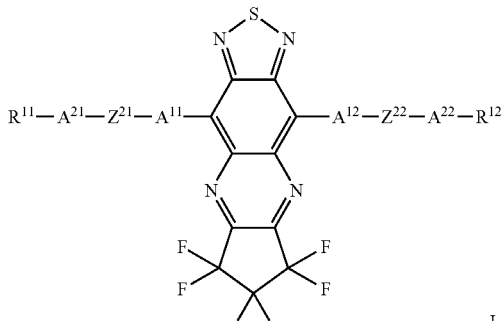
I-3-10
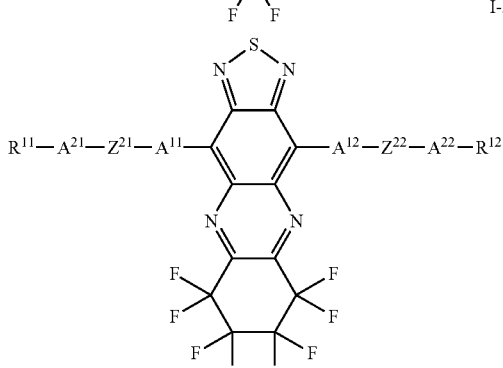
where the groups $A^{11}$, $A^{12}$, $A^{21}$, $A^{22}$, $Z^{21}$, $Z^{22}$, $R^{11}$ and $R^{12}$ occurring are defined as above.

Of the formulae I-1-1 to I-1-10, I-2-1 to I-2-12 and I-3-1 to I-3-10, the formulae I-1-3, I-2-4 and I-3-3 are particularly preferred.
Preferred embodiments of compounds of the formulae I-1-3, I-2-4 and I-3-3 are
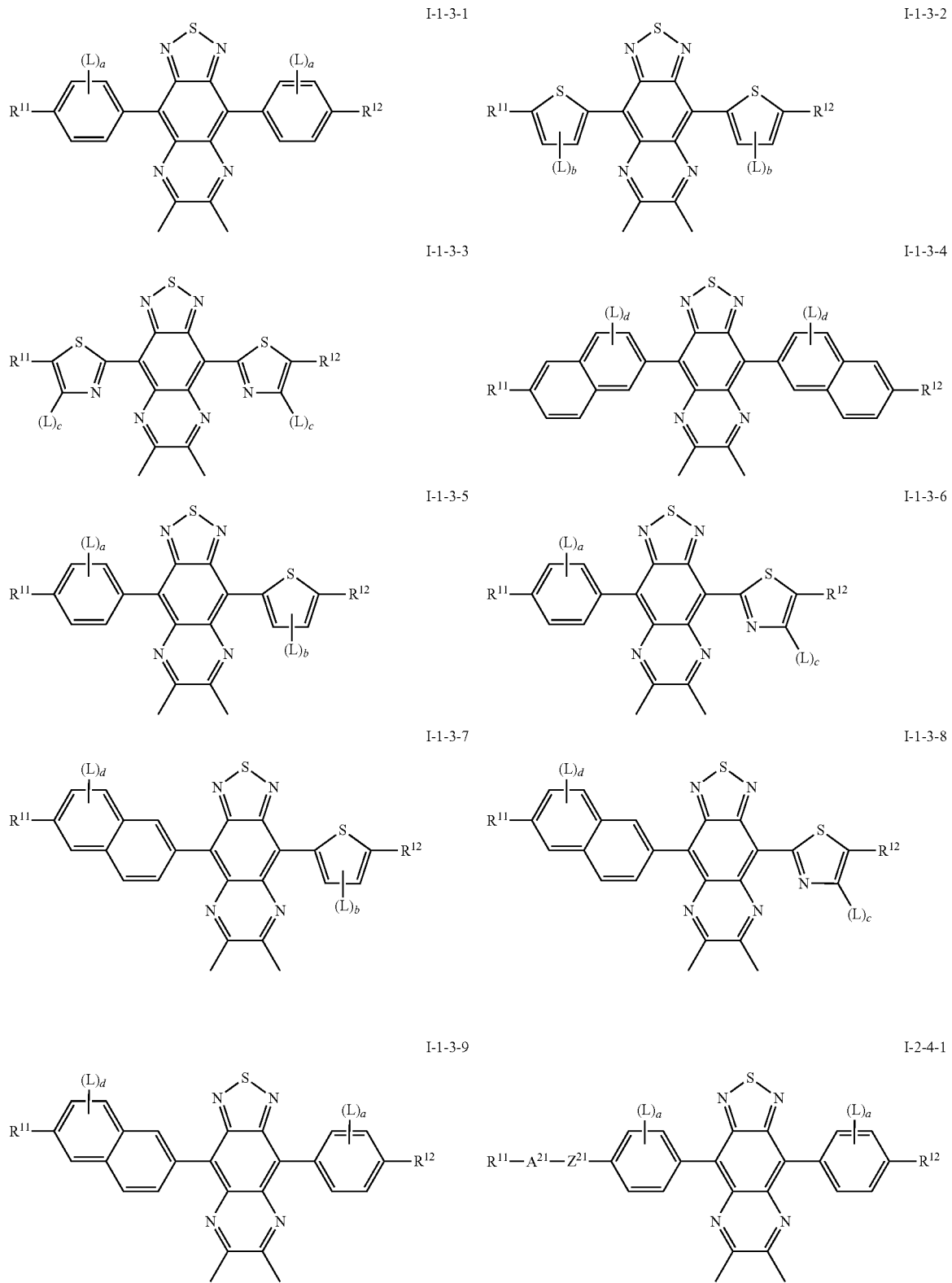

-continued
I-2-4-2
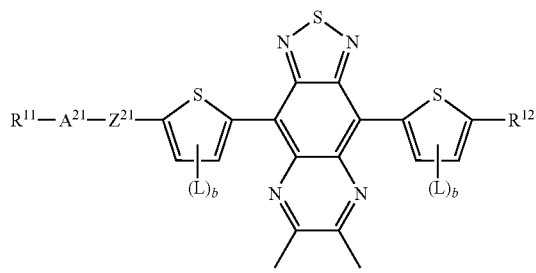
I-2-4-3
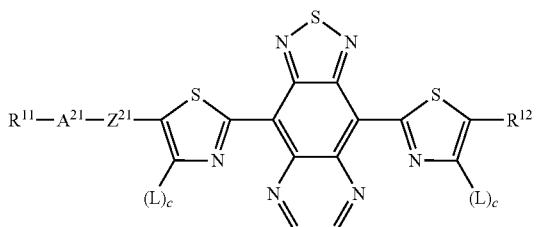
I-2-4-4
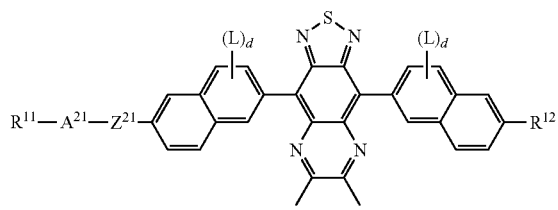
I-2-4-5
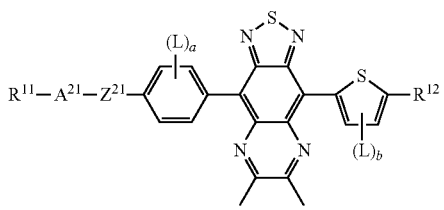
I-2-4-6
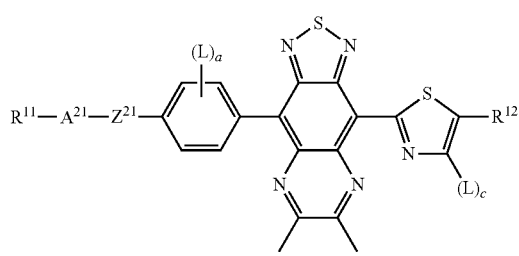
I-2-4-7
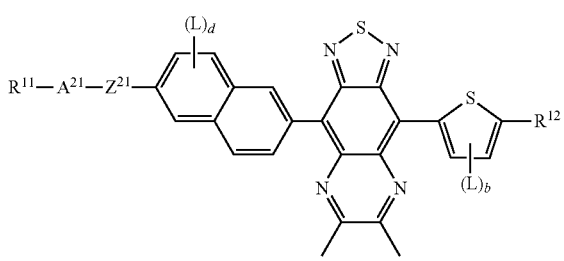
I-2-4-8
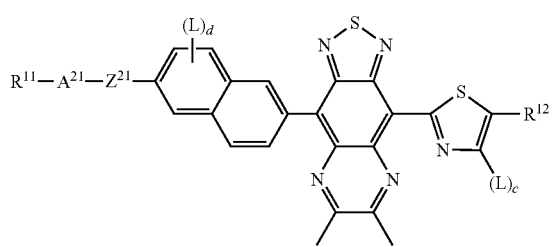
I-2-4-9
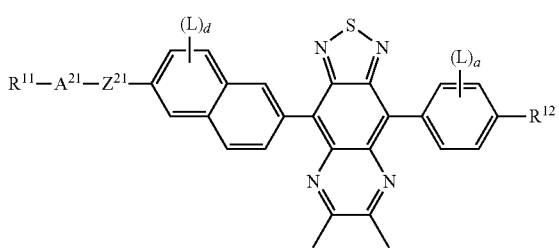
I-2-4-10
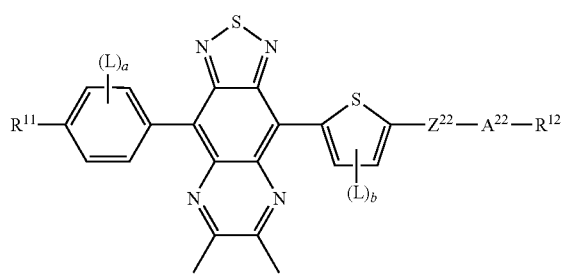
I-2-4-11
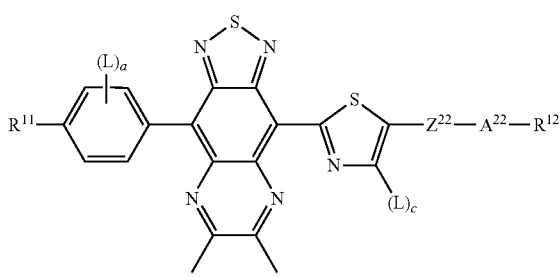
I-2-4-12
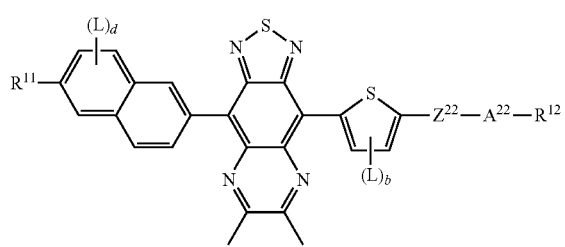
I-2-4-13
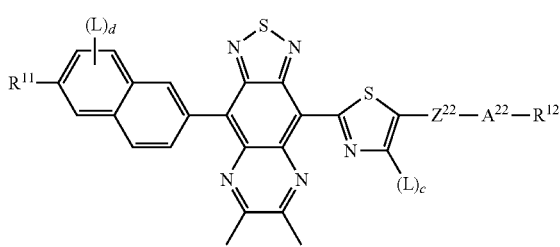

-continued
I-2-4-14
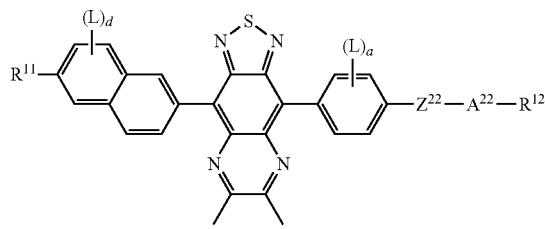
I-3-3-1
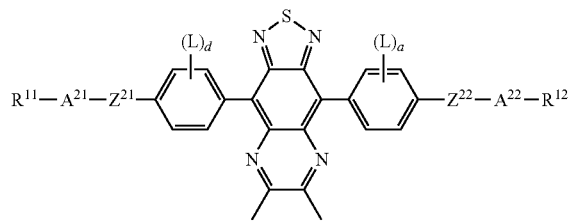
I-3-3-2
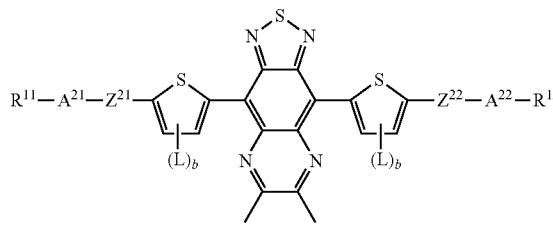
I-3-3-3
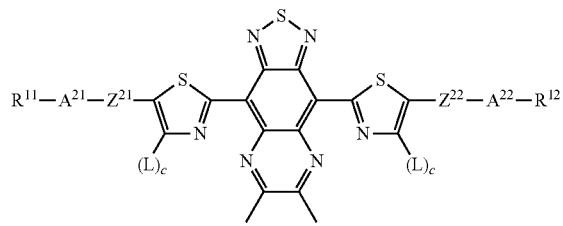
I-3-3-4
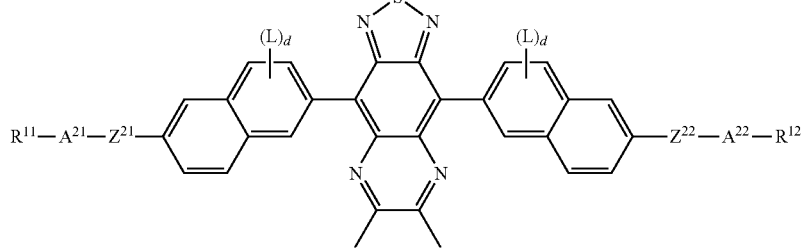
I-3-3-5
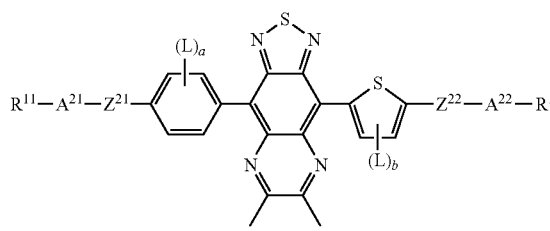
I-3-3-6
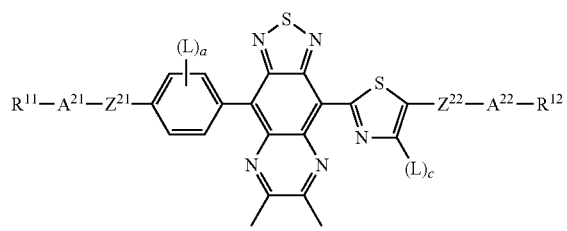
I-3-3-7
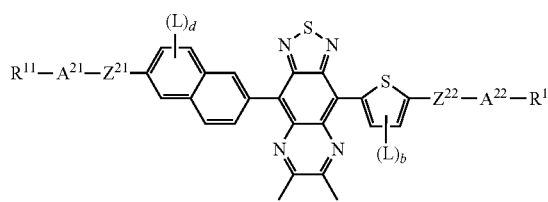
I-3-3-8
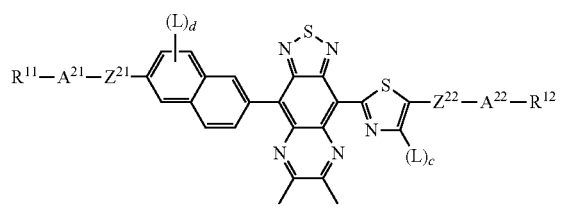
I-3-3-9
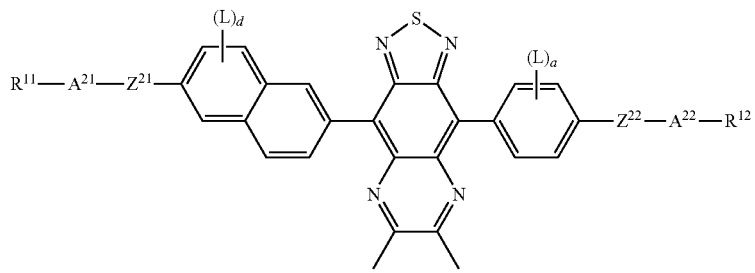

where the groups $R^{11}$, $R^{12}$, $A^{11}$, $A^{12}$, $A^{21}$, $A^{22}$, $Z^{21}$ and $Z^{22}$ occurring are defined as above and a, independently of one another, denotes 0, 1, 2, 3 or 4,
b, independently of one another, denotes 0, 1 or 2,
c, independently of one another, denotes 0 or 1, and
d, independently of one another, denotes 1, 2, 3, 4, 5 or 6.

Very particularly preferred compounds of the formula I are selected from the group of the following sub-formulae:

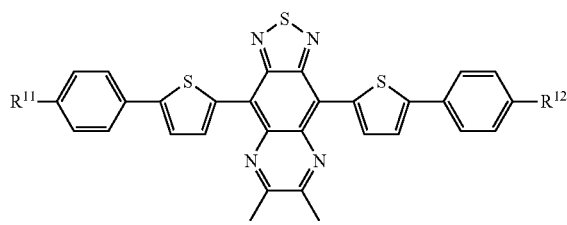
I-3-3-2-a

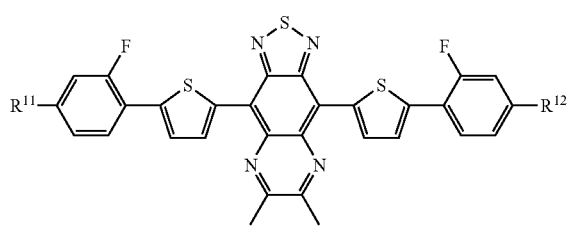
I-3-3-2-b

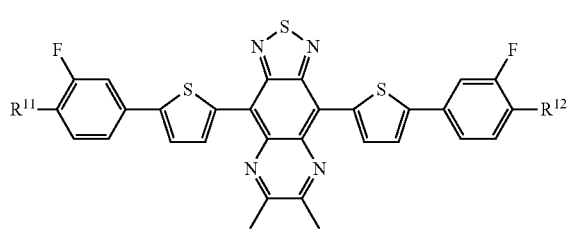
I-3-3-2-c

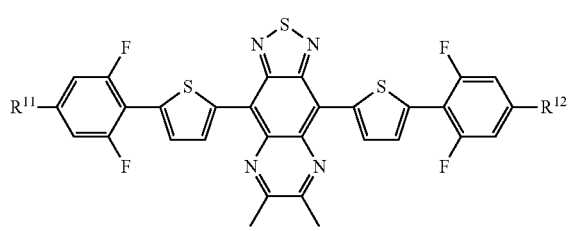
I-3-3-2-d

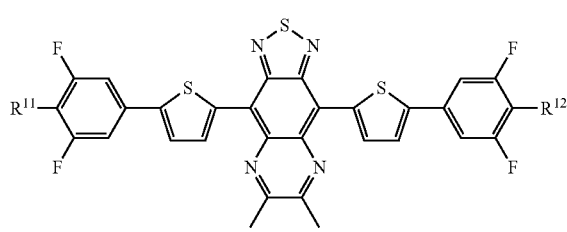
I-3-3-2-e

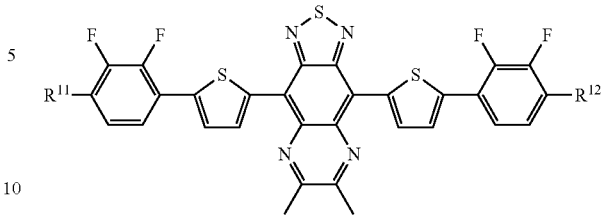
I-3-3-2-f where $R^{11}$ and $R^{12}$ preferably denote n-pentyl, n-hexyl, n-heptyl, 2-ethylhexyl or 3-ethylheptyl.

Particular preference is given to the above-mentioned part-formulae I-1-2, I-1-4, I-2-1 to I-2-12, I-3-2, I-3-4, and I-1-3-5 to I-1-3-9, I-2-4-5 to I-2-1-14 and I-3-3-5 to I-3-3-9.

Asymmetrically substituted compounds of this type are distinguished by particularly good solubility.

The invention furthermore relates to intermediates of the formulae II and III, where $R^{11}$, $R^{12}$, W, $A^{11}$, $A^{12}$, $A^{21}$, $A^{22}$, $Z^{11}$, $Z^{12}$, $Z^{21}$, $Z^{22}$, r and s have the meanings indicated above for formula I,

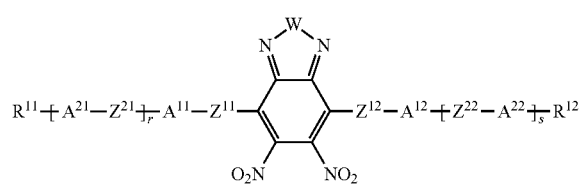
II

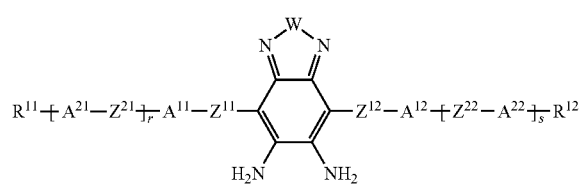
III

The invention furthermore relates to processes for the preparation of the compounds of the formula I, characterised in that the compounds of the formula II or III are converted into compounds of the formula I by the process described in Scheme 1.

The compounds of the formula I can be prepared analogously to processes known to the person skilled in the art and described in standard works of organic chemistry, such as, for example, Houben-Weyl, Methoden der organischen Chemie [Methods of Organic Chemistry], Thieme Verlag, Stuttgart.

Particularly suitable processes in general form are indicated below. For specific processes for the preparation of compounds of the formula I, reference is furthermore made to the known literature and to the working examples.

A preferred process for the preparation of compounds of the formula I is depicted in Scheme 1.

In accordance with the processes described in T. L. Tam, H. Li, K. J. Tan, C. Kloc, Y. M. Lam, S. G. Mhaisalkar, A. C. Grimsdale, *Org. Lett.* 2010, 12, 3340-3343; and C. Kitamura, S. Tanaka, Y. Yamashita, *Chem. Mater.* 1996, 8, 570-578, commercially available 4,7-dibromo-5,6-dinitrobenzo-1,2,5-thiadiazole (1) is reacted with aryl-metal compounds in a transition metal-catalysed cross-coupling by the Stille (M=SnR$_3$), Kumada (M=MgHal) or Negishi (M=ZnHal) method or preferably with areneboronic acids in Suzuki couplings. The nitro compounds 2 can be reduced to diamines 3 using, for example, iron or zinc in glacial acetic acid or by catalytic hydrogenation on Raney nickel or on palladium. These diamines can be cyclised to the compounds 4 according to the invention using diketones, for example by condensation with diacetyl in methanol ($X^{11}$ and $X^{12}$=methyl) or with hexafluorodiacetyl ($X^{11}$ and $X^{12}$=CF$_3$) by the method of M. Cushman, W. C. Wong, A. Bacher, *J. Chem. Soc. Perkin* 1, 1986, 1043-1050 or with diiminosuccinonitrile in trifluoroacetic acid by the method of O. W. Webster, D. R. Hartter, R. W. Begland, W. A. Sheppard, A. Cairn-cross, *J. Org. Chem.* 1972, 37, 4133-4136, or H. W. Rothkopf, D. Wöhrle, R. Müller, G. Koßmehl, *Chem. Ber.* 1975, 108, 875-886, to give target compounds where $X^{11}$ and $X^{12}$=CN.

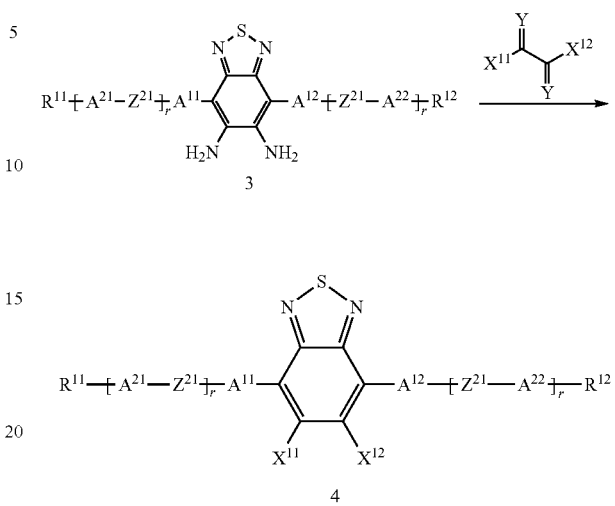

M = SnR$_3$, MgHal, ZnHal, B(OH)$_2$
Y = O or NH

Alternatively, reduction of 1 in a first reaction step can also give the diamine 5, which then, after building up the thiadiazoloquinoxaline basic structure 6, opens up the possibility of further modifications to give compounds of the formula I. The corresponding alkenes or alkynes can be prepared in this way, in particular by Sonogashira or Heck coupling, by the method of K. Susumu et al., *J. Phys. Chem. A* 2011, 115, 5525-5539 (Scheme 2).

Reaction of the diamines 3 with diethyl oxalate with ytterbium triflate catalysis by the method of L. Wang et al., *Synth. Comm.* 2004, 34(8), 1349-1357, can give the compounds 7, from which halogen compounds are accessible, for example the chlorine derivatives 8 by the method of Ch. Zhu et al., *ChemMedChem* 2012, 7, 823-835, or the fluorinated compounds 9 by reaction with Phenofluor® by the method of T. Fujimoto, F. Becker and T. Ritter, *Org. Process Res. Dev.* 2014, 18, 1041-1044 (Scheme 3).

Scheme 1.

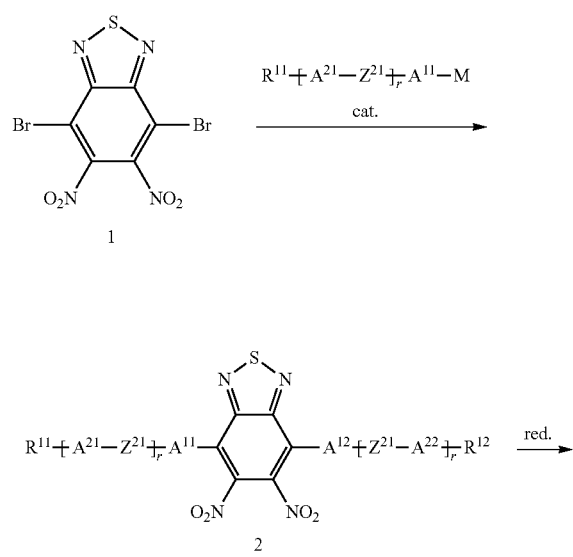

Scheme 2

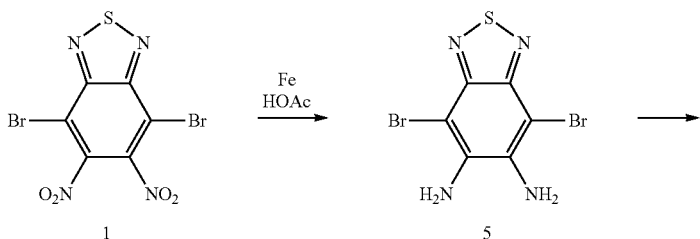

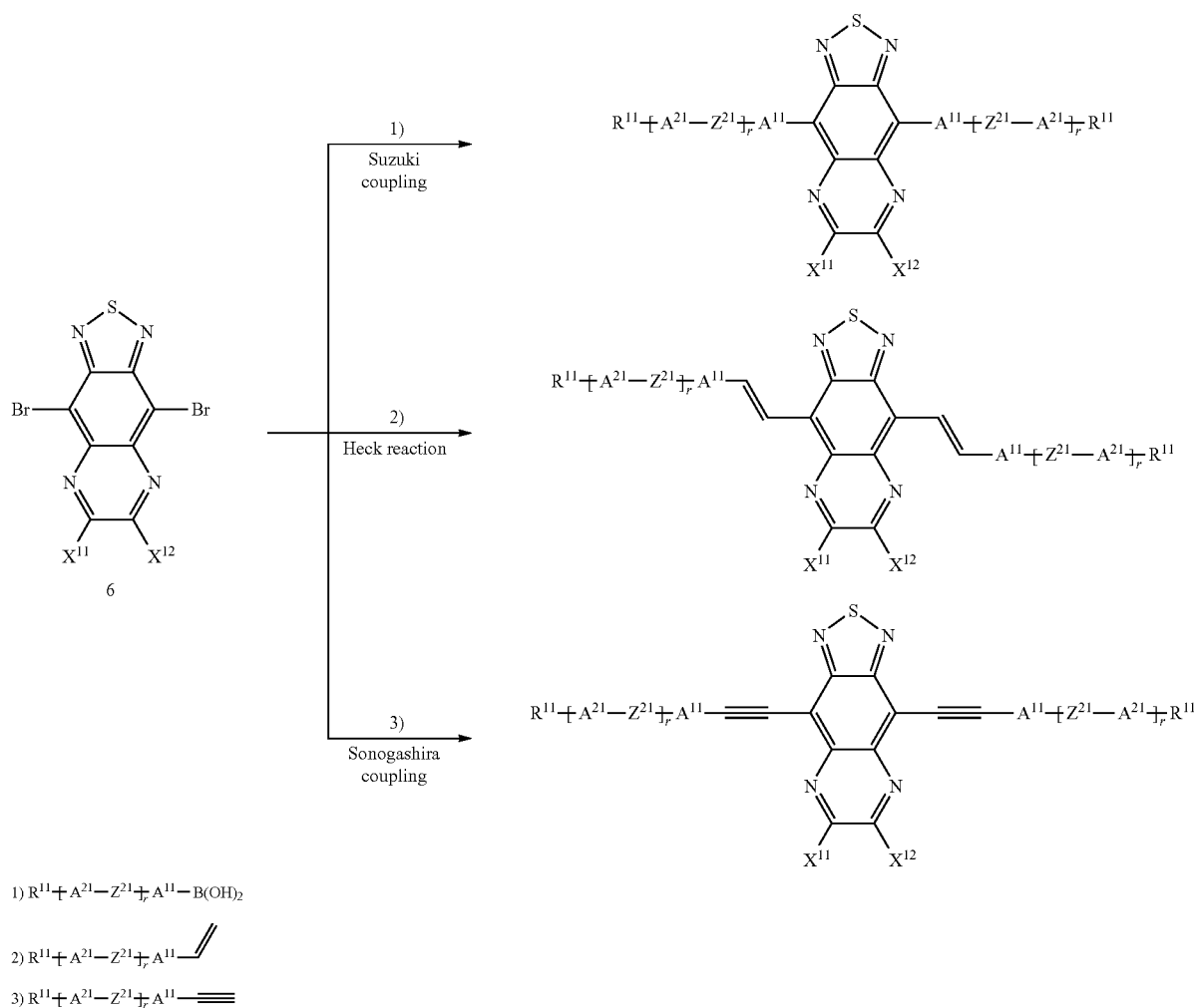
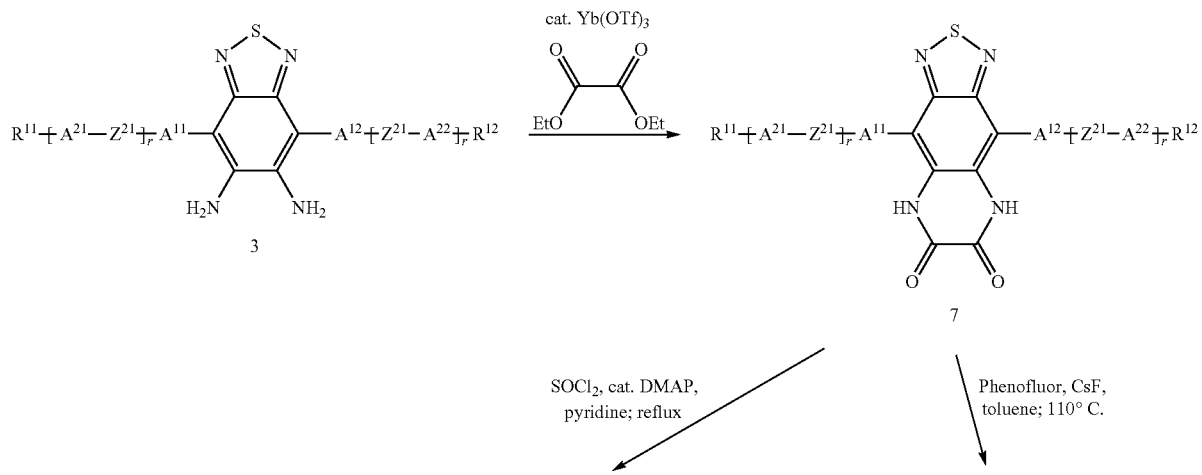
Scheme 3.

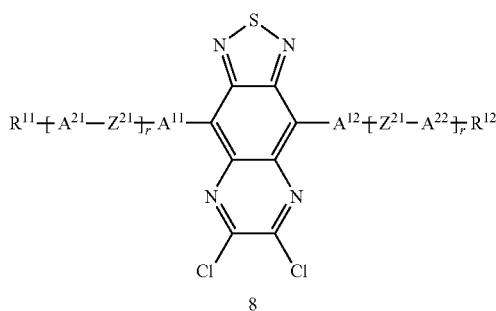

8

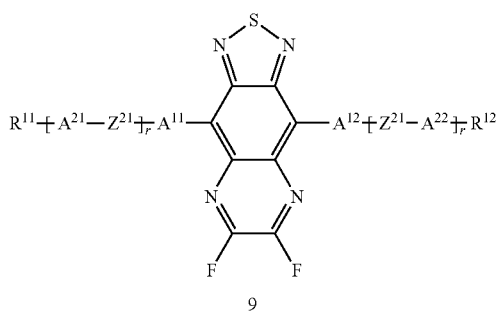

9

The compound of the formula I is preferably a positively dichroic dye, i.e. a dye which has a positive degree of anisotropy R.

The degree of anisotropy R is determined, as indicated in the working examples, from the value for the extinction coefficient of the LC mixture comprising the dye in the case of alignment of the molecules parallel to the direction of polarisation of the light and the value for the extinction coefficient in the case of perpendicular alignment of the molecules to the direction of polarisation of the light.

The degree of anisotropy R is particularly preferably greater than 0.4, very particularly preferably greater than 0.6 and most preferably greater than 0.7.

The absorption preferably reaches a maximum when the polarisation direction of the light is parallel to the direction of the longest elongation of the molecule of the formula I, and it reaches a minimum when the polarisation direction of the light is perpendicular to the direction of the longest elongation of the molecule of the formula I.

The compound of the formula I is furthermore preferably a fluorescent dye. Fluorescence here is taken to mean that a compound is placed in an electronically excited state by absorption of light of a certain wavelength, where the compound subsequently undergoes a transition into the ground state with emission of light. The emitted light preferably has a longer wavelength than the absorbed light. The transition from the excited state into the ground state is furthermore preferably spin-allowed, i.e. takes place without a change in the spin. Furthermore preferably, the lifetime of the excited state of the fluorescent compound is shorter than $10^{-5}$ s, particularly preferably shorter than $10^{-6}$ s, very particularly preferably between $10^{-9}$ and $10^{-7}$ s.

The present invention also relates to liquid-crystalline media comprising 2 to 40, preferably 4 to 30, components as further constituents besides one or more compounds of the formula I according to the invention. These media particularly preferably comprise 7 to 25 components besides one or more compounds according to the invention. These further constituents are preferably selected from nematic or nematogenic (monotropic or isotropic) substances, in particular substances from the classes of the azoxy-benzenes, benzylideneanilines, biphenyls, terphenyls, 1,3-dioxanes, 2,5-tetrahydropyrans, phenyl or cyclohexyl benzoates, phenyl or cyclohexyl esters of cyclohexanecarboxylic acid, phenyl or cyclohexyl esters of cyclo-hexylbenzoic acid, phenyl or cyclohexyl esters of cyclohexylcyclohexanecarboxylic acid, cyclohexylphenyl esters of benzoic acid, of cyclohexanevarboxylic acid or of cyclohexylcyclohexanecarboxylic acid, phenylcyclo-hexanes, cyclohexylbiphenyls, phenylcyclohexylcyclohexanes, cyclohexyl-cyclohexanes, cyclohexylcyclohexylcyclohexenes, 1,4-biscyclohexyl-benzenes, 4',4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)-ethanes, 1-cyclohexyl-2-biphenylethanes, 1-phenyl-2-cyclohexylphenyl-ethanes, optionally halogenated stilbenes, benzyl phenyl ethers, tolans and substituted cinnamic acids. The 1,4-phenylene groups in these compounds may also be mono- or polyfluorinated.

The most important compounds suitable as further constituents of media according to the invention can be characterised by the formulae (IV), (V), (VI), (VII) and (VIII):

| R'-L-E-R" | (IV) |
| R'-L-COO-E-R" | (V) |
| R'-L-OOC-E-R" | (VI) |
| R'-L-CH$_2$CH$_2$-E-R" | (VII) |
| R'-L-CF$_2$O-E-R" | (VIII) |

In the formulae (IV), (V), (VI), (VII) and (VIII), L and E, which may be identical or different, each, independently of one another, denote a divalent radical from the group formed by -Phe-, -Cyc-, -Phe-Phe-, -Phe-Cyc-, -Cyc-Cyc-, -Pyr-, -Dio-, -Thp-, -G-Phe- and -G-Cyc- and their mirror images, where Phe denotes unsubstituted or fluorine-substituted 1,4-phenylene, Cyc denotes trans-1,4-cyclohexylene or 1,4-cyclohexenylene, Pyr denotes pyrimidine-2,5-diyl or pyridine-2,5-diyl, Dio denotes 1,3-dioxane-2,5-diyl, Thp denotes tetrahydropyran-2,5-diyl and G denotes 2-(trans-1,4-cyclohexyl)ethyl, pyrimidine-2,5-diyl, pyridine-2,5-diyl, 1,3-dioxane-2,5-diyl or tetrahydropyran-2,5-diyl.

One of the radicals L and E is preferably Cyc or Phe. E is preferably Cyc, Phe or Phe-Cyc. The media according to the invention preferably comprise one or more components selected from the compounds of the formulae (IV), (V), (VI), (VII) and (VIII) in which L and E are selected from the group consisting of Cyc and Phe and simultaneously one or more components selected from the compounds of the formulae (IV), (V), (VI), (VII) and (VIII) in which one of the radicals L and E is selected from the group consisting of Cyc and Phe and the other radical is selected from the group consisting of -Phe-Phe-, -Phe-Cyc-, -Cyc-Cyc-, -G-Phe- and -G-Cyc-, and optionally one or more components selected from the compounds of the formulae (IV), (V), (VI), (VII) and (VIII) in which the radicals L and E are selected from the group consisting of -Phe-Cyc-, -Cyc-Cyc-, -G-Phe- and -G-Cyc-.

In a smaller sub-group of the compounds of the formulae (IV), (V), (VI), (VII) and (VIII), R' and R" each, independently of one another, denote alkyl, alkenyl, alkoxy, alkoxyalkyl (oxaalkyl), alkenyloxy or alkanoyloxy having up to 8 C atoms. This smaller sub-group is called group A below, and the compounds are referred to by the sub-formulae (IVa), (Va), (VIa), (VIIa) and (VIIIa). In most of these compounds, R' and R" are different from one another, one of these radicals usually being alkyl, alkenyl, alkoxy or alkoxyalkyl (oxaalkyl).

In another relatively small sub-group of the compounds of the formulae (IV), (V), (VI), (VII) and (VIII), known as group B, R" denotes —F, —Cl, —NCS or —(O)$_i$CH$_{3-k}$F$_k$, where i is 0 or 1 and k is 1, 2 or 3. The compounds in which R" has this meaning are denoted by the sub-formulae (IVb), (Vb), (VIb), (VIIb) and (VIIIb). Particular preference is given to compounds of the sub-formulae (IVb), (Vb), (VIb), (VIIb) and (VIIIb) in which R" has the meaning —F, —Cl, —NCS, —CF$_3$, —OCHF$_2$ or —OCF$_3$.

In the compounds of group B, which are referred to by the sub-formulae (IVb), (Vb), (VIb), (VIIb) and (VIIIb), R' is as defined for the compounds of the sub-formulae (IVa) to (VIIIa) and is preferably alkyl, alkenyl, alkoxy or alkoxyalkyl (oxaalkyl).

In a further smaller sub-group of the compounds of the formulae (IV), (V), (VI), (VII) and (VIII), R" denotes —CN. This sub-group is referred to below as group C, and the compounds of this sub-group are correspondingly described by sub-formulae (IVc), (Vc), (VIc), (VIIc) and (VIIIc). In the compounds of the sub-formulae (IVc), (Vc), (VIc), (VIIc) and (VIIIc), R' is as defined for the compounds of the sub-formulae (IVa) to (VIIIa) and is preferably alkyl, alkenyl, alkoxy or alkoxyalkyl (oxaalkyl).

Besides the preferred compounds of groups A, B and C, other compounds of the formulae (IV), (V), (VI), (VII) and (VIII) having other variants of the proposed substituents are also customary. All these substances are obtainable by methods which are known from the literature or analogously thereto.

Besides the compounds of the general formula I according to the invention, the media according to the invention preferably comprise one or more compounds from groups A, B and/or C. The proportions by weight of the compounds from these groups in the media according to the invention are:

group A:
from 0 to 90%, preferably from 20 to 90%, in particular from 30 to 90%.
group B:
from 0 to 80%, preferably from 10 to 80%, in particular from 10 to 70%.
group C:
from 0 to 80%, preferably from 5 to 80%, in particular from 5 to 50%.

The dichroic compound of the formula I is preferably present in the switching layer in a proportion of 0.01 to 10% by weight, particularly preferably 0.05 to 7% by weight and very particularly preferably 0.1 to 7% by weight. The media preferably comprise one, two, three, four or five compounds of the formula I according to the invention.

The LC medium according to the invention is preferably a nematic liquid crystal.

The media according to the invention are prepared in a manner conventional per se. In general, the components are dissolved in one another, preferably at elevated temperature. The mixing is preferably carried out under inert gas, for example under nitrogen or argon. One or more dyes of the formula I and optionally further dichroic dyes are subsequently added, preferably at elevated temperature, particularly preferably at above 40° C. and very particularly preferably at above 50° C. In general, the desired amount of the components used in smaller amount is dissolved in the components making up the principal constituent. It is also possible to mix solutions of the components in an organic solvent, for example in acetone, toluene, chloroform or methanol, and to remove the solvent again, for example by distillation, after mixing. The invention furthermore relates to the process for the preparation of the LC media according to the invention.

The invention furthermore relates to the use of an LC medium comprising at least one compound of the formula I in a liquid-crystal display of the guest-host type.

The invention furthermore relates to a liquid-crystal display of the guest-host type containing an LC medium which comprises at least one compound of the formula I.

The invention furthermore relates to the use of a mixture comprising a liquid-crystalline medium and at least one compound of a formula I in a device for regulating the passage of energy from an outside space into an inside space.

The device according to the invention, In addition to one or more compounds of the formula I, and preferably a liquid-crystalline medium, preferably also comprises further dichroic dyes having a different structure to formula I in the switching layer. It particularly preferably comprises one, two, three or four further dyes, very particularly preferably two or three further dyes and most preferably three further dyes having a different structure to formula I.

With respect to the property of dichroism, the preferred properties described for the compound of the formula I are also preferred for the optional further dichroic dyes.

The absorption spectra of the dichroic dyes of the switching layer preferably complement one another in such a way that the impression of a black colour arises for the eye. The two or more dichroic dyes of the liquid-crystalline medium according to the invention preferably cover a large part of the visible spectrum. The precise way in which a mixture of dyes which appears black or grey to the eye can be prepared is known to the person skilled in the art and is described, for example, in Manfred Richter, Einführung in die Farbmetrik [Introduction to Colorimetry], 2nd Edition, 1981, ISBN 3-11-008209-8, Verlag Walter de Gruyter & Co.

The setting of the colour location of a mixture of dyes is described in the area of colorimetry. To this end, the spectra of the individual dyes are calculated taking into account the Lambert-Beer law to give an overall spectrum and converted into the corresponding colour locations and luminance values under the associated illumination, for example illuminant D65 for daylight, in accordance with the rules of colorimetry. The position of the white point is fixed by the respective illuminant, for example D65, and is quoted in tables (for example reference above). Different colour locations can be set by changing the proportions of the various dyes.

According to a preferred embodiment, the switching layer comprises one or more dichroic dyes which absorb light in the red and NIR region, i.e. at a wavelength of 600 to 2000 nm, preferably in the range from 650 to 1800 nm, particularly preferably in the range from 650 to 1300 nm. In a preferred embodiment, these dichroic dyes are selected from azo compounds, anthraquinones, methine compounds, azomethine compounds, merocyanine compounds, naphthoquinones, tetrazines, perylenes, terrylenes, quaterrylenes, higher rylenes, pyrromethenes, azo dyes, nickel dithiolenes, (metal) phthalocyanines, (metal) naphthalocyanines and (metal) porphyrins. Of these, particular preference is given to perylenes and terrylenes.

The further dichroic dyes of the switching layer having a different structure to the formula I are preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

The said dyes belong to the classes of dichroic dyes which are known to the person skilled in the art and have been described many times in the literature. Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes in EP 43904, DE 3123519, WO 82/2054, GB 2079770, JP-A 56-57850, JP-A 56-104984, U.S. Pat. Nos. 4,308,161, 4,308,162, 4,340,973, T. Uchida, C. Shishido, H. Seki and M. Wada: Mol. Cryst. Lig. Cryst. 39, 39-52 (1977), and H. Seki, C. Shishido, S. Yasui and T. Uchida: Jpn. J. Appl. Phys. 21, 191-192 (1982), and perylenes are described in EP 60895, EP 68427 and WO 82/1191. Rylene dyes as described, for example, in EP 2166040, US 2011/0042651, EP 68427, EP 47027, EP 60895, DE 3110960 and EP 698649.

According to a preferred embodiment, the switching layer of the device according to the invention comprises, besides compounds of the formula I, exclusively dichroic dyes selected from rylene dyes.

Examples of preferred further dichroic dyes which may be present in the switching layer of the device are shown in Table 1 below:

TABLE 1

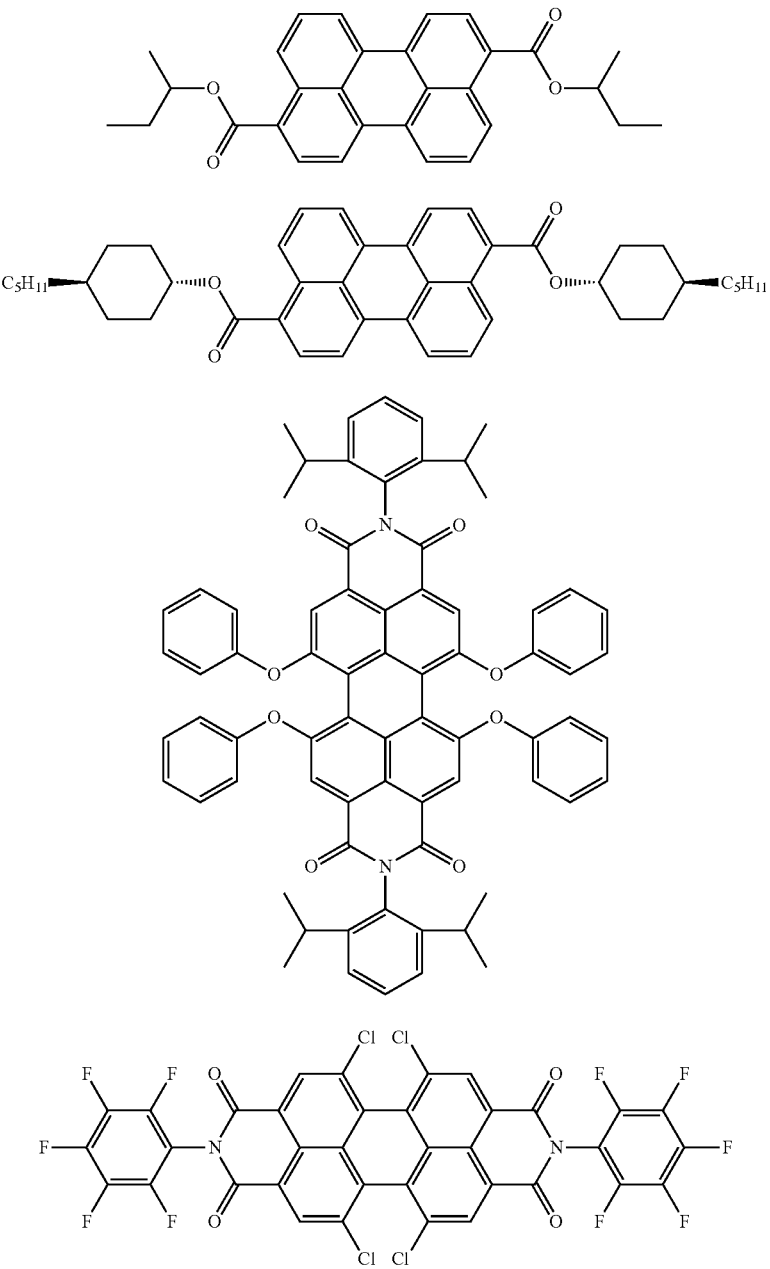

TABLE 1-continued
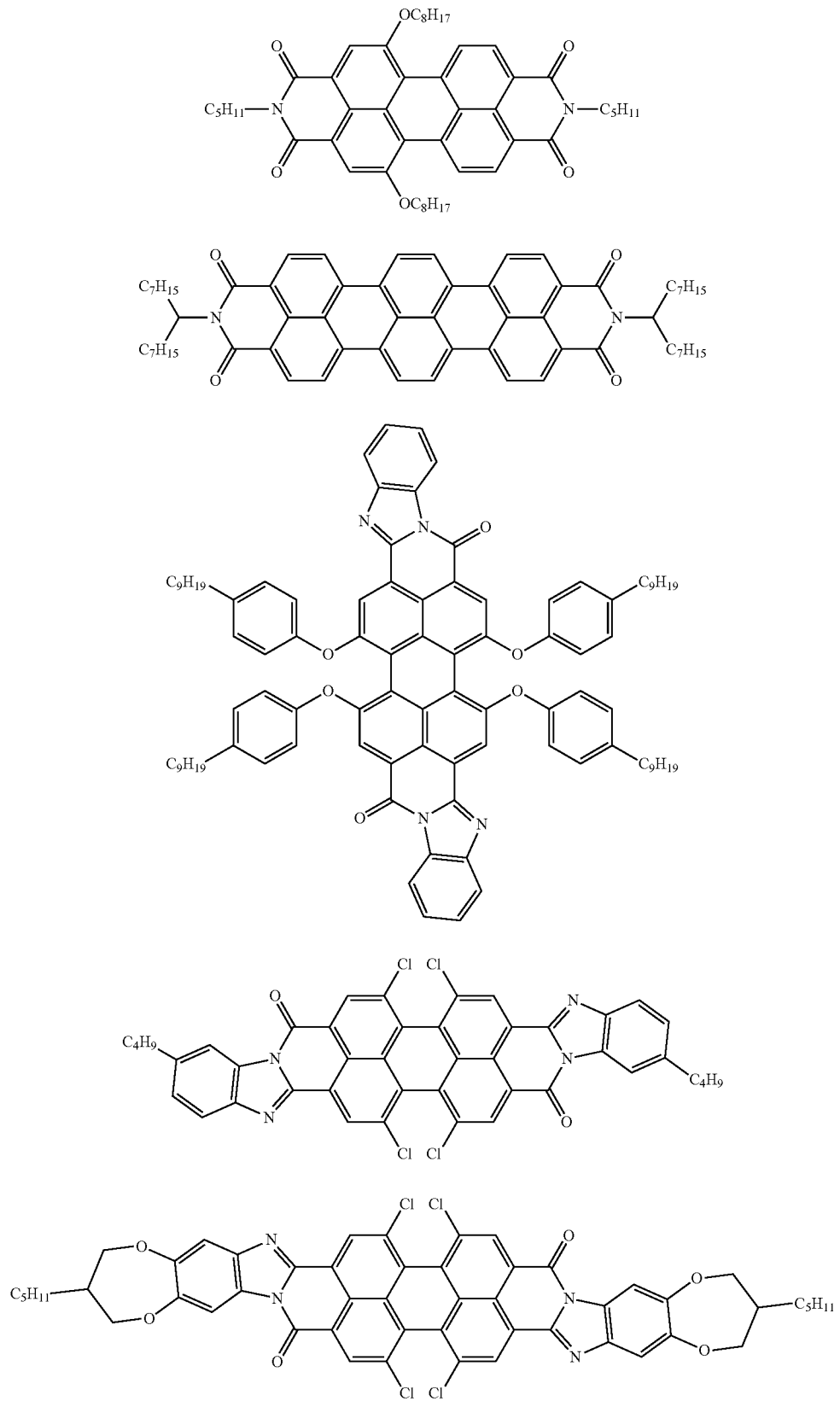

TABLE 1-continued
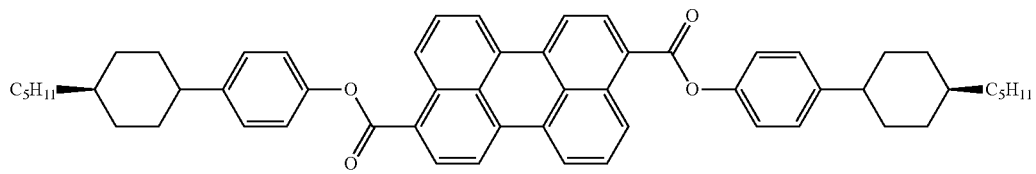
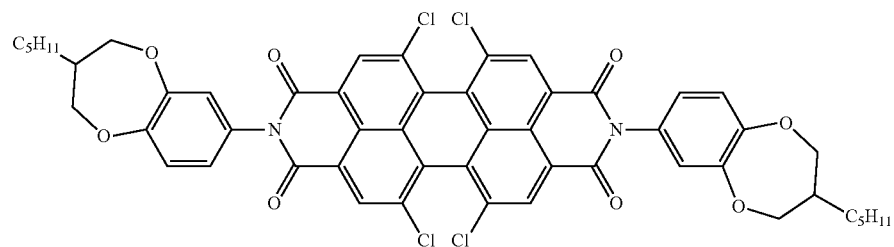
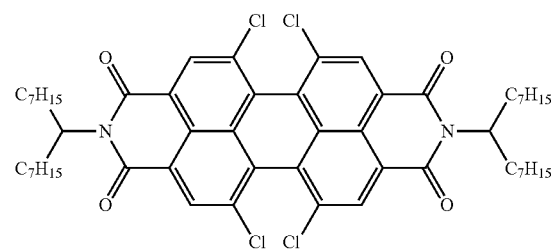
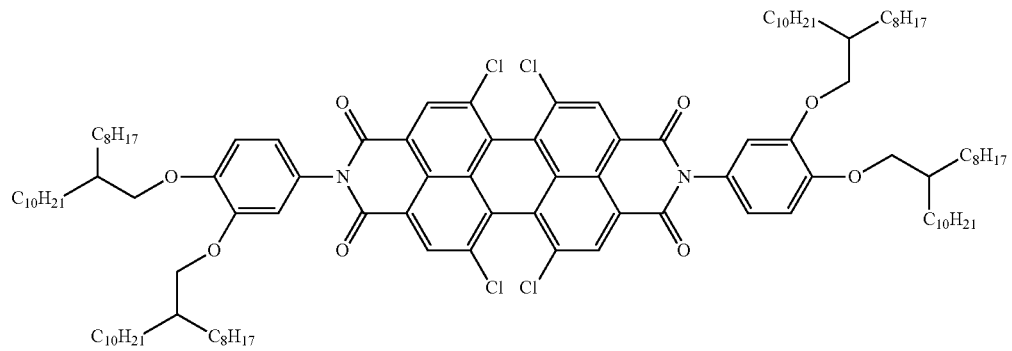
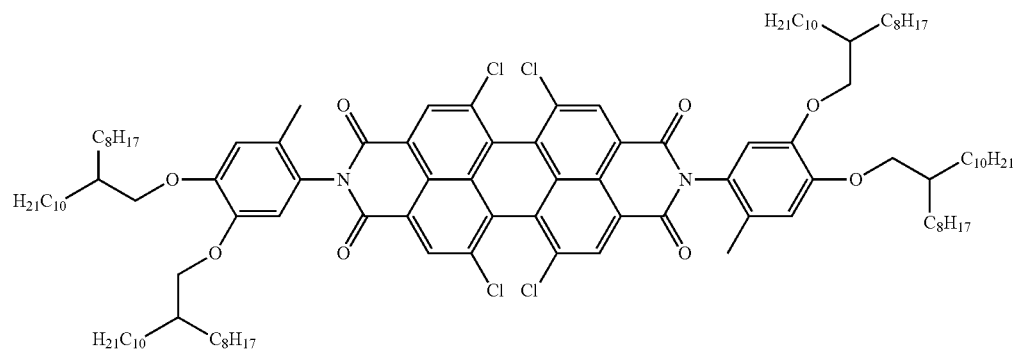

TABLE 1-continued
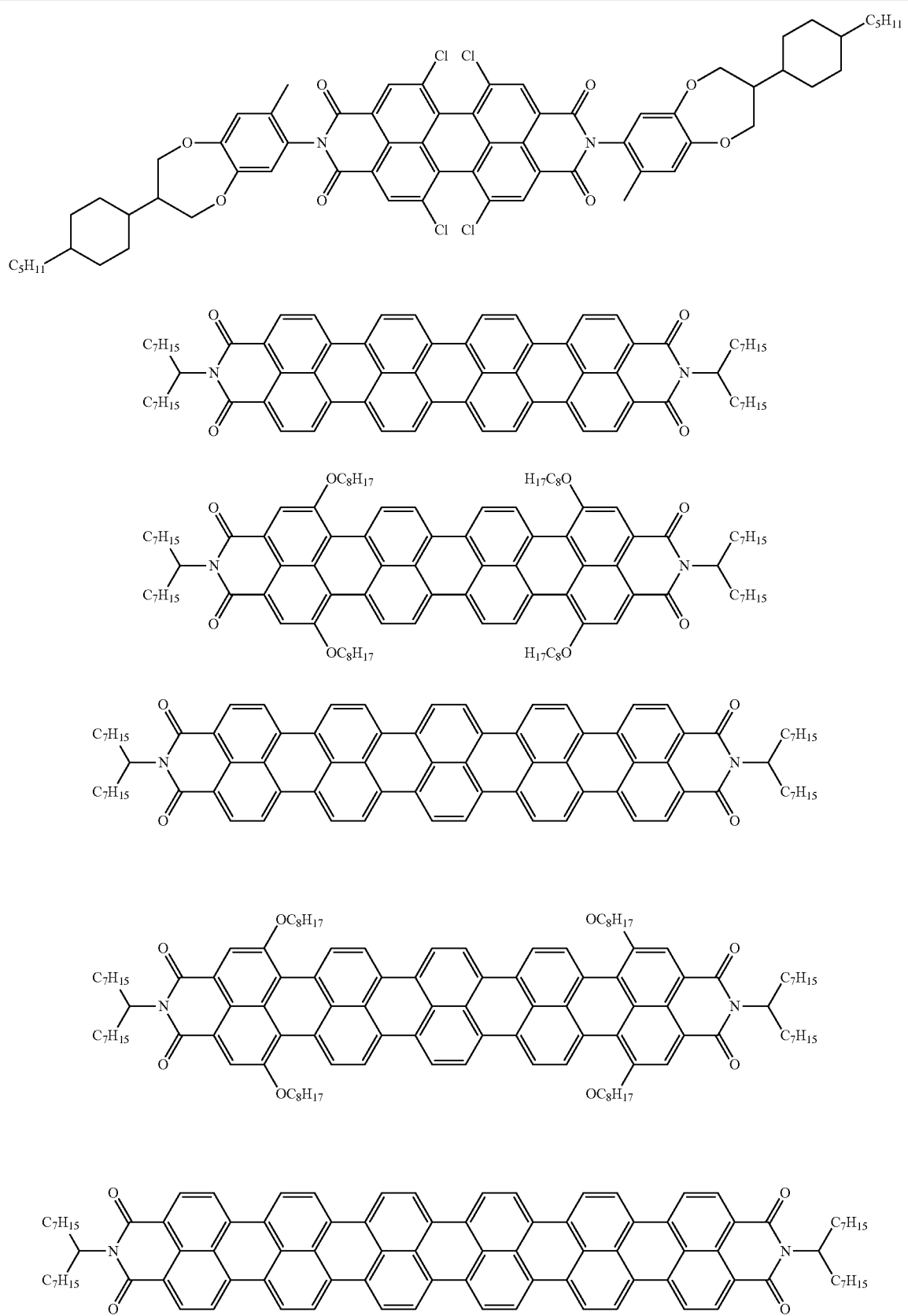

TABLE 1-continued

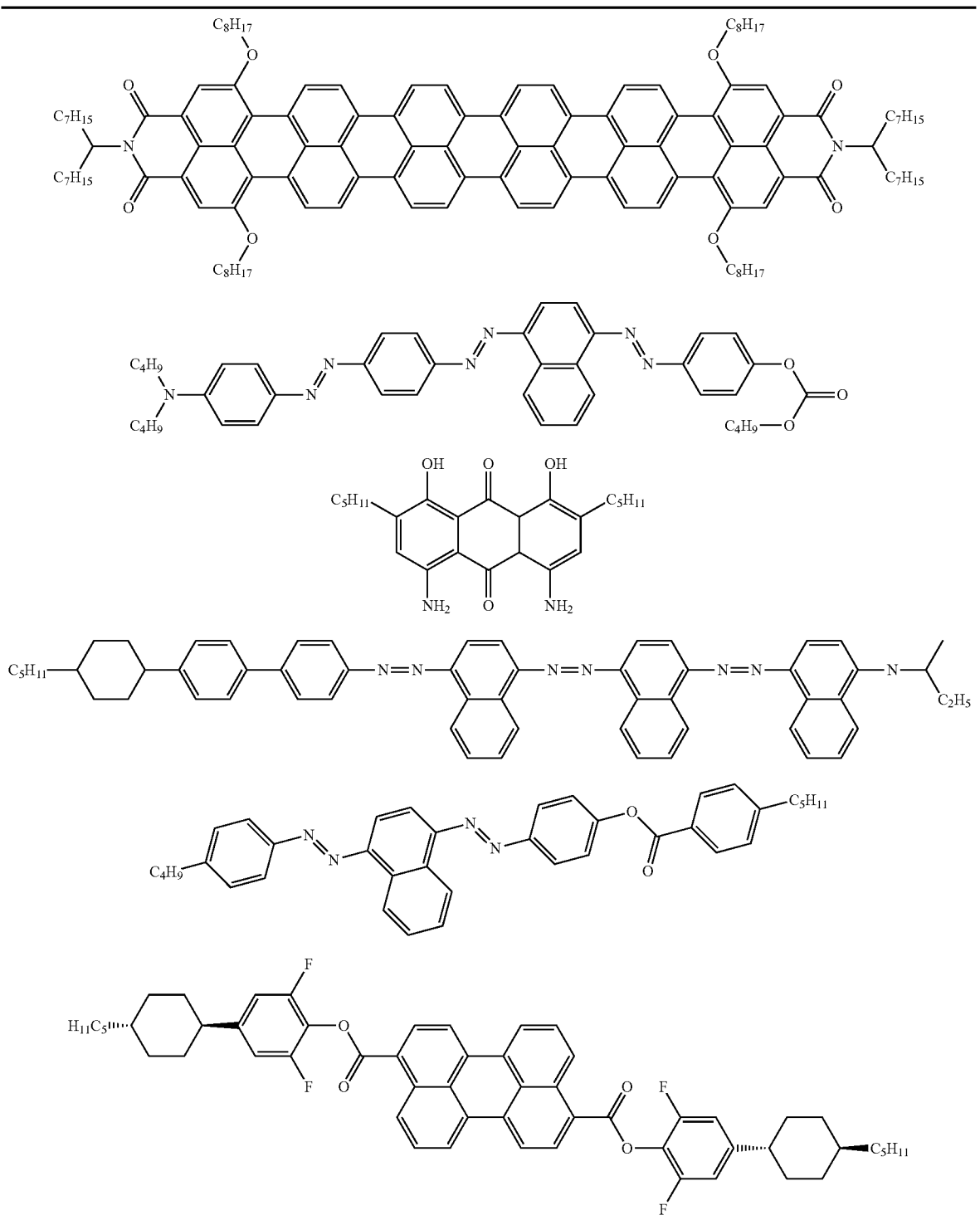

In a preferred embodiment, the switching layer of the device according to the invention comprises one or more quencher compounds. This is particularly preferred if the device according to the invention comprises one or more fluorescent dyes in its switching layer.

Quencher compounds are compounds which quench the fluorescence. The quencher compounds can take on the electronic excitation energy of adjacent molecules, such as, for example, fluorescent dyes, in the switching layer and undergo a transition into an electronically excited state in the process. The quenched fluorescent dye is thus converted into the electronic ground state and is thus prevented from emitting fluorescence or undergoing a subsequent reaction. The quencher compound itself returns to the ground state through radiation-free deactivation or by emission of light and is again available for further quenching.

The quencher compound may have various functions in the switching layer of the device according to the invention. Firstly, the quencher compound may contribute to extending the lifetime of a dye system, by deactivation of electronic excitation energy. Secondly, the quencher compound eliminates additional colour effects which may be aesthetically undesired, for example coloured emission in the inside space emanating from the fluorescent dyes in the switching layer.

In order to achieve effective quenching, the quencher compound should be adapted to the respective dye system, in particular the dye absorbing at the longest wavelength in a dye combination. The way to do this is known to the person skilled in the art.

Preferred quencher compounds are described, for example, in Table 8.1 on page 279 in Joseph R. Lakowicz, Principles of Fluorescence Spectroscopy, $3^{rd}$ Edition, 2010, ISBN 10: 0-387-31278-1, Verlag Springer Science+Business Media LLC. Further classes of molecule are familiar to the person skilled in the art, for example under the key words dark quencher or black hole quencher. Examples are azo dyes and aminoanthraquinones. The quencher compounds used in the switching layer of the device according to the invention may also be non-fluorescent dyes or dyes which only fluoresce in the NIR.

In a preferred embodiment of the switching layer according to the invention, any quencher compounds present are selected so that fluorescence in the visible part of the spectrum is suppressed.

The device according to the invention is preferably suitable for regulating the passage of energy in the form of sunlight from the environment into an inside space. The passage of energy to be regulated here takes place from the environment (the outside space) into an inside space.

The inside space here can be any desired space that is substantially sealed off from the environment, for example a building, a vehicle or a container.

The invention therefore furthermore relates to the use of the device for regulating the passage of energy from an outside space into an inside space.

However, the device can also be employed for aesthetic room design, for example for light and colour effects. For example, door and wall elements containing the device according to the invention in grey or in colour can be switched to transparent. Furthermore, the device may also comprise white or coloured flat backlighting which is modulated in brightness or yellow flat backlighting which is modulated in colour by means of a blue guest-host display. One or both glass sides of the device according to the invention may be provided with roughened or structured glass for the coupling-out of light and/or for the generation of light effects.

In a further alternative use, the device is employed for regulating the incidence of light on the eyes, for example in protective goggles, visors or sunglasses, where the device keeps the incidence of light on the eyes low in one switching state and reduces the incidence of light less in another switching state.

The device according to the invention is preferably arranged in an opening in a relatively large two-dimensional structure, where the two-dimensional structure itself only allows slight passage of energy, or none at all, and where the opening has relatively high energy transmissivity. The two-dimensional structure is preferably a wall or another boundary of an inside space to the outside. Furthermore, the two-dimensional structure preferably covers an area of at least equal size, particularly preferably an area at least twice as large as the opening in it in which the device according to the invention is disposed.

The device is preferably characterised in that it has an area of at least 0.05 $m^2$, preferably at least 0.1 $m^2$, particularly preferably at least 0.5 $m^2$ and very particularly preferably at least 0.8 $m^2$.

The device is preferably accommodated in an opening having relatively high energy transmissivity, as described above, in a building, a container, a vehicle or another substantially closed space. The device can generally be used for any desired inside spaces, particularly if they have only limited exchange of air with the environment and have light-transmitting boundary surfaces through which input of energy from the outside in the form of light energy can take place. The use of the device for inside spaces which are subjected to strong insolation through light-transmitting areas, for example through window areas, is particularly relevant.

The device according to the invention is switchable. Switching here is taken to mean a change in the passage of energy through the device. The device according to the invention is preferably electrically switchable, as described, for example, in WO 2009/141295 and in WO 2014/090373.

However, it may also be thermally switchable, as described, for example, in WO 2010/118422. In this case, the switching preferably takes place through a transition from a nematic state to an isotropic state through a change in the temperature of the switching layer comprising the compound of the formula I and a liquid-crystalline medium. In the nematic state, the molecules of the liquid-crystalline medium are in ordered form and thus so is the compound of the formula I, for example aligned parallel to the surface of the device through the action of an alignment layer. In the isotropic state, the molecules are in unordered form, and thus so is the compound of the formula I. The difference between ordered and unordered presence of the dichroic compound of the formula I causes a difference in the light transmissivity of the switching layer of the device according to the invention, in accordance with the principle that dichroic compounds have a higher or lower absorption coefficient depending on the alignment in relation to the plane of vibration of the light.

If the device is electrically switchable, it preferably comprises two or more electrodes, which are installed on both sides of the switching layer. The electrodes preferably consist of ITO or a thin, preferably transparent metal and/or metal-oxide layer, for example silver or FTO (fluorine-doped tin oxide) or an alternative material known to the person skilled in the art for this use. The electrodes are preferably provided with electrical connections. The voltage is preferably provided by a battery, a rechargeable battery or an external power supply.

The switching operation in the case of electrical switching takes place through an alignment of the molecules of the liquid-crystalline medium by the application of voltage.

In a preferred embodiment, the device is converted from a state having high absorption, i.e. low light transmissivity, which is present without voltage, into a state having lower absorption, i.e. higher light transmissivity. The liquid-crystalline medium of the switching layer is preferably nematic in both states. The voltage-free state is preferably characterised in that the molecules of the liquid-crystalline medium, and thus the molecules of the compound of the formula I, are aligned parallel to the plane of the switching layer. This is preferably achieved by a correspondingly selected alignment layer. The state under voltage is preferably characterised in that the molecules of the liquid-crystalline medium, and thus the molecules of the compound of the formula I, are perpendicular to the plane of the switching layer.

In an alternative embodiment to the embodiment mentioned above, the device is converted from a state having low absorption, i.e. high light transmissivity, which is present without voltage, into a state having higher absorption, i.e. lower light transmissivity. The liquid-crystalline medium of the switching layer is preferably nematic in both states. The voltage-free state is preferably characterised in that the molecules of the liquid-crystalline medium of the switching layer, and thus the molecules of the compound of the formula I, are aligned perpendicular to the plane of the switching layer. This is preferably achieved by a correspondingly selected alignment layer. The state under voltage is preferably characterised in that the molecules of the liquid-crystalline medium of the switching layer, and thus the molecules of the compound of the formula I, are parallel to the plane of the switching layer.

According to a preferred embodiment of the invention, the device can be operated without an external power supply by providing the energy required by means of a solar cell or another device for conversion of light and/or heat energy into electrical energy which is connected to the device. The provision of the energy by means of the solar cell can take place directly or indirectly, i.e. via a battery or rechargeable battery or other unit for the storage of energy connected in-between. The solar cell is preferably mounted on the outside of the device or is an internal component of the device, as disclosed, for example, in WO 2009/141295. Particular preference is given here to solar cells which are particularly efficient in the case of diffuse light, and transparent solar cells.

The device according to the invention preferably has the following layer sequence, where further layers may additionally be present. The layers indicated below are preferably directly adjacent to one another in the device:
   substrate layer, preferably comprising glass or polymer
   electrically conductive transparent layer, preferably comprising ITO
   alignment layer
   switching layer comprising one or more compounds of the formula I
   alignment layer
   electrically conductive transparent layer, preferably comprising ITO
   substrate layer, preferably comprising glass or polymer The preferred embodiments of the individual layers are described below.

The device according to the invention preferably comprises one or more, particularly preferably two, alignment layers. The alignment layers are preferably directly adjacent to the two sides of the switching layer comprising the compound of the formula I.

The alignment layers used in the device according to the invention can be any desired layers known to the person skilled in the art for this purpose. Preference is given to polyimide layers, particularly preferably layers comprising rubbed polyimide. Polyimide rubbed in a certain manner known to the person skilled in the art results in alignment of the molecules of the liquid-crystalline medium in the rubbing direction if the molecules are parallel to the alignment layer (planar alignment). It is preferred here for the molecules of the liquid-crystalline medium not to be completely planar on the alignment layer, but instead to have a slight pretilt angle. In order to achieve vertical alignment of the compounds of the liquid-crystalline medium to the surface of the alignment layer (homeotropic alignment), polyimide treated in a certain manner is preferably employed as material for the alignment layer (polyimide for very high pretilt angles). Furthermore, polymers obtained by an exposure process to polarised light can be used as alignment layer in order to achieve alignment of the compounds of the liquid-crystalline medium in accordance with an alignment axis (photo-alignment).

The switching layer in the device according to the invention is furthermore preferably arranged between two substrate layers or enclosed thereby. The substrate layers can consist, for example, of glass or a polymer, preferably a light-transmitting polymer.

The device is preferably characterised in that it does not comprise a polymer-based polariser, particularly preferably does not comprise a polariser in the solid material phase and very particularly preferably comprises no polariser at all.

However, in accordance with an alternative embodiment, the device may also comprise one or more polarisers. The polarisers in this case are preferably linear polarisers.

If precisely one polariser is present, its absorption direction is preferably perpendicular to the orientation axis of the compounds of the liquid-crystalline medium of the device according to the invention on the side of the switching layer on which the polariser is located.

In the device according to the invention, both absorptive and also reflective polarisers can be employed. Preference is given to the use of polarisers which are in the form of thin optical films. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF films (advanced polariser film, 3M, cf. Technical Digest SID 2006, 45.1, US 2011/0043732 and U.S. Pat. No. 7,023,602). It is furthermore possible to employ polarisers based on wire grids (WGPs, wire-grid polarisers) which reflect infrared light. Examples of absorptive polarisers which can be employed in the devices according to the invention are the Itos XP38 polariser film and the Nitto Denko GU-1220DUN polariser film. An example of a circular polariser which can be used in accordance with the invention is the APNCP37-035-STD polariser (American Polarizers). A further example is the CP42 polariser (ITOS).

The device according to the invention furthermore preferably comprises an optical waveguide system which transports the light to a solar cell or another device for the conversion of light and/or heat energy into electrical energy, preferably as described in WO 2009/141295. The optical waveguide system collects and concentrates light hitting the device. It preferably collects and concentrates light emitted by fluorescent dichroic dyes in the switching layer. The optical waveguide system is in contact with a device for the conversion of light energy into electrical energy, preferably a solar cell, so that the collected light hits the latter in concentrated form. In a preferred embodiment of the invention, the device for the conversion of light energy into electrical energy is mounted at the edge of the device according to the invention, integrated into the latter and electrically connected to means for the electrical switching of the device.

In a preferred embodiment, the device according to the invention is a constituent of a window, particularly preferably a window comprising at least one glass surface, very particularly preferably a window which comprises multi-pane insulating glass.

Window here is taken to mean, in particular, a structure in a building which comprises a frame and at least one glass pane surrounded by this frame. It preferably comprises a heat-insulating frame and two or more glass panes (multipane insulating glass).

According to a preferred embodiment, the device according to the invention is applied directly to a glass surface of a window, particularly preferably in the interspace between two glass panes of multipane insulating glass.

The invention furthermore relates to a window comprising a device according to the invention, preferably having the preferred features indicated above.

Owing to the electronic properties of the compounds according to the invention, they are also suitable, besides the use as dye, as organic semiconductors.

The invention therefore furthermore relates to the use of compounds of the formula I in organic electronic components, such as, for example, organic light-emitting diodes (OLEDs), organic field-effect transistors (OFETs), printed circuits, radio frequency identification elements (RFIDs), lighting elements, photovoltaic devices and optical sensors.

Owing to their coloured nature and good solubility in organic materials, the compounds according to the invention are eminently suitable as dyes. The invention therefore likewise relates to the use of dyes of the formula I for colouring a polymer.

The following examples explain the present invention without limiting it. However, they show the person skilled in the art preferred mixture concepts with compounds preferably to be employed and the respective concentrations thereof and combinations thereof with one another. In addition, the examples illustrate which properties and property combinations are accessible.

In the present application and in the examples below, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF₃ | $C_nH_{2n+1}$ | OCF₃ | H | H |
| nOCF₃.F | $C_nH_{2n+1}$ | OCF₃ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

In a preferred embodiment of the present invention, the LC media according to the invention comprise one or more compounds selected from the group consisting of compounds from Tables A and B.

TABLE A

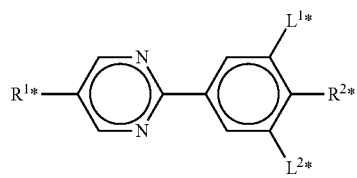

PYP

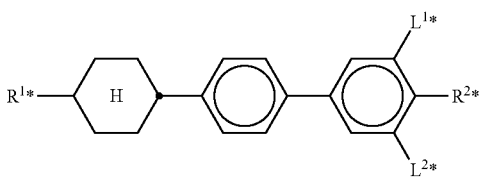

BCH

TABLE A-continued
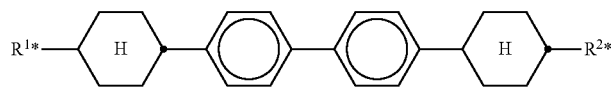
CBC
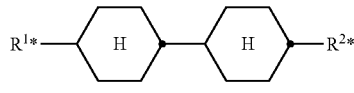
CCH
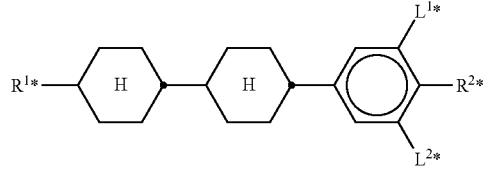
CCP
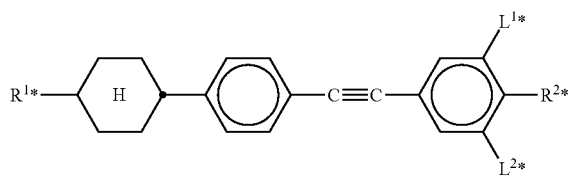
CPTP
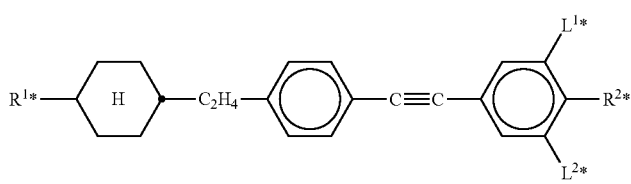
CEPTP
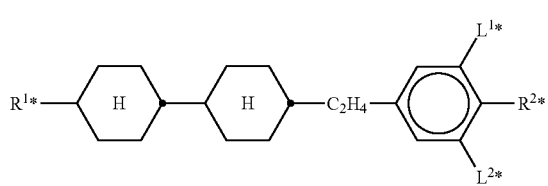
ECCP
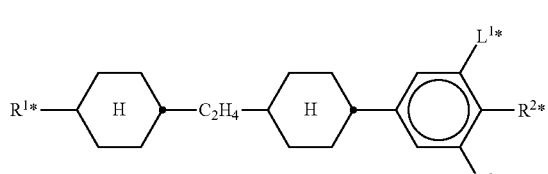
CECP
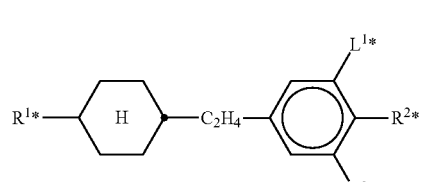
EPCH TABLE A-continued
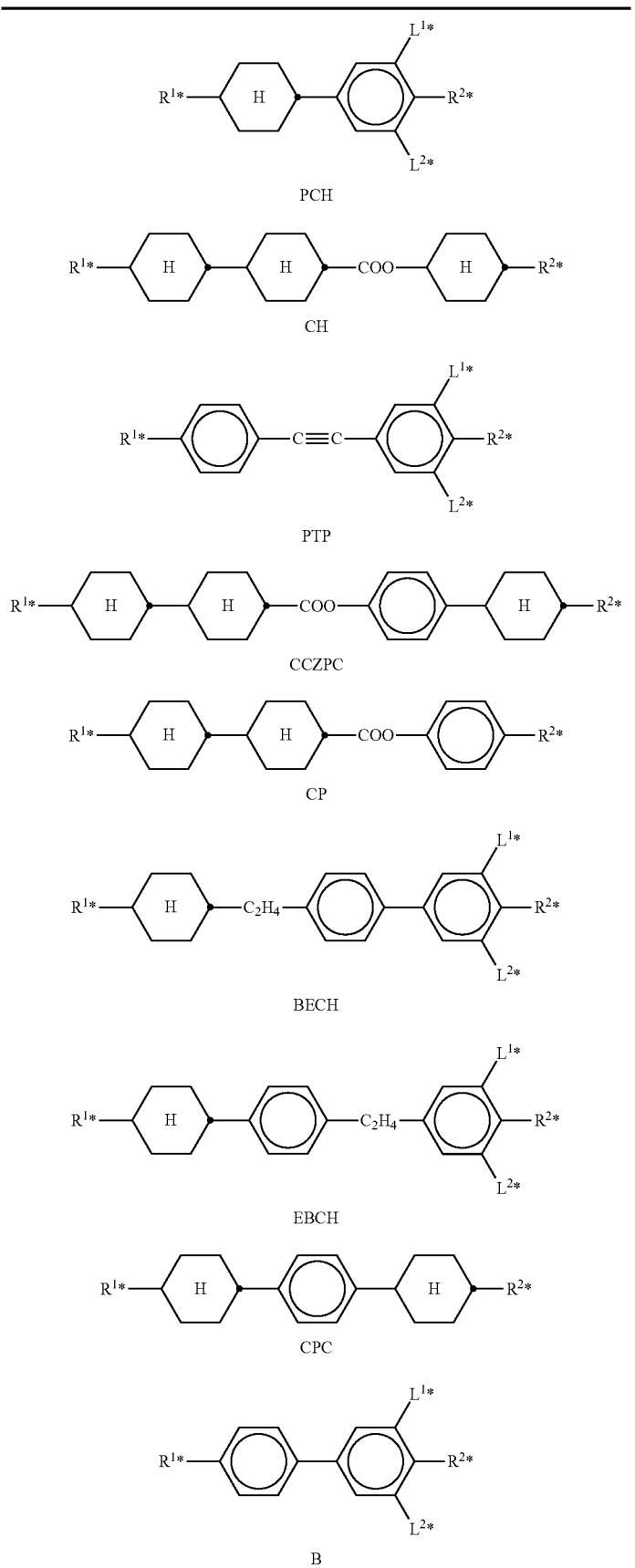

TABLE A-continued
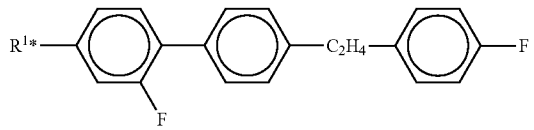
FET-nF
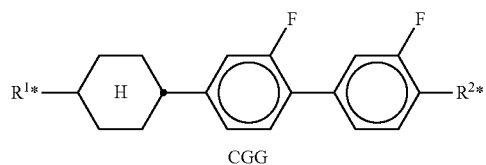
CGG
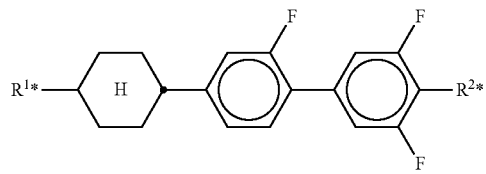
CGU
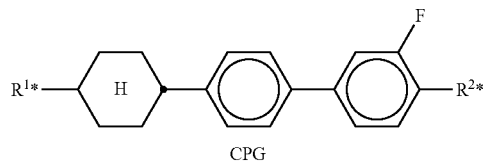
CPG
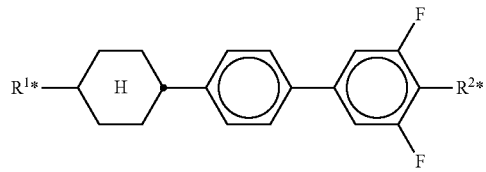
CPU
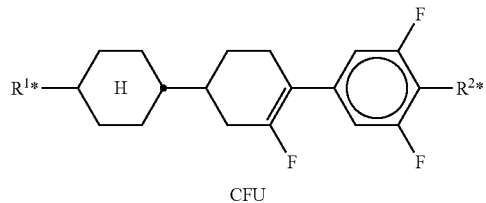
CFU
TABLE B
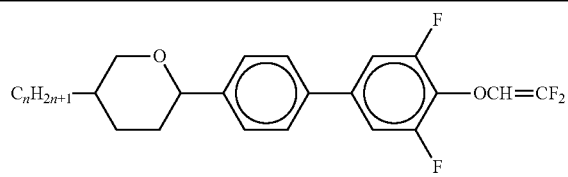
APU-n-OXF TABLE B-continued
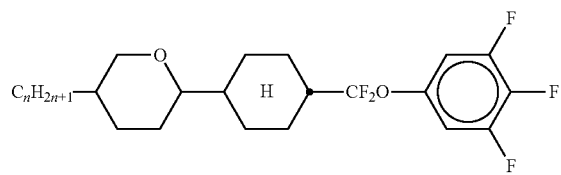
ACQU-n-F
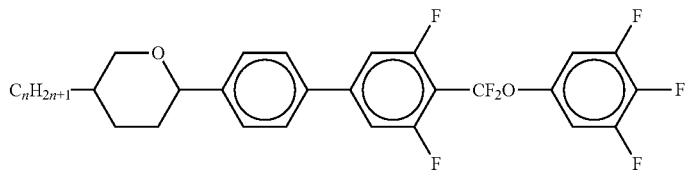
APUQU-n-F
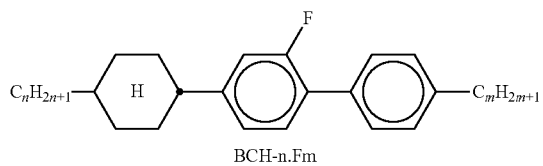
BCH-n.Fm
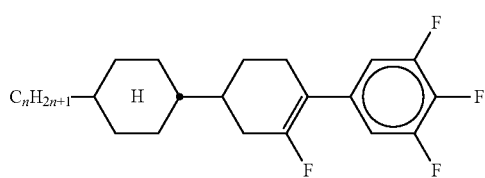
CFU-n-F
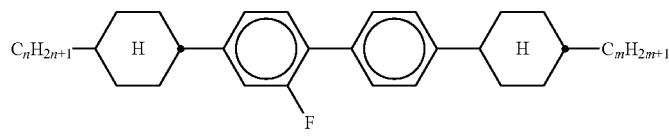
CGPC
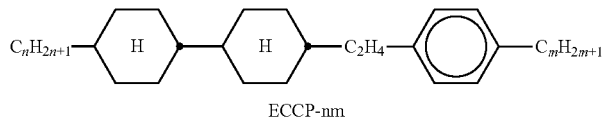
ECCP-nm
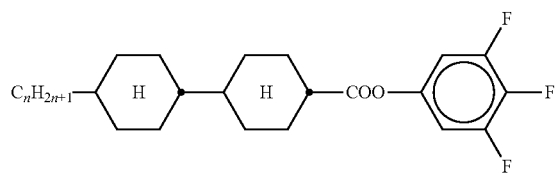
CCZU-n-F
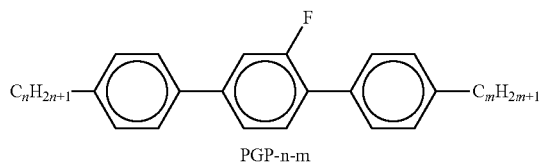
PGP-n-m TABLE B-continued
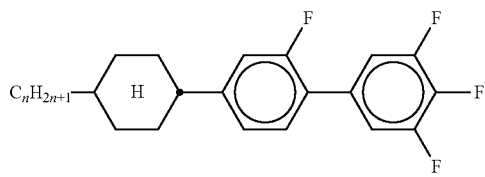
CGU-n-F
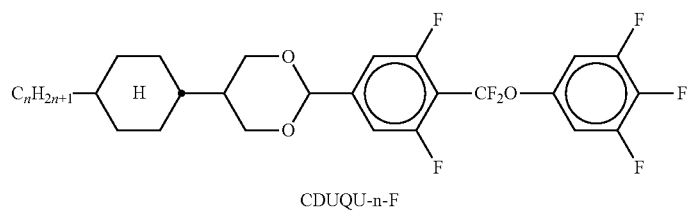
CDUQU-n-F
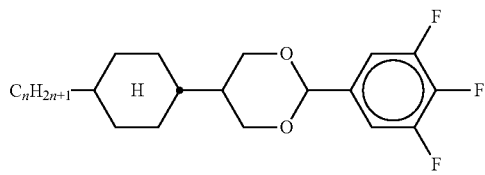
CDU-n-F
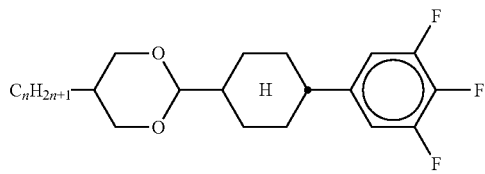
DCU-n-F
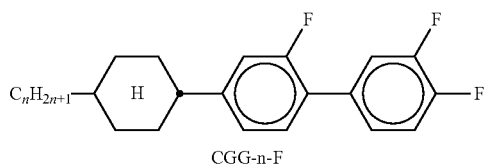
CGG-n-F
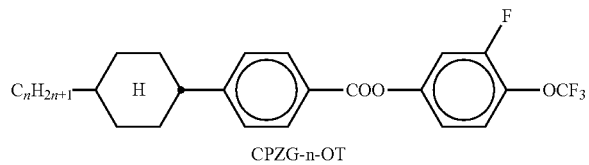
CPZG-n-OT
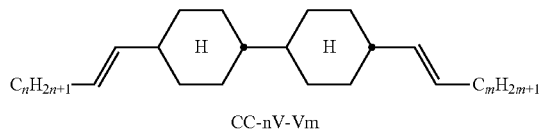
CC-nV-Vm
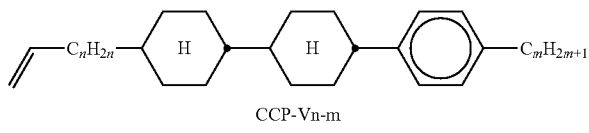
CCP-Vn-m TABLE B-continued
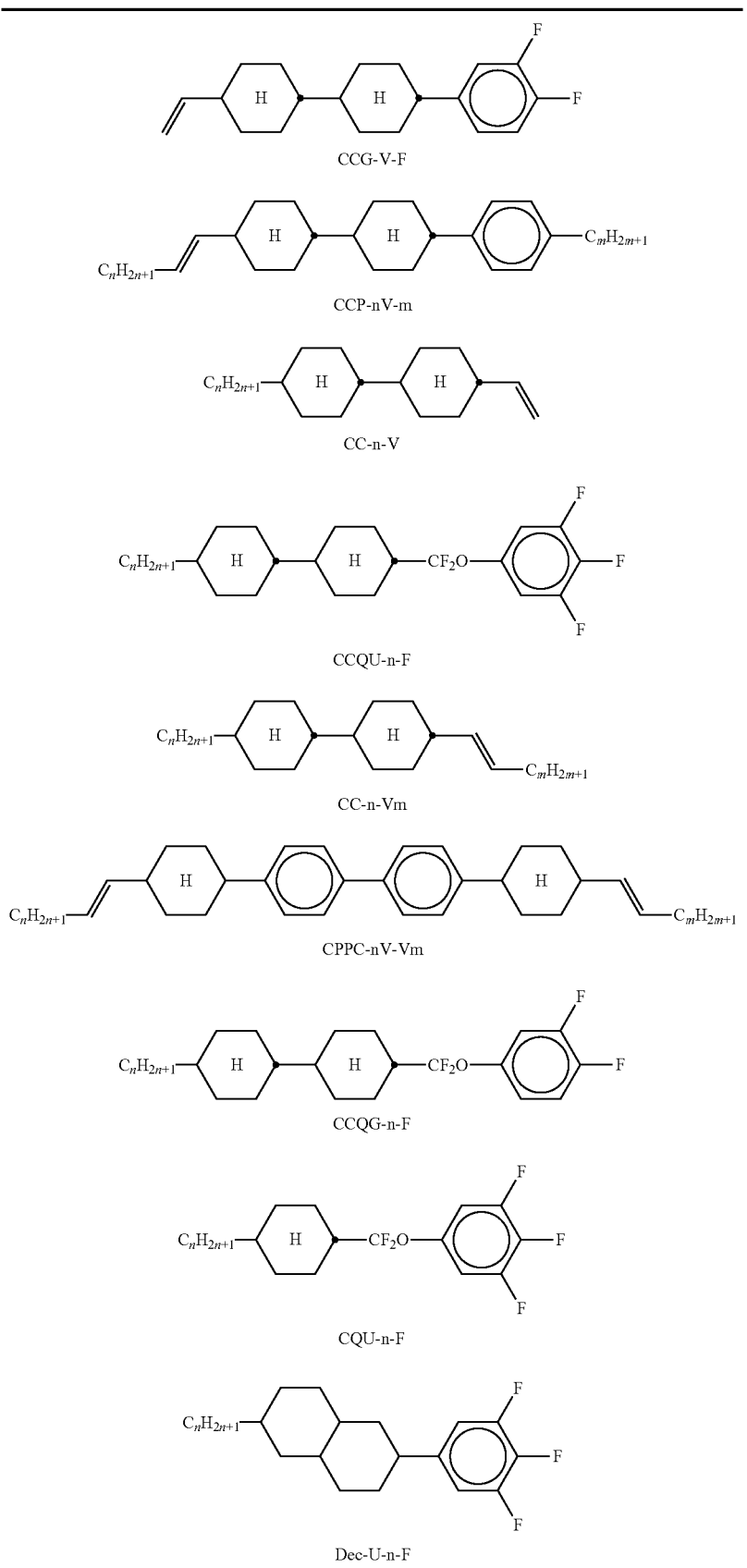

TABLE B-continued
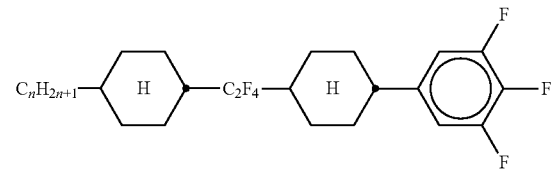
CWCU-n-F
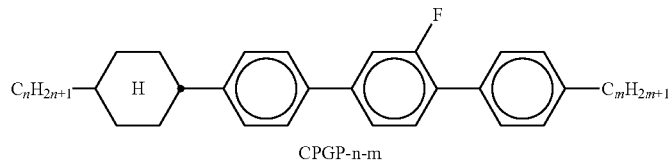
CPGP-n-m
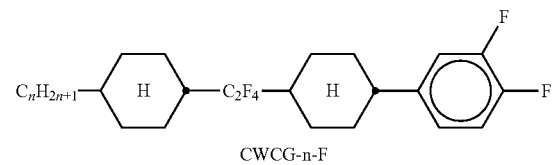
CWCG-n-F
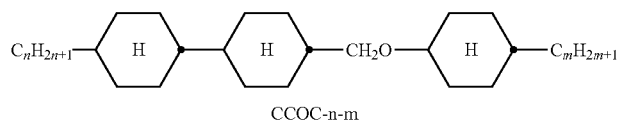
CCOC-n-m
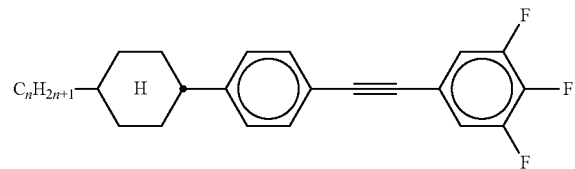
CPTU-n-F
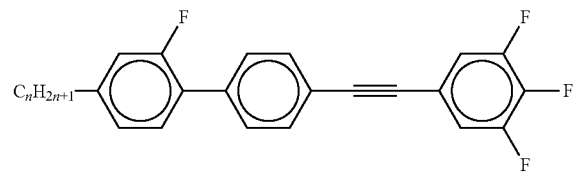
GPTU-n-F
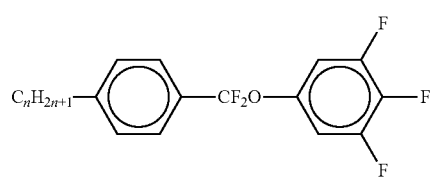
PQU-n-F
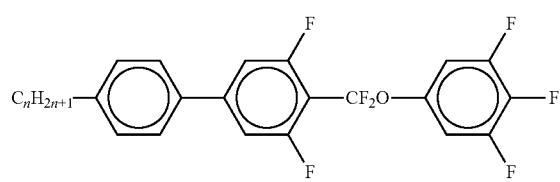
PUQU-n-F TABLE B-continued
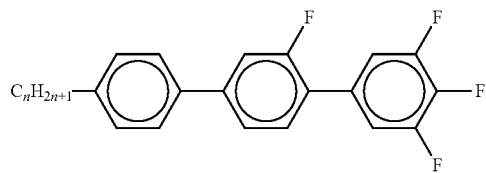
PGU-n-F
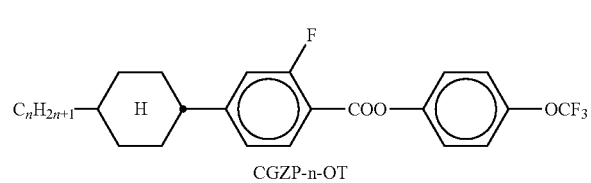
CGZP-n-OT
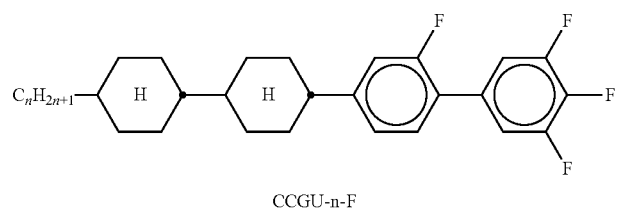
CCGU-n-F
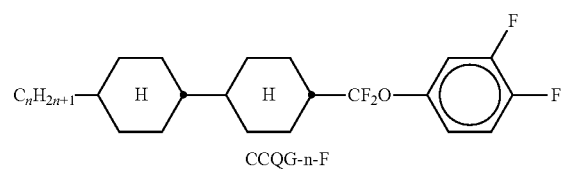
CCQG-n-F
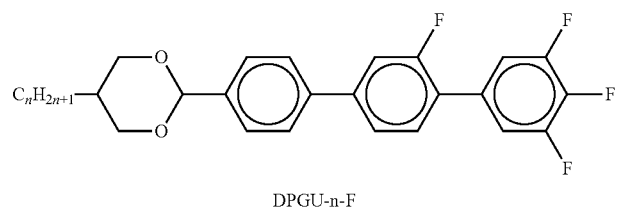
DPGU-n-F
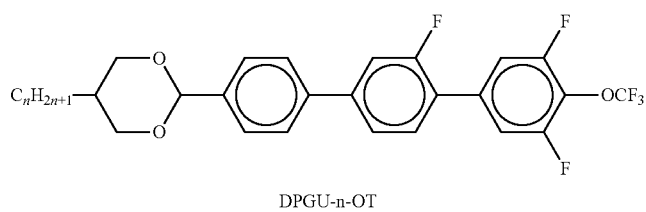
DPGU-n-OT
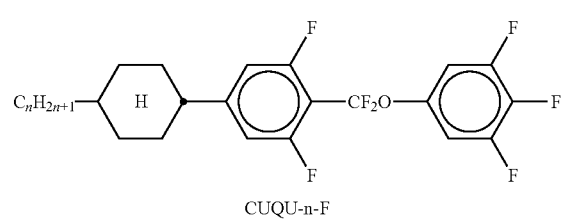
CUQU-n-F TABLE B-continued
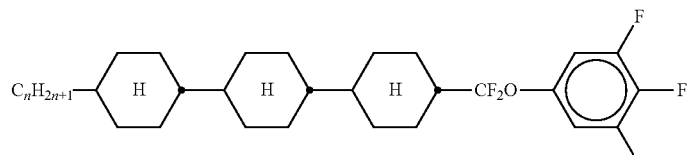
CCCQU-n-F
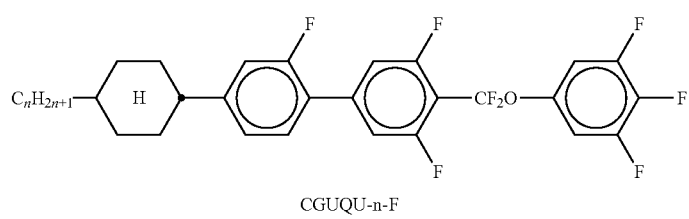
CGUQU-n-F
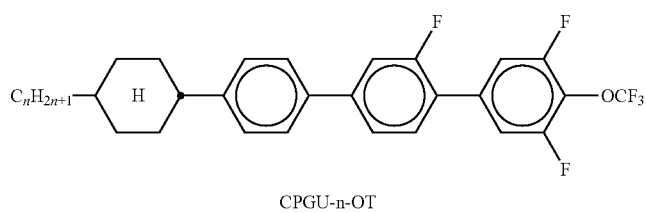
CPGU-n-OT
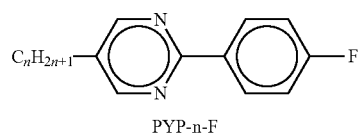
PYP-n-F
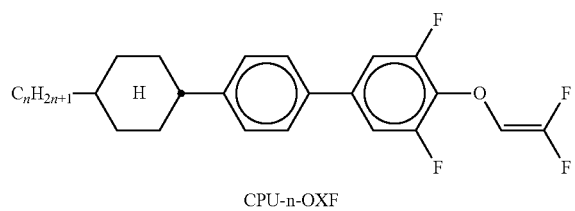
CPU-n-OXF
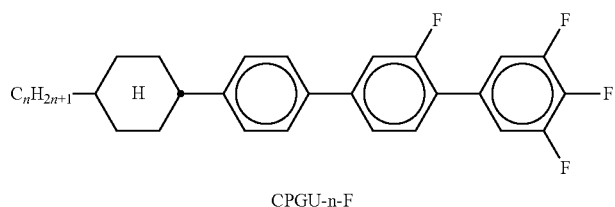
CPGU-n-F
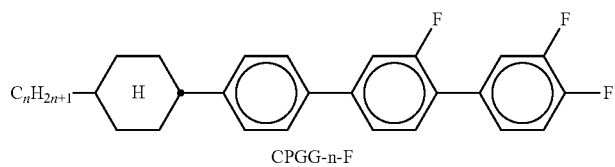
CPGG-n-F
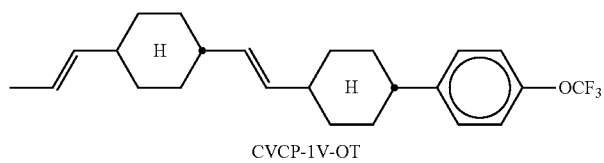
CVCP-1V-OT TABLE B-continued
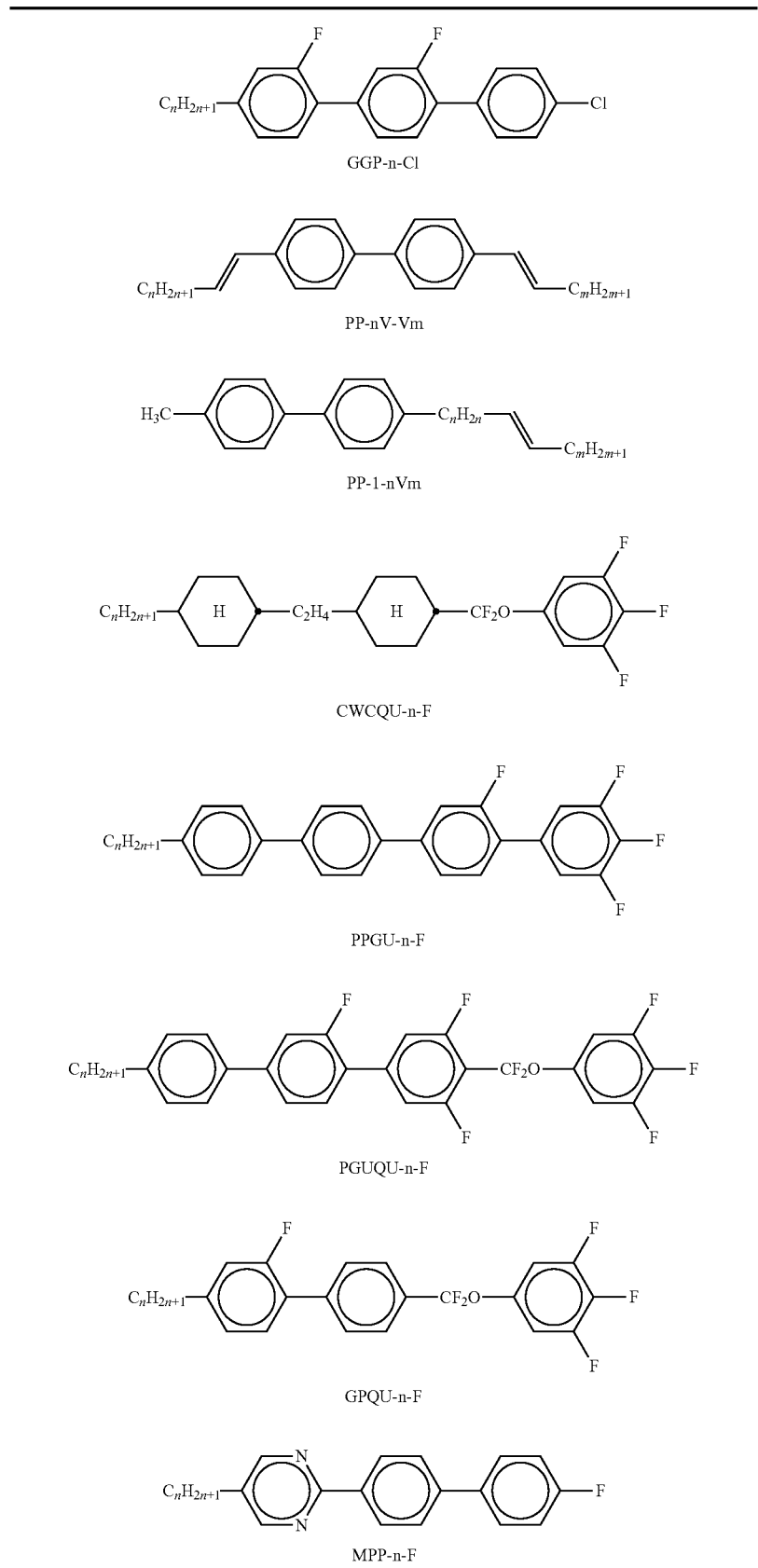

TABLE B-continued

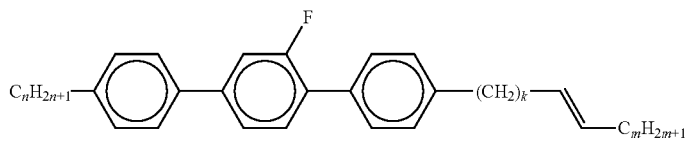
PGP-n-kVm

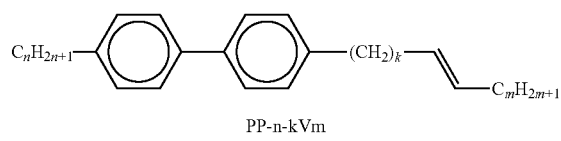
PP-n-kVm

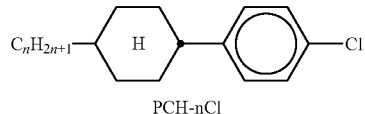
PCH-nCl

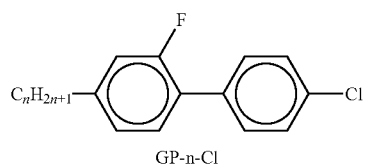
GP-n-Cl

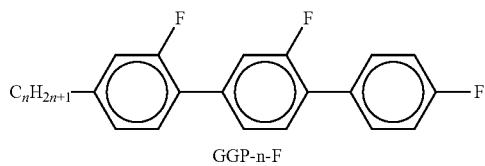
GGP-n-F

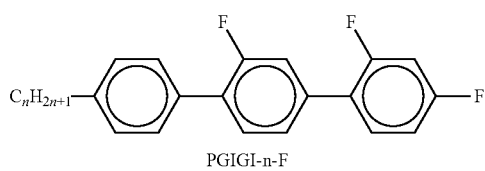
PGIGI-n-F

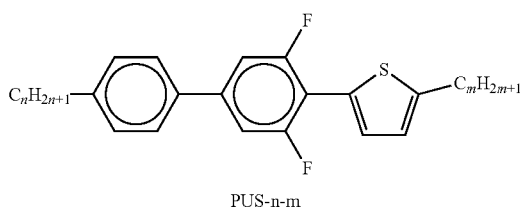
PUS-n-m

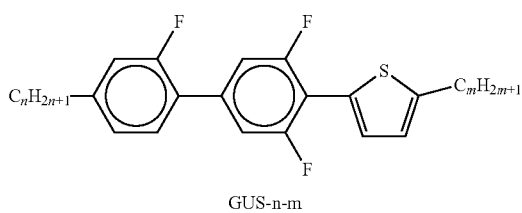
GUS-n-m

It is furthermore preferred for the liquid-crystalline medium of the switching layer to comprise one or more chiral dopants. In this case, the molecules of the liquid-crystalline medium are preferably twisted with respect to one another in the switching layer of the device, particularly preferably as known from the TN mode of displays.

According to an alternative, likewise preferred embodiment, the liquid-crystalline medium of the switching layer comprises no chiral dopants. In this case, the molecules of the liquid-crystalline medium are preferably not twisted with respect to one another in the switching layer of the device.

The LC media preferably comprise 0 to 10% by weight, in particular 0.01 to 5% by weight and particularly preferably 0.1 to 3% by weight of dopants.
The LC media preferably comprise one or more dopants selected from the group consisting of compounds from Table C.
TABLE C
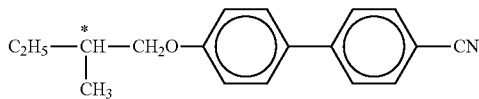
C 15
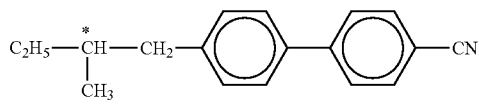
CB 15
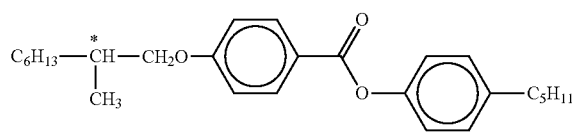
CM 21
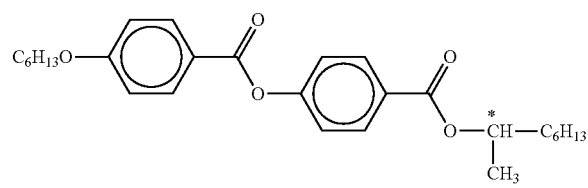
R/S-811
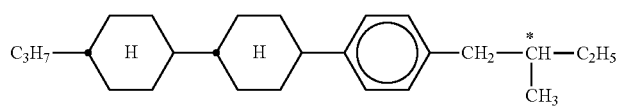
CM 44
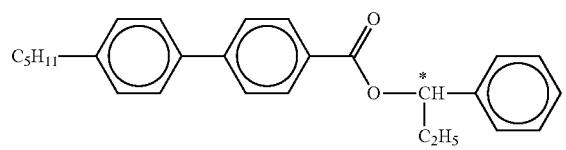
CM 45
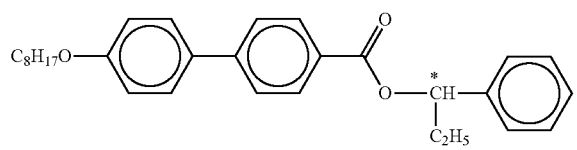
CM 47
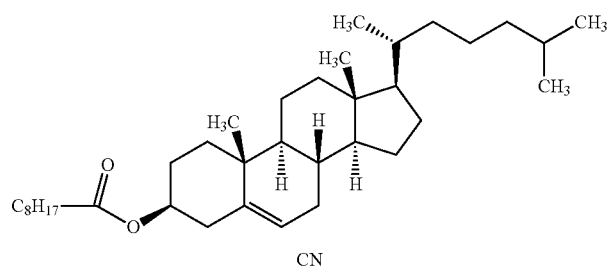
CN TABLE C-continued

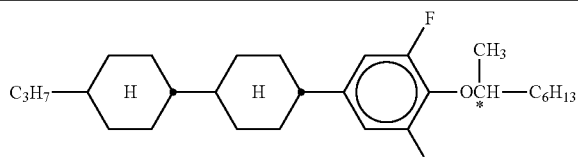

R/S-2011

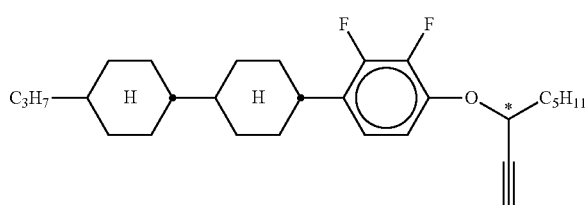

R/S-3011

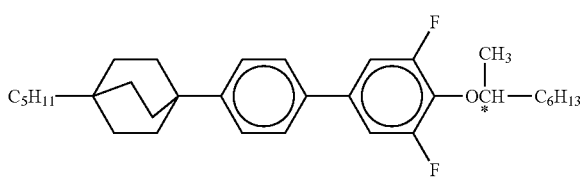

R/S-4011

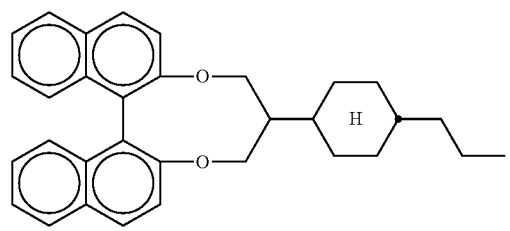

R/S-5011

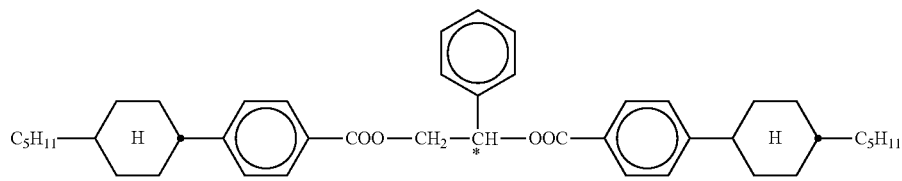

R/S-1011

Table D indicates possible stabilisers which can be added to the LC media according to the invention (n here denotes an integer from 1 to 12). The LC media preferably comprise 0 to 10% by weight, in particular 0.01 to 5% by weight and particularly preferably 0.1 to 3% by weight of stabilisers. The LC media preferably comprise one or more stabilisers selected from the group consisting of compounds from Table D.

TABLE D

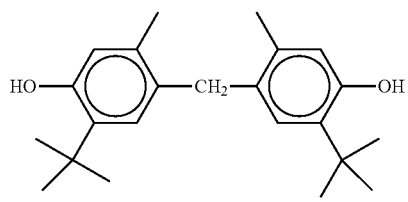

TABLE D-continued
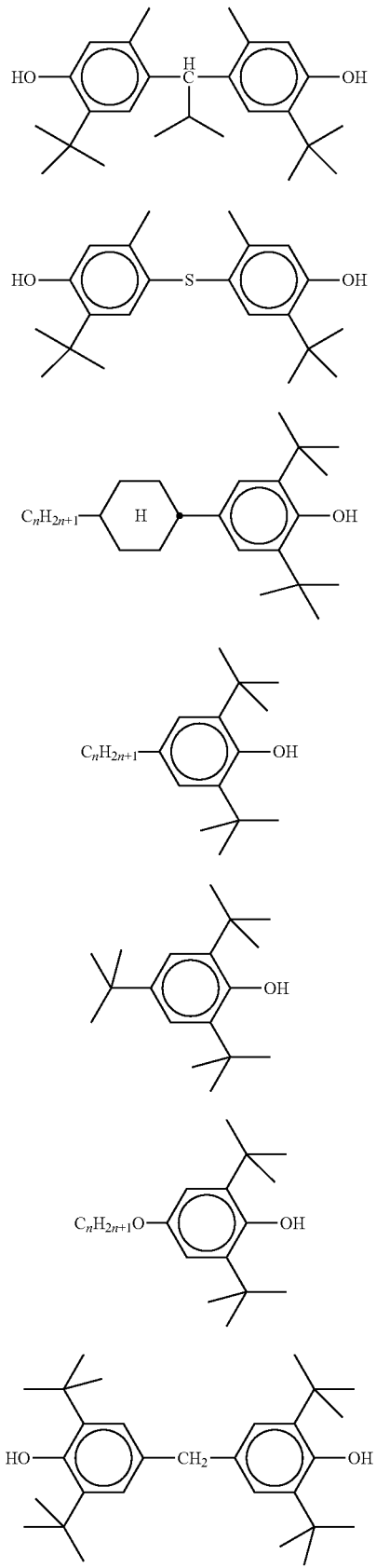

TABLE D-continued
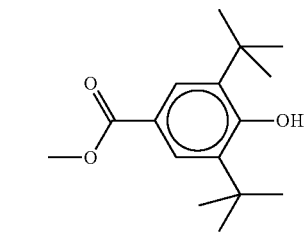
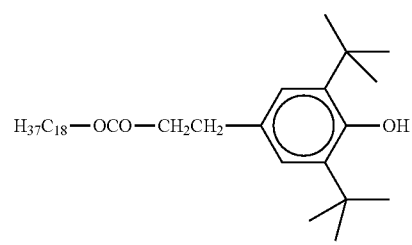
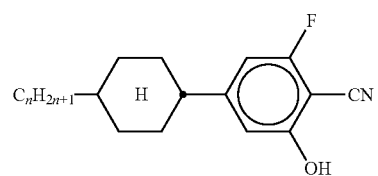
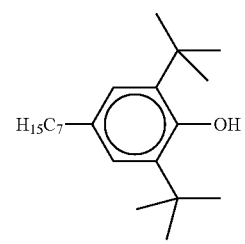
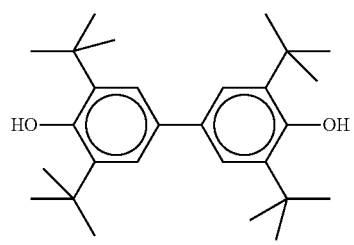

TABLE D-continued
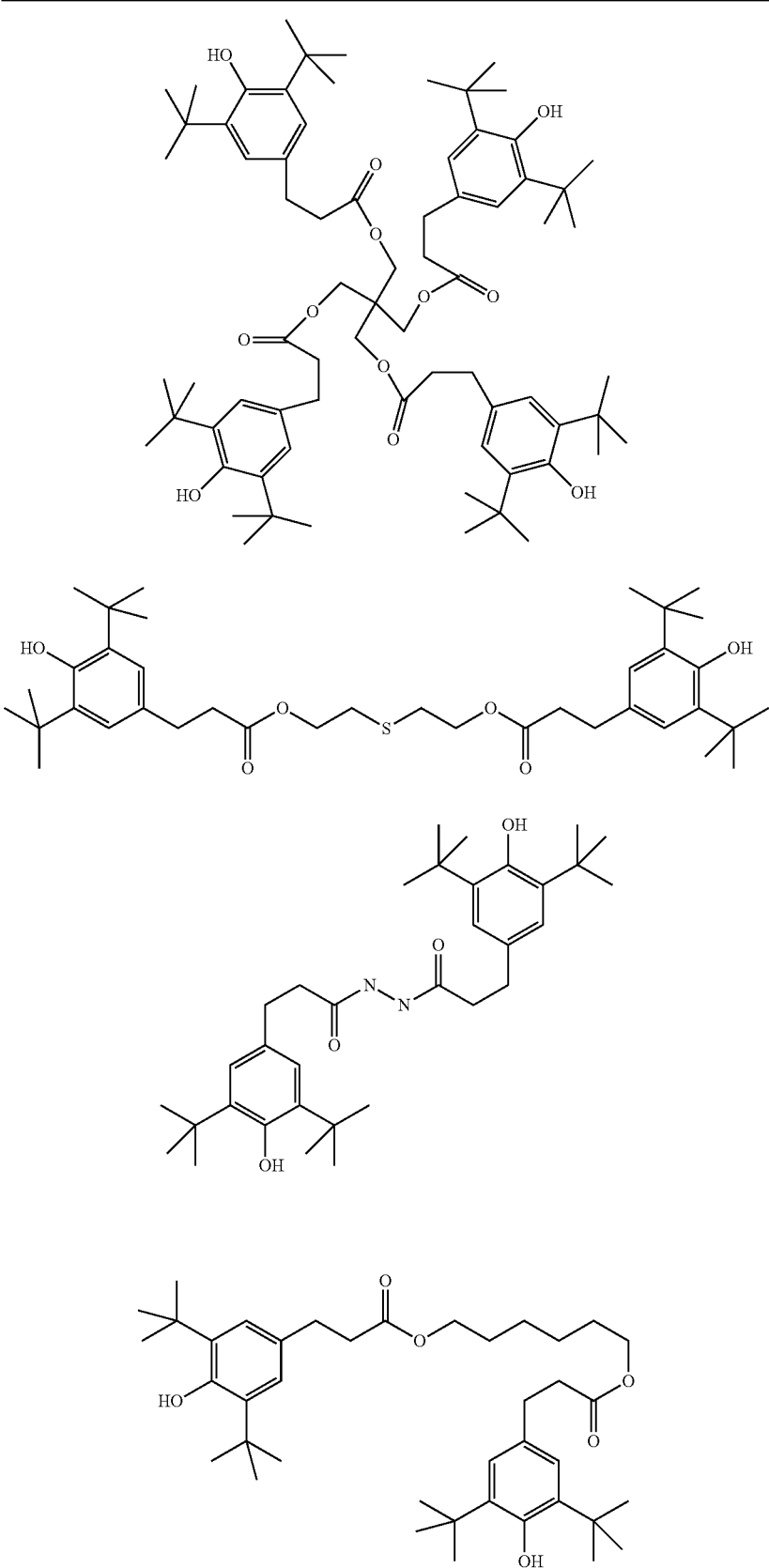

TABLE D-continued
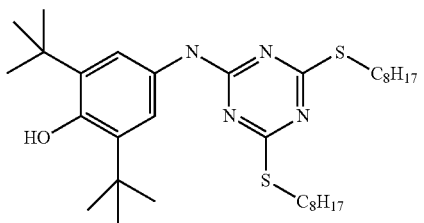
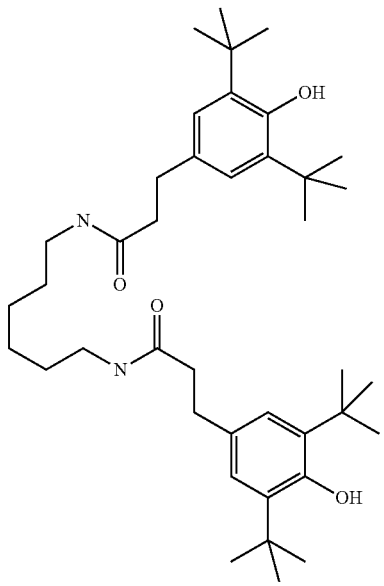 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
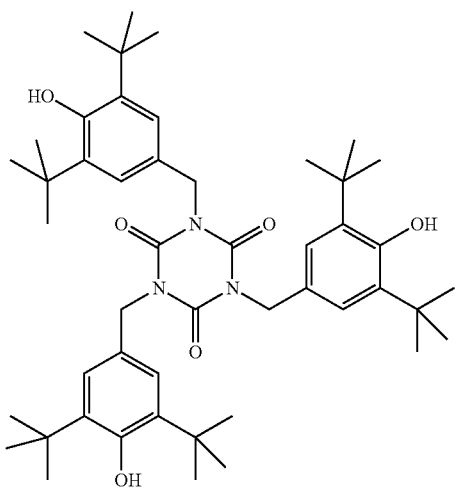 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
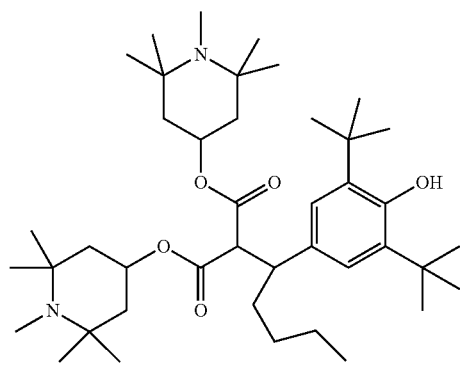 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE D-continued
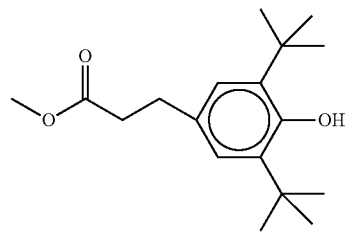
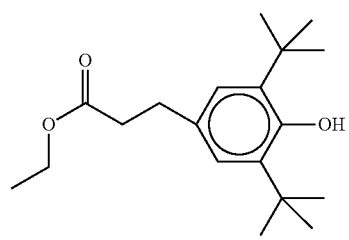
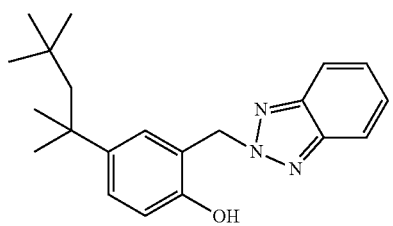 [SMILES: CC(C)(C)CC(C)(C)c1ccc(O)c(Cn2nc3ccccc3n2)c1]
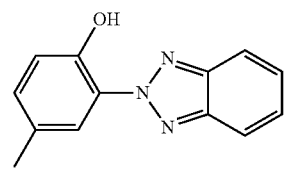 [SMILES: Cc1ccc(O)c(-n2nc3ccccc3n2)c1]
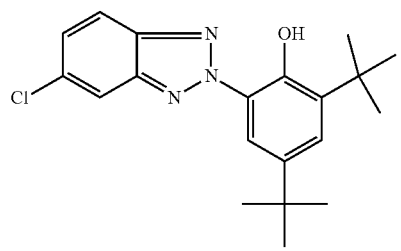 [SMILES: CC(C)(C)c1cc(-n2nc3ccc(Cl)cc3n2)c(O)c(C(C)(C)C)c1]
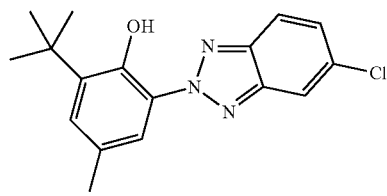 [SMILES: Cc1cc(-n2nc3ccc(Cl)cc3n2)c(O)c(C(C)(C)C)c1]

TABLE D-continued
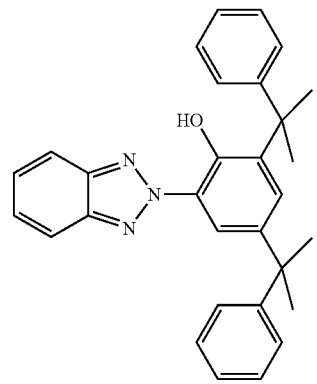 [SMILES: CC(C)(c1ccccc1)c1cc(-n2nc3ccccc3n2)c(O)c(C(C)(C)c2ccccc2)c1]
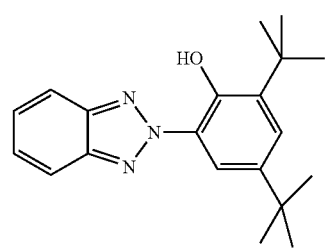 [SMILES: CC(C)(C)c1cc(-n2nc3ccccc3n2)c(O)c(C(C)(C)C)c1]
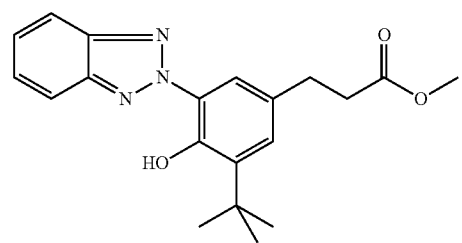 [SMILES: COC(=O)CCc1cc(-n2nc3ccccc3n2)c(O)c(C(C)(C)C)c1]
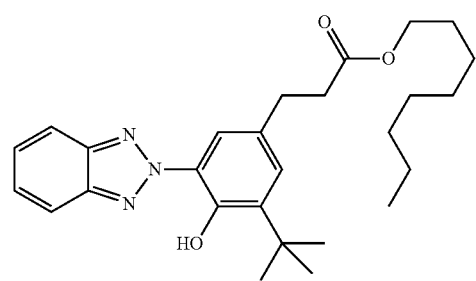 [SMILES: CCCCCCCCOC(=O)CCc1cc(-n2nc3ccccc3n2)c(O)c(C(C)(C)C)c1]

TABLE D-continued
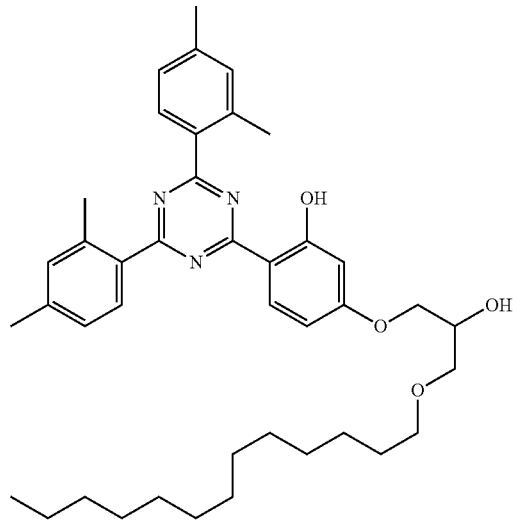 [SMILES: CCCCCCCCCCCCCOCC(O)COc1ccc(-c2nc(-c3ccc(C)cc3C)nc(-c3ccc(C)cc3C)n2)c(O)c1]
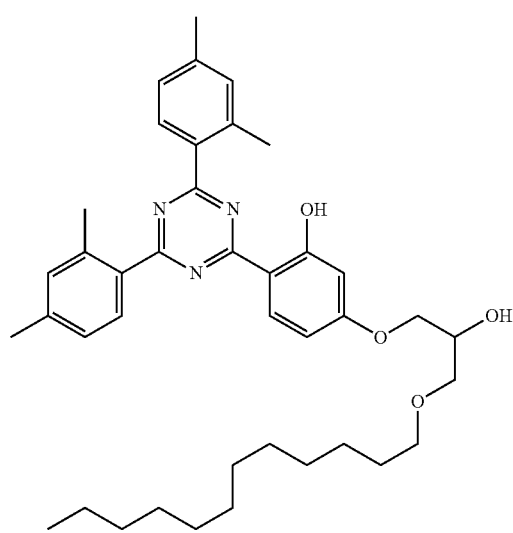 [SMILES: CCCCCCCCCCCCOCC(O)COc1ccc(-c2nc(-c3ccc(C)cc3C)nc(-c3ccc(C)cc3C)n2)c(O)c1]
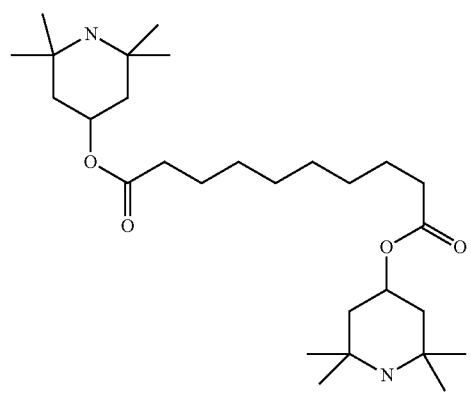

TABLE D-continued

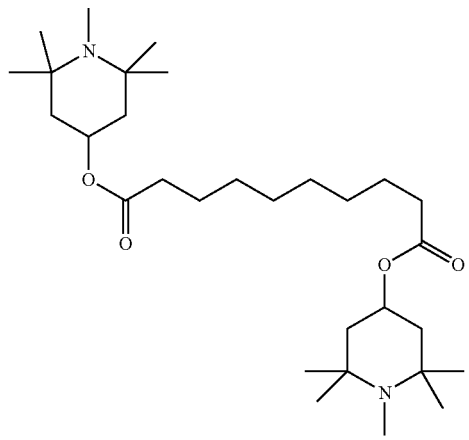

The proportions of these compounds and other components present in minor amounts are neglected when indicating the proportions of the liquid-crystalline compounds and the dichroic dyes.

It goes without saying to the person skilled in the art that the LC media according to the invention may also comprise compounds in which, for example, H, N, O, Cl or F have been replaced by the corresponding isotopes.

All percent data and amount ratios are percent by weight.

EXAMPLES

The present invention is described in detail by the following, non-restrictive example.

All physical properties are determined in accordance with "Merck Liquid Crystals, Physical Properties of Liquid Crystals", Status November 1997, Merck KGaA, Germany, and apply for a temperature of 20° C. The value of Δn is determined at 589 nm, and the value of Δε is determined at 1 kHz, unless explicitly indicated otherwise in each case. $n_e$ and $n_o$ are in each case the refractive indices of the extraordinary and ordinary light beam under the conditions indicated above.

The degree of anisotropy R is determined from the value for the extinction coefficient E(p) (extinction coefficient of the mixture in the case of parallel alignment of the molecules to the polarisation direction of the light) and the value for the extinction coefficient of the mixture E(s) (extinction coefficient of the mixture in the case of perpendicular alignment of the molecules to the polarisation direction of the light), in each case at the wavelength of the maximum of the absorption band of the dye in question. If the dye has a plurality of absorption bands, the strongest absorption band is selected. The alignment of the molecules of the mixture is achieved by an alignment layer, as known to the person skilled in the art in the area of LC display technology. In order to eliminate influences by liquid-crystalline medium, other absorptions or reflections, each measurement is carried out against an identical mixture comprising no dye, and the value obtained is subtracted.

The measurement is carried out using linear-polarised light whose vibration direction is either parallel to the alignment direction (determination of E(p)) or perpendicular to the alignment direction (determination of E(s)). This can be achieved by a linear polariser, where the polariser is rotated with respect to the device in order to achieve the two different vibration directions. The measurement of E(p) and E(s) is thus carried out via the rotation of the vibration direction of the incident polarised light.

The degree of anisotropy R is calculated from the resultant values for E(s) and E(p) in accordance with the formula $$R=[E(p)-E(s)]/[E(p)+2*E(s)],$$

as indicated, inter alia, in "Polarized Light in Optics and Spectroscopy", D. S. Kliger et al., Academic Press, 1990. A detailed description of the method for the determination of the degree of anisotropy of liquid-crystalline media comprising a dichroic dye is also given in B. Bahadur, Liquid Crystals—Applications and Uses, Vol. 3, 1992, World Scientific Publishing, Section 11.4.2.

SYNTHESIS EXAMPLES

Example 1

4,9-Bis-{5-[4-(3-ethylheptyl)-2-fluorophenyl]thiophen-2-yl}-6,7-dimethyl-2-thia-1,3,5,8-tetraazacyclopenta[b]naphthalene [TDC-1]

1.1. 5,6-Dinitro-4,7-bis-{5-[4-(3-ethylheptyl)-2-fluorophenyl]thiophen-2-yl}-benzo-1,2,5-thiadiazole [12]

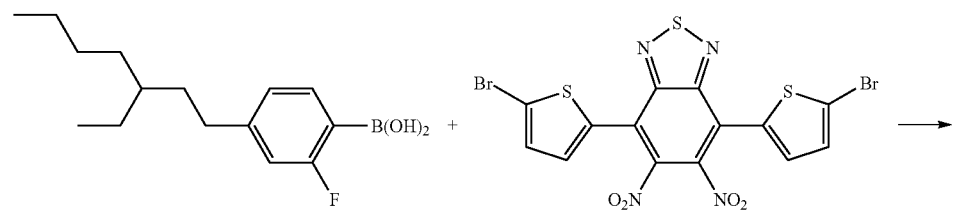

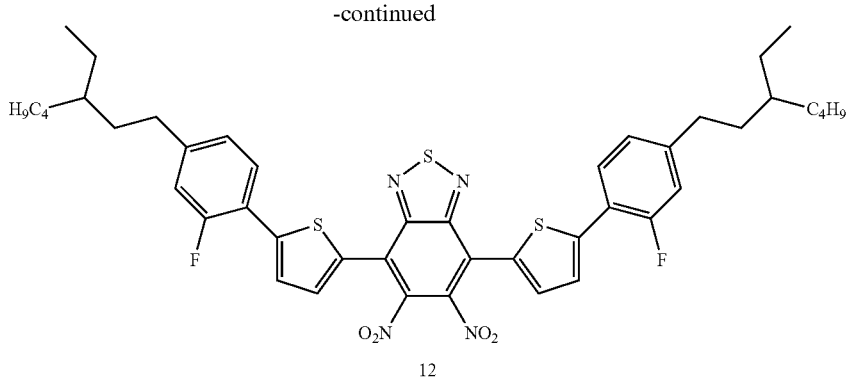

12

A carefully degassed mixture of 4-(3-ethylheptyl)-2-fluorobenzeneboronic acid (2.1 g, 7.7 mmol), 4,7-bis-(5-bromothiophen-2-yl)-5,6-dimethylbenzo-1,2,5-thiadiazole (2.0 g, 3.65 mmol), tris(dibenzylideneacetone)dipalladium(0) (37 mg, 0.04 mmol), tris(o-tolyl)phosphine (50 mg, 0.16 mmol), toluene (65 ml) and 2 M aqueous $Na_2CO_3$ solution (40 ml) is heated under reflux under an argon atmosphere for 18 h. The batch is allowed to cool, subjected to conventional work-up, and the crude product is purified by chromatography ($SiO_2$; toluene/n-heptane 2:3). Subsequent crystallisation from toluene/n-heptane 1:1 gives 5,6-dinitro-4,7-bis-{5-[4-(3-ethylheptyl)-2-fluorophenyl]thiophen-2-yl}benzo-1,2,5-thiadiazole (11) as a yellowish solid.

1.2. 5,6-Diamino-4,7-bis-{5-[4-(3-ethylheptyl)-2-fluorophenyl]thiophen-2-yl}-benzo-1,2,5-thiadiazole [13]

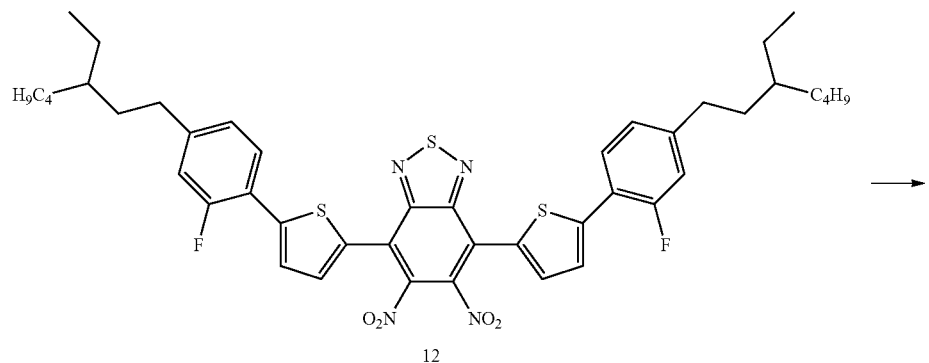

12

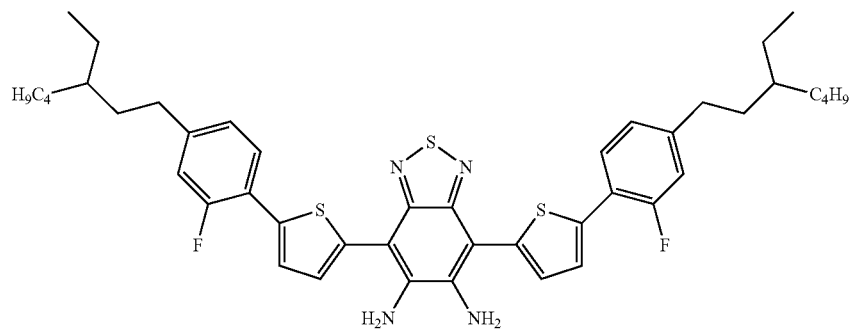

13

A solution of 5,6-dinitro-4,7-bis-{5-[4-(3-ethylheptyl)-2-fluorophenyl]-thiophen-2-yl}benzo-1,2,5-thiadiazole (6.3 g, 7.5 mmol) in THF (65 ml) is hydrogenated in the presence of nickel sponge catalyst (Johnson-Matheson A-7000) at atmospheric pressure and room temperature until the equivalent amount of hydrogen has been taken up. Filtration and evaporation to dryness gives 5,6-diamino-4,7-bis-{5-[4-(3-ethylheptyl)-2-fluorophenyl]thiophen-2-yl}benzo-1,2,5-thiadiazole (13) as a brownish resin, which is employed in the next step without further purification.

1.3. 4,9-Bis-{5-[4-(3-ethylheptyl)-2-fluorophenyl]thiophen-2-yl}-6,7-dimethyl-2-thia-1,3,5,8-tetraaza-cyclopenta[b]naphthalene [TDC-1]

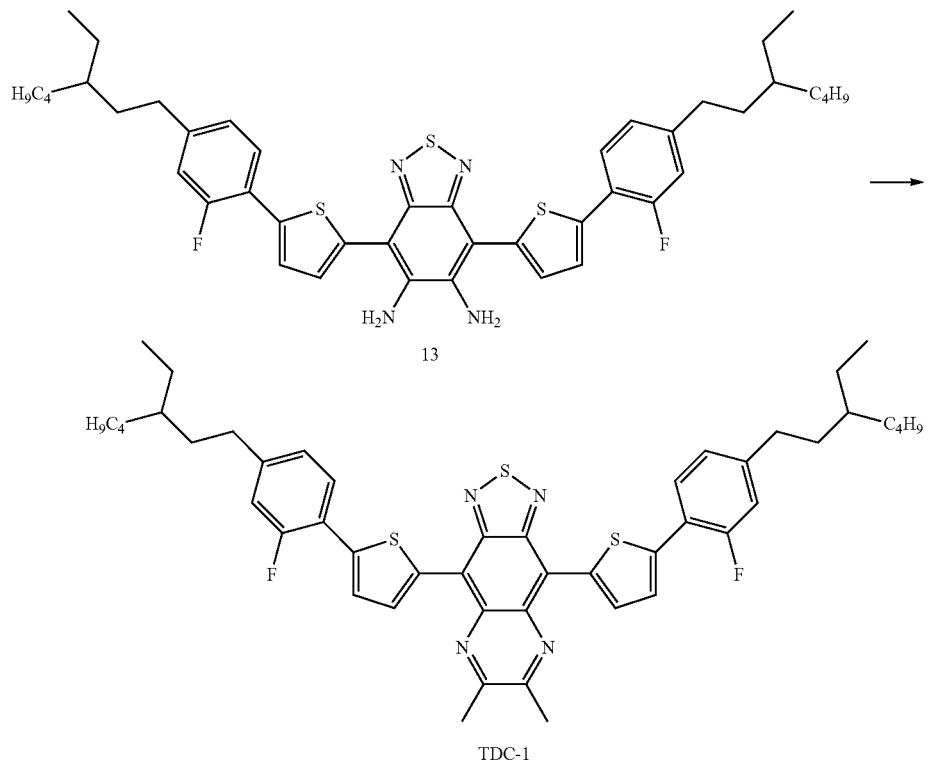

Diacetyl (1.3 ml, 15 mmol) is added to a solution of 13 (5.8 g, 7.5 mmol) in methanol (300 ml), and the mixture is heated under reflux for 18 h. The mixture is subjected to conventional aqueous work-up, and the crude product is purified by chromatography (SiO$_2$; n-heptane/toluene 1:1). Subsequent crystallisation from n-heptane gives 5,6-diamino-4,7-bis-{5-[4-(3-ethyl-heptyl)-2-fluorophenyl]thiophen-2-yl}benzo-1,2,5-thiadiazole as a blue solid of m.p. 160° C.

The following compounds are obtained analogously to Example 1:

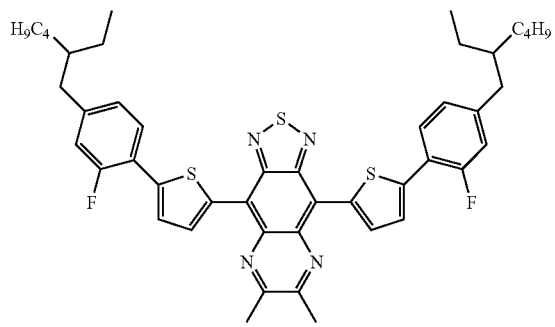

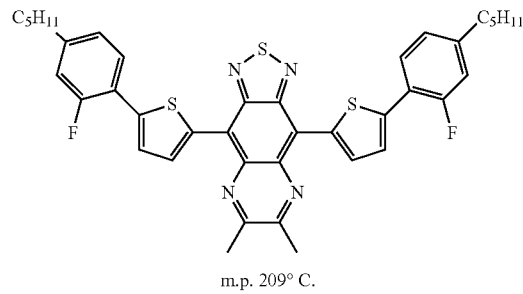

-continued
TDC-4
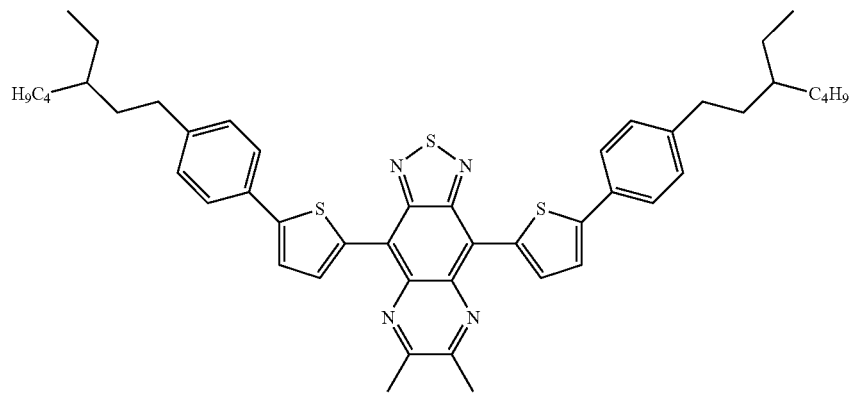
TDC-5
TDC-6
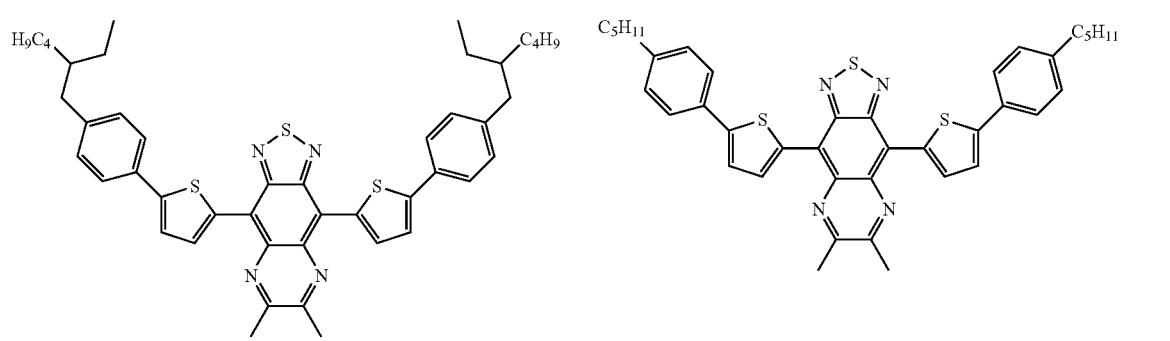
TDC-7
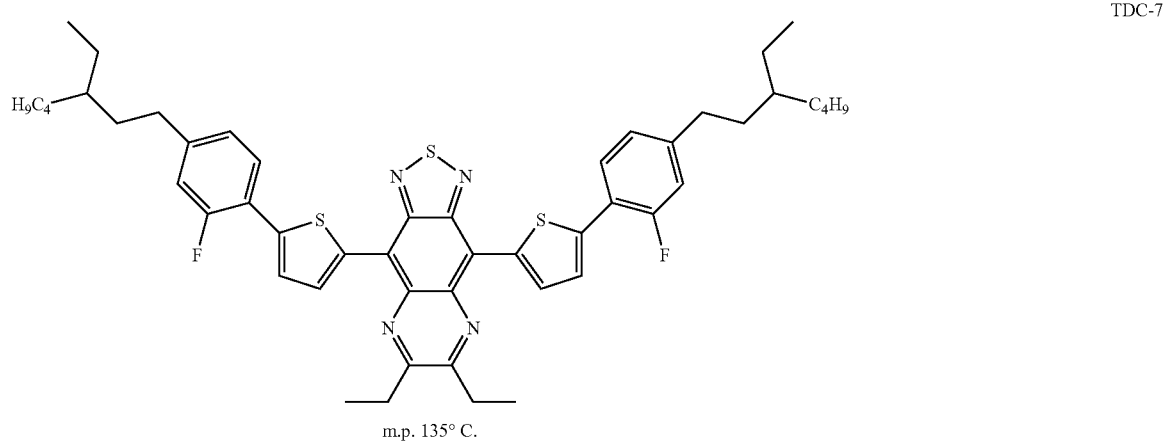
m.p. 135° C.
TDC-8
TDC-9
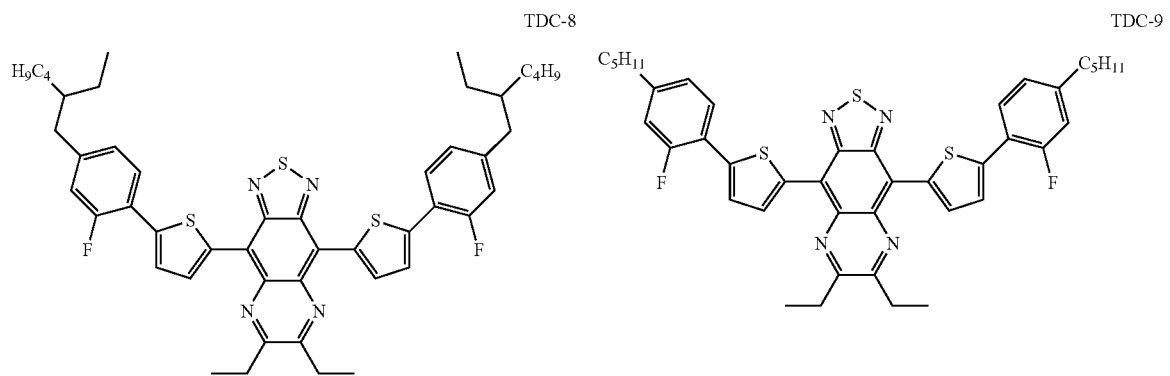

TDC-10
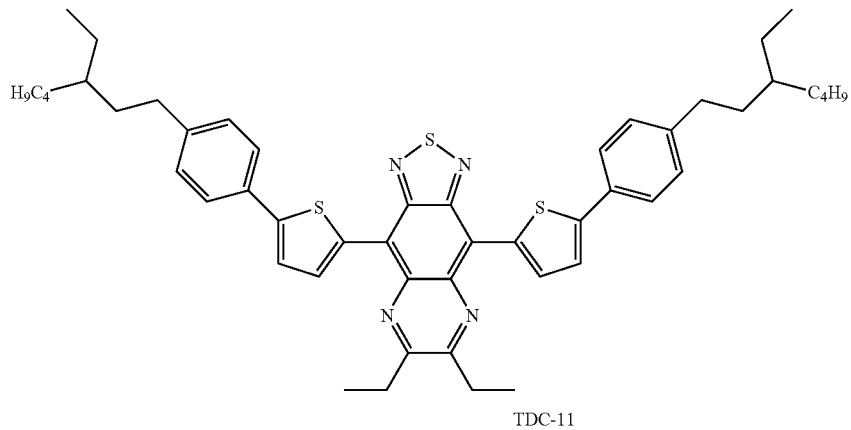
TDC-11
TDC-12
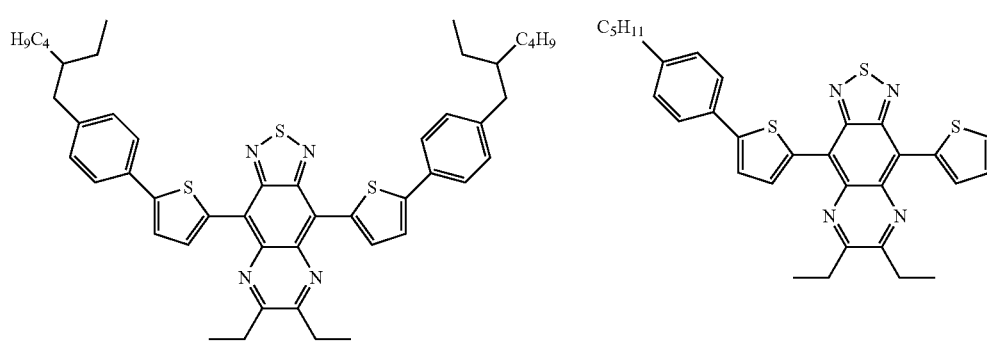
TDC-13
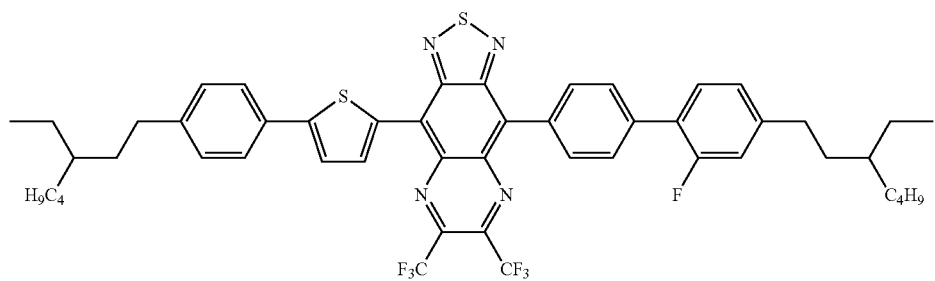
TDC-14
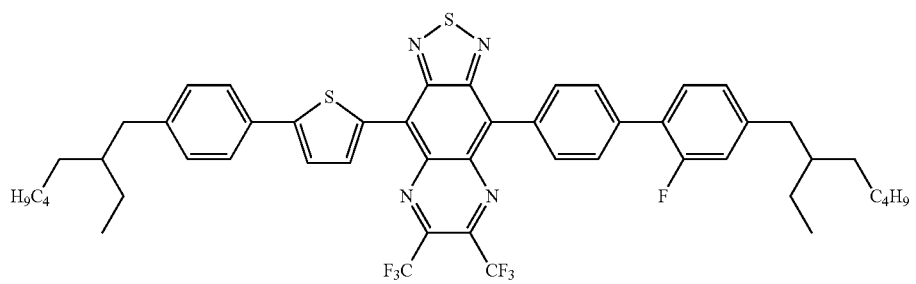
TDC-15
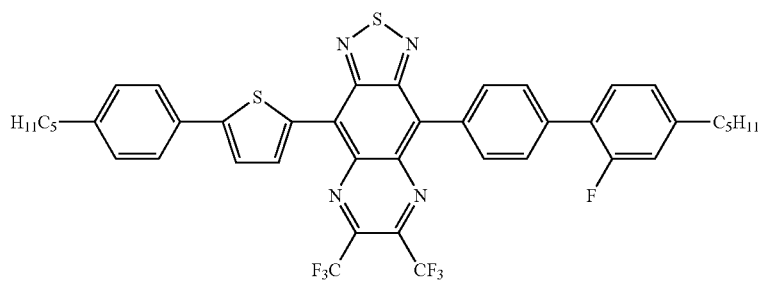

-continued
TDC-16
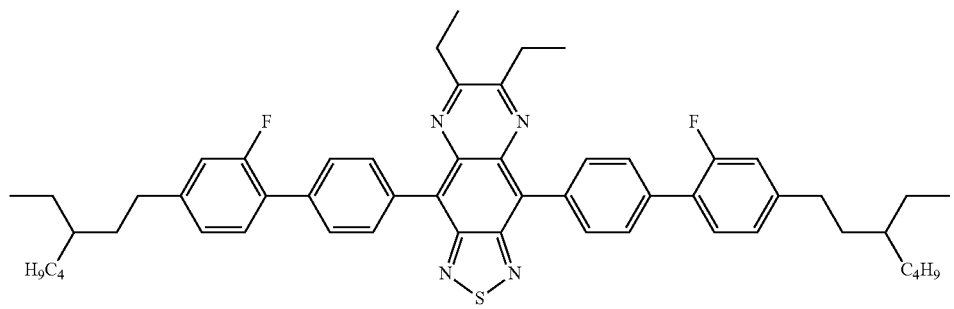
TDC-17
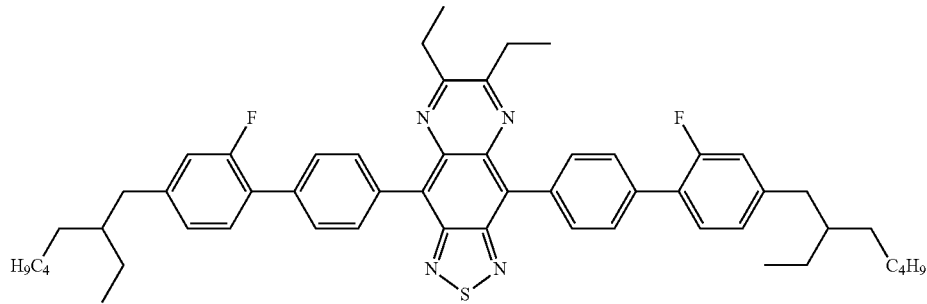
TDC-18
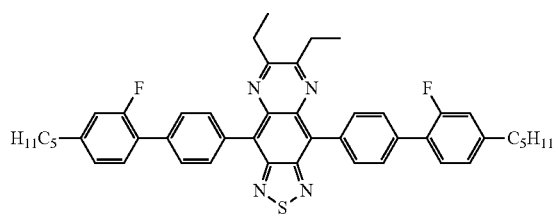
TDC-19
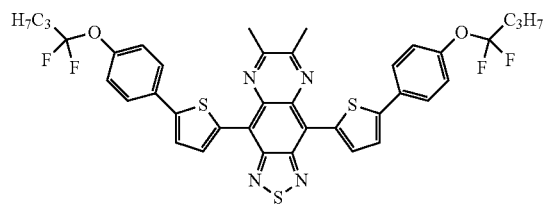
TDC-20
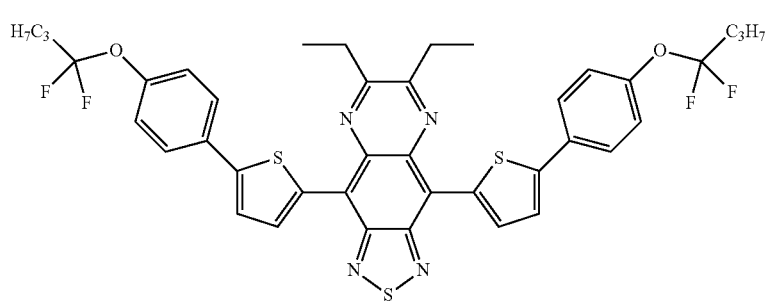
TDC-21
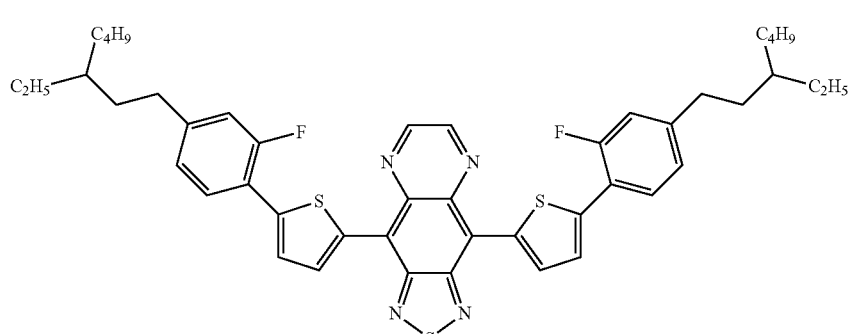
m.p. 155° C.

-continued
TDC-22
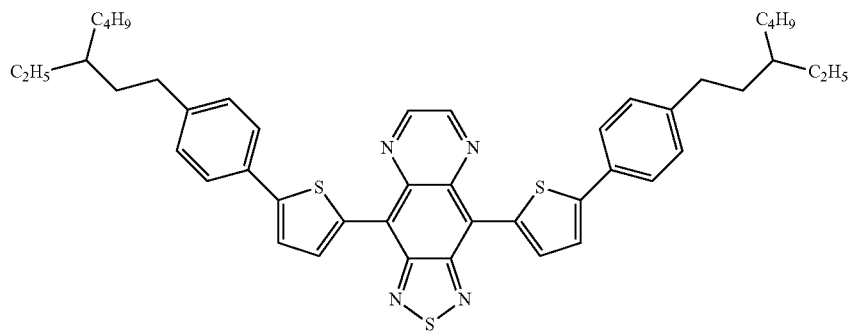
TDC-23
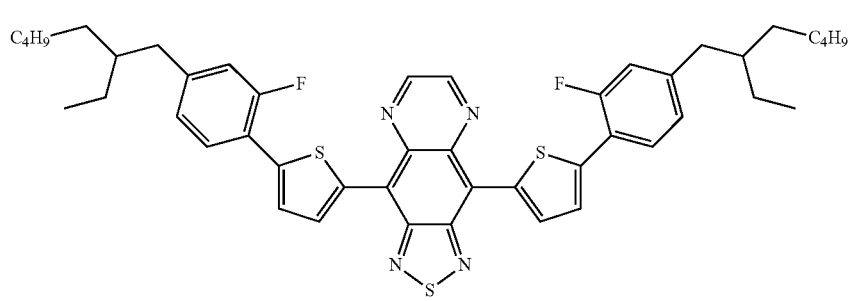
TDC-24
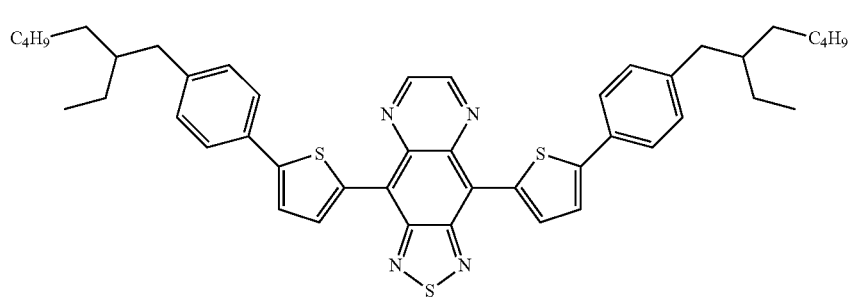
TDC-25
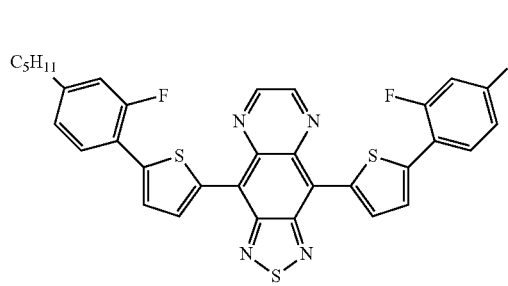
TDC-26
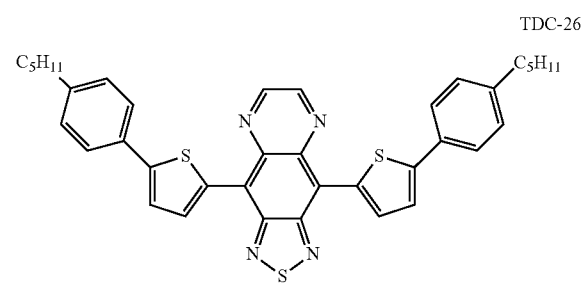
TDC-27
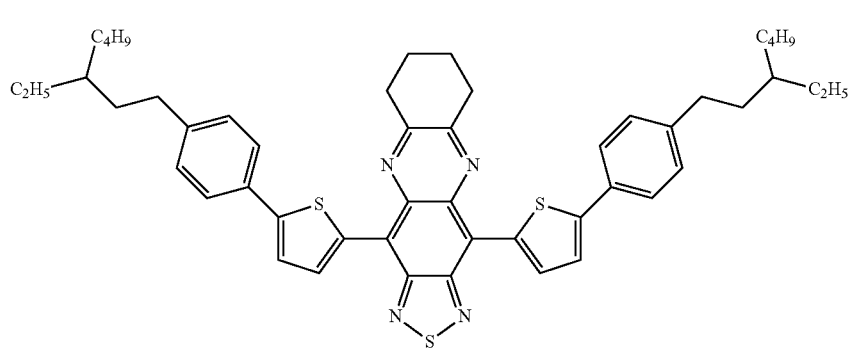

-continued
TDC-28
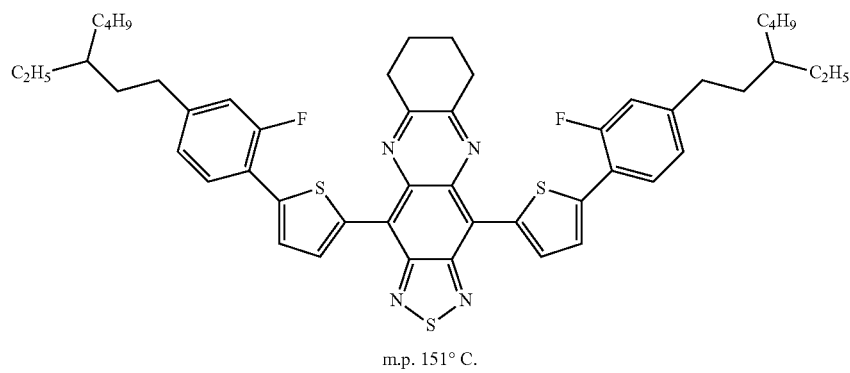
m.p. 151° C.
TDC-29
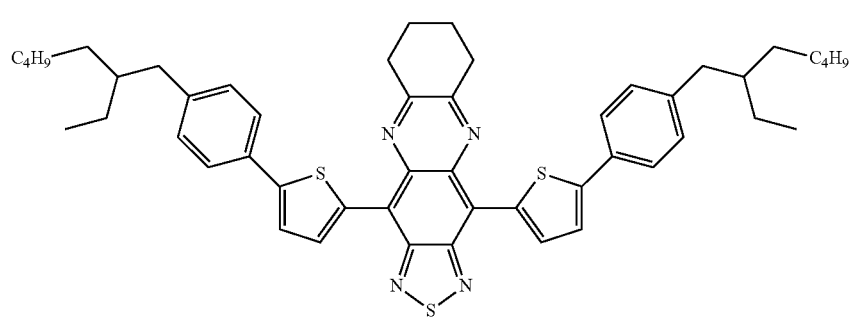
TDC-30
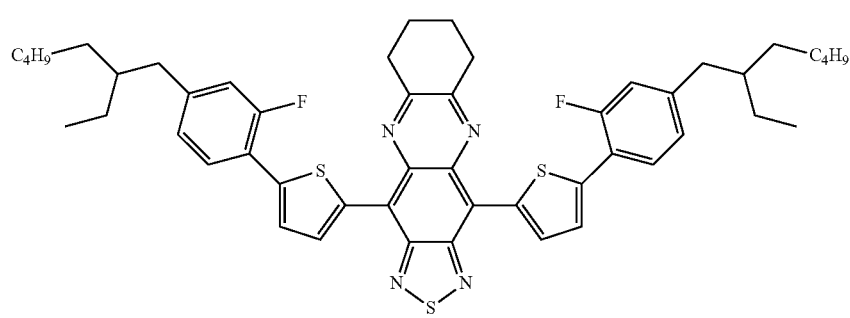
TDC-31 TDC-32
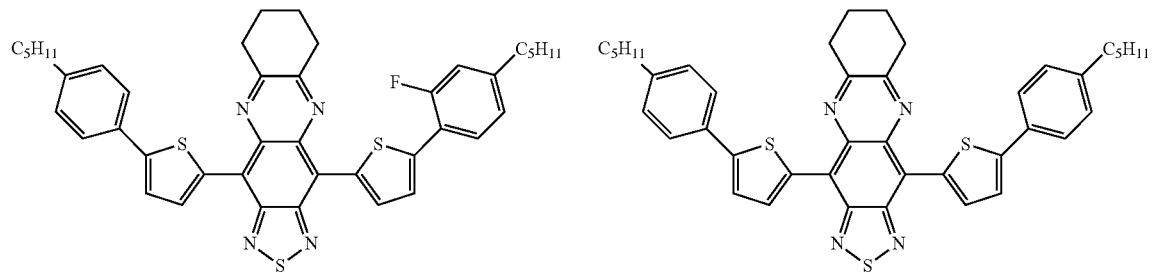
TDC-33
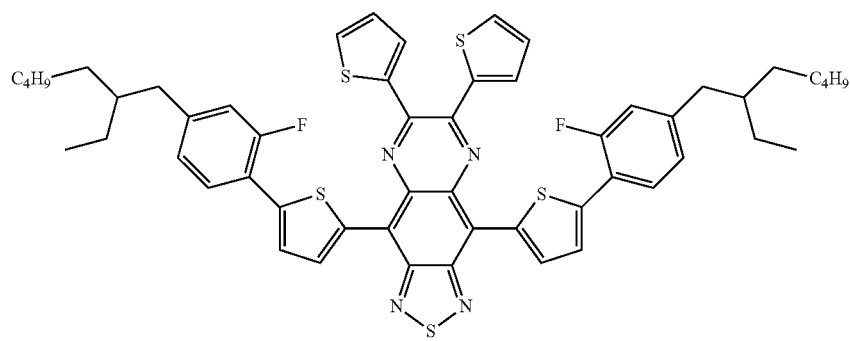

-continued
TDC-34
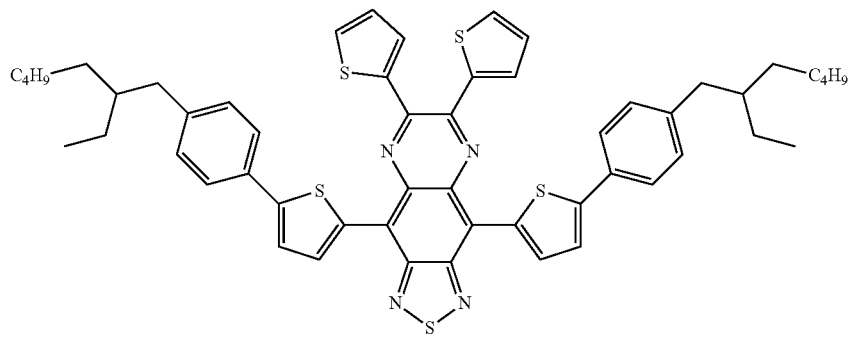
TDC-35
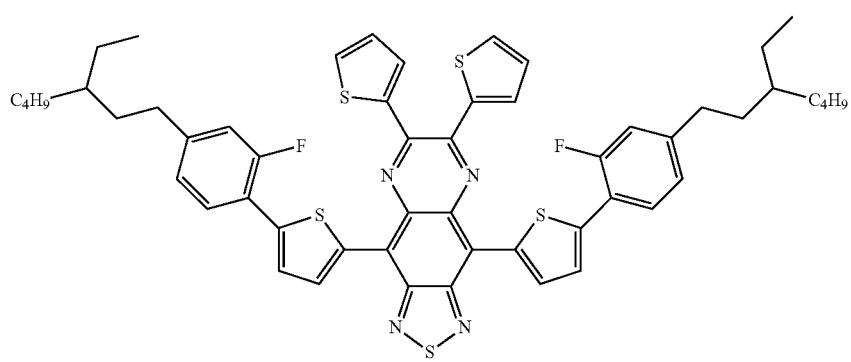
TDC-36
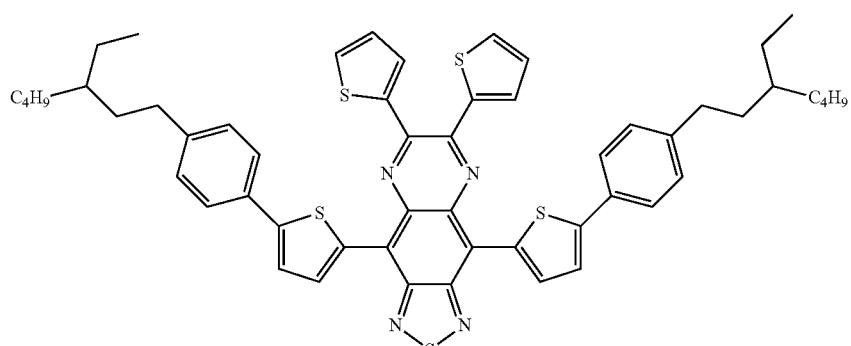
m.p. 163° C.
TDC-37
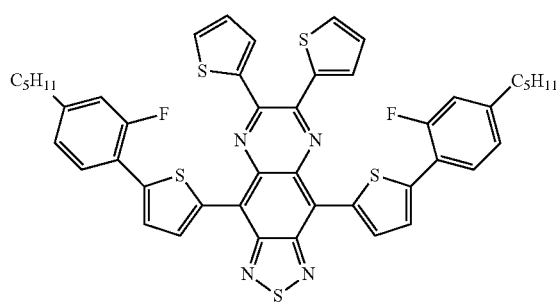
TDC-38
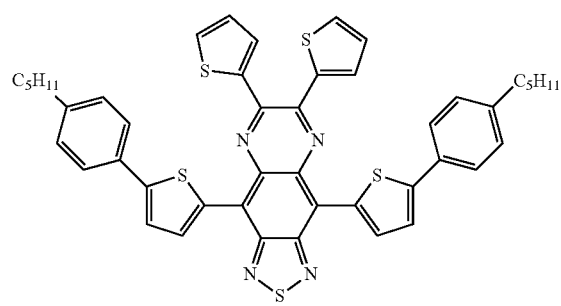

TDC-39

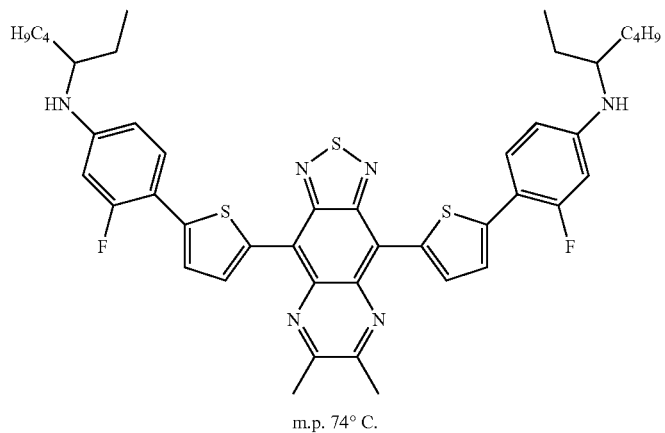

m.p. 74° C.

USE EXAMPLES

The dyes prepared are investigated with respect to their physical properties in order to establish their suitability for use in devices for regulating energy transmission. For comparison, the corresponding properties for compounds D-1 and D-2 (structure see below) are indicated.

Preparation of Liquid-Crystalline Dye Mixtures

An LC base mixture G-1 is prepared as follows:

| | | | |
|---|---|---|---|
| CPG-3-F | 5% | Clearing point [° C.] | 114.5 |
| CPG-5-F | 5% | Δn | 0.1342 |
| CPU-3-F | 15% | $n_e$ | 1.6293 |
| CPU-5-F | 15% | $n_o$ | 1.4951 |
| PCH-3 | 16% | | |
| PCH-5 | 16% | | |
| CCGU-3-F | 7% | | |
| CGPC-3-3 | 4% | | |
| CGPC-5-3 | 4% | | |
| CGPC-5-5 | 4% | | |
| CCZPC-3-3 | 3% | | |
| CCZPC-3-4 | 3% | | |
| CCZPC-3-5 | 3% | | |

The following dyes in the proportions indicated are dissolved in base mixture G-1:

Mixture Example M-1

| | |
|---|---|
| G-1 | 99.75% |
| TDC-1 | 0.25% |

Correspondingly, mixtures M-2 to M-7 are obtained from in each case 99.75% of base mixture G-1 and in each case 0.25% of the dyes TDC-3, TDC-7, TDC-21, TDC-28, TDC-36 and TDC-39.

A Comparative Mixture V-1 is Prepared as Follows:

| | |
|---|---|
| G-1 | 99.75% |
| D-1 | 0.25% |

Mixture Example M-8 is Prepared as Follows:

| | |
|---|---|
| G-1 | 99.75% |
| D-2 | 0.25% |
| TDC-41 | 1.00% |

Structures of the further dyes used:

TABLE 2

D-1

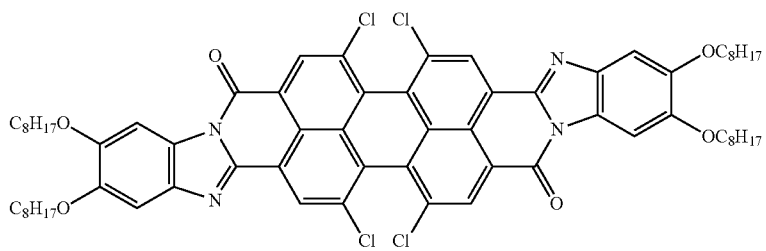

TABLE 2-continued

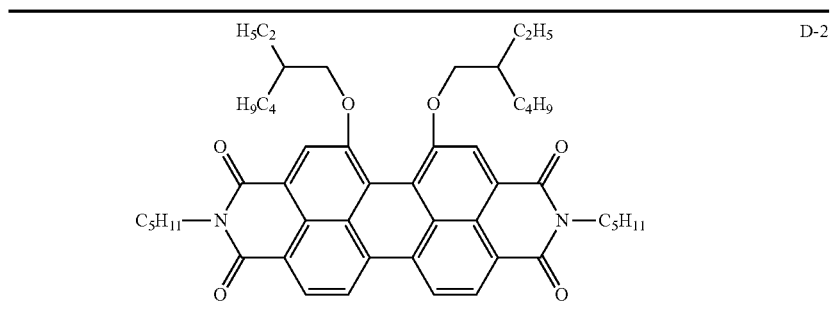

D-2

Table 3 shows absorption maximum, degree of anisotropy and solubility of the dyes TDC-1, TDC-3, TDC-7, TDC-21, TDC-28, TDC-36 and TDC-39. The absorption maximum of comparative substance D-1 is comparable to that of TDC-1.

TABLE 3

| Dye | Mixture | Absorption maximum/ nm | Degree of anisotropy R | Solubility in % by weight in M-1 |
| --- | --- | --- | --- | --- |
| TDC-1 | M-1 | 679 | 0.69 | >1.00 |
| TDC-3 | M-2 | 676 | 0.71 | — |
| TDC-7 | M-3 | 670 | 0.71 | — |
| TDC-21 | M-4 | 705 | 0.70 | — |
| TDC-28 | M-5 | 694 | 0.65 | — |
| TDC-36 | M-6 | 742 | 0.67 | — |
| TDC-39 | M-7 | 777, 420 | 0.67 0.63 | — |
| D-1 | V-1 | 675 | — | — |

FIG. 1 shows the UV-VIS spectrum of dyes TDC-1 and D-1, measured in base mixture G-1.

The measurements show that the thiadiazoloquinoxaline compounds according to the invention have excellent properties with respect to degree of anisotropy and solubility in liquid-crystalline media. Comparison of the UV-VIS spectrum of TDC-1 (mixture M-1) with that of the rylene dye D-1 (mixture V-1), which has a comparable absorption range, additionally shows that no bands are present in the range 500-550 nm in the case of TDC-1. This enables applications to be achieved which remain significantly better within their colour type, i.e. bright and dark are closer in their colour types on use of TDC-1 than on use of D-1. Furthermore, the narrower band also enables significantly better colour saturations to be achieved.

Use of Liquid-Crystalline Media Comprising the Dyes in Devices for Regulating the Passage of Energy In order to produce the device, liquid-crystal mixture M-8 is introduced into the interspace of the following layer arrangement:
  substrate layer
  ITO layer
  polyimide alignment layer
  interspace held open using spacers
  polyimide alignment layer
  ITO layer
  substrate layer.

The liquid-crystal layer in this arrangement is aligned in a planar manner with antiparallel pretilt angle. This alignment is achieved by two polyimide layers rubbed antiparallel to one another. The thickness of the liquid-crystalline layer is defined by spacers and is usually 25 μm.

Values for the degree of light transmission $\tau_v$ for both the dark and bright switching states of the device are determined and are shown below. The bright switching state is achieved by application of a voltage, while the dark switching state is present without voltage. Furthermore, the colour location of the device (in CIE coordinates) in the dark and bright states is determined.

The measurement is carried out with the device comprising the liquid-crystalline medium with dyes in the measurement beam and a device of the same construction correspondingly without the dyes in the reference beam. Reflection and absorption losses of the cell are thereby eliminated.

The value $\tau_v$ and the CIE coordinates (x,y) are defined as follows: $\tau_v$=degree of light transmission, determined in accordance with DIN EN410

The colour location (for white, grey, black) of the basic standard illuminant D65 here is at x=0.3127 and y=0.3290 (Manfred Richter, EinfUhrung in die Farbmetrik [Introduction to Colorimetry], second edition 1991, ISBN 3-11-008209-8). The colour locations (x,y) indicated all relate to the standard illuminant D65 and the 2° standard observer in accordance with CIE 1931.

Measurement values obtained for the device (double cell):

dark state: x=0.148; y=0.160; $\tau_v$=12.6% bright state: x=0.256; y=0.305; $\tau_v$=56.5%

Good stability of the liquid-crystalline medium and good solubility of the dyes in the liquid-crystalline medium are evident in the example.

Furthermore, the example shows that the device can be switched from a dark state having significantly lower light transmission to a bright state having significantly increased light transmission by application of a voltage.

It is furthermore observed that, by means of dye TDC-1 in combination with dye D-2, a mixture having particularly good colour saturation in the blue is obtained.

BRIEF DESCRIPTION OF DRAWING

FIG. 1 is a graph.

The invention claimed is:

1. A guest-host liquid crystalline medium comprising a dye component A) which comprises one or more compounds of the formula I and a liquid-crystalline component B) which comprises one or more mesogenic compounds

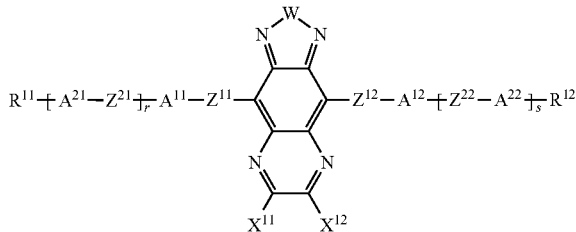

in which

W denotes S or Se, $X^{11}$, $X^{12}$, identically or differently, denote H, alkyl having 1-6 C atoms, in which one or more H atoms may be replaced by F and one or more CH$_2$ groups may be replaced by —O— or —S— in such a way that no O or S atoms are adjacent, perfluoroalkyl having 1-6 C atoms, halogen, CN, SF$_5$, an aryl or heteroaryl group, which may be substituted by one or more radicals L, and alternatively the groups $X^{11}$ and $X^{12}$ together also denote a straight-chain or branched alkylene group having 2 to 10 C atoms, in which one, several or all H atoms may be replaced by F, $R^{11}$, $R^{12}$, identically or differently, denote F, straight-chain or branched alkyl having 1 to 25 C atoms, in which, in addition, one or more non-adjacent CH$_2$ groups may each be replaced, independently of one another, by —C(R$^z$)=C(R$^z$)—, —C≡C—, —N(R$^z$)—, —O—, —S—, —C(O)—, —C(O)—O—, —O—C(O)— or —O—C(O)—O— in such a way that O and/or S atoms are not linked directly to one another, and in which, in addition, one or more H atoms may be replaced by F, Cl, Br, I or CN, R$^z$ on each occurrence, identically or differently, denotes H, halogen, straight-chain, branched or cyclic alkyl having 1 to 25 C atoms, in which, in addition, one or more non-adjacent CH$_2$ groups may be replaced by —O—, —S—, —C(O)—, —C(O)—O—, —O—C(O)— or —O—C(O)—O— in such a way that O and/or S atoms are not linked directly to one another, and in which, in addition, one or more H atoms may be replaced by F or Cl, $A^{11}$, $A^{12}$ each, independently of one another, denote an aryl or heteroaryl group, which may be substituted by one or more radicals L, $A^{21}$, $A^{22}$ are each, independently of one another, defined like $A^{11}$ or denote a cyclic alkyl group having 3 to 10 C atoms, in which 1 to 4 CH$_2$ groups may be replaced by O in such a way that no two O atoms are adjacent, L on each occurrence, identically or differently, denotes OH, CH$_2$OH, F, Cl, I, —CN, —NO$_2$, SF$_5$, —NCO, —NCS, —OCN, —SCN, —C(=O)N(R$^z$)$_2$, —C(=O)R$^z$, —N(R$^z$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, $Z^{11}$, $Z^{12}$ on each occurrence, identically or differently, denote a single bond, —CR$^{x1}$=CR$^{x2}$—, —C≡C— or —C(O)—, $Z^{21}$, $Z^{22}$ are on each occurrence, identically or differently, defined like $Z^{11}$ or denote —O—, —S—, —CR$^{y1}$R$^{y2}$—, —CF$_2$O—, —OCF$_2$—, —C(O)—O—, —O—C(O)—, —O—C(O)—O—, —OCH$_2$—, —CH$_2$O—, —SCH$_2$—, —CH$_2$S—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—COO— or —OCO—CH=CH—, $R^{x1}$, $R^{x2}$, independently of one another, denote H, F, Cl, CN or alkyl having 1-12 C atoms, $R^{y1}$, $R^{y2}$ each, independently of one another, denote H or alkyl having 1-12 C atoms, r, s, independently of one another, denote 0, 1, 2 or 3, n1 denotes 1, 2, 3 or 4, with the proviso that the compound of the formula

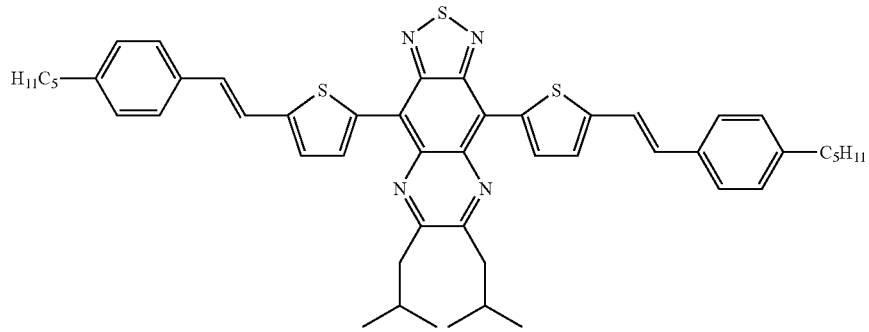

is excluded.

2. A liquid crystalline medium according to claim 1, wherein in formula I, if r and s are identical, at least one of the groups $A^{11}$ and $A^{12}$, or $R^{11}$ and $R^{12}$, or $A^{21}$ and $A^{22}$, or $Z^{11}$ and $Z^{12}$, or $Z^{21}$ and $Z^{22}$, or $X^{11}$ and $X^{12}$ is different from one another, where the parameters have the meanings indicated in claim 1.

3. A liquid crystalline medium according to claim 1, wherein in formula I, r denotes 0, 1 or 2 and s denotes r+1.

4. A liquid crystalline medium according to claim 1, wherein in formula I, W denotes —S—.

5. A liquid crystalline medium according to claim 1, wherein in formula I, $X^{11}$ and $X^{12}$ each, independently of one another, denote H, CH$_3$, C$_2$H$_5$, F, Cl, CF$_3$, OCF$_3$, CN or together denote 1,4-butylene, 1,3-hexafluoropropylidene or 1,4-octafluorobutylidene.

6. A liquid crystalline medium according to claim 1, wherein in formula I, $A^{11}$, $A^{12}$, $A^{21}$, $A^{22}$ are selected on each occurrence, identically or differently, from groups, optionally substituted by radicals L, derived from the parent substances benzene, fluorene, naphthalene, pyridine, pyrimidine, thiophene, thiazole, dihydrothienodioxin, benzothiophene, dibenzothiophene, benzodithiophene, cyclopentadithiophene, thienothiophene, indenothiophene, furan, benzofuran, dibenzofuran and quinoline, where L is selected from the groups F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ and phenyl.

7. A liquid crystalline medium according to claim 1, wherein the compounds of formula I, are selected from the following sub-formulae:

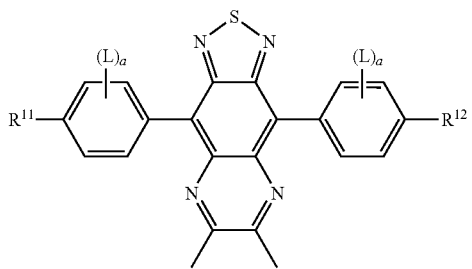

I-1-3-1

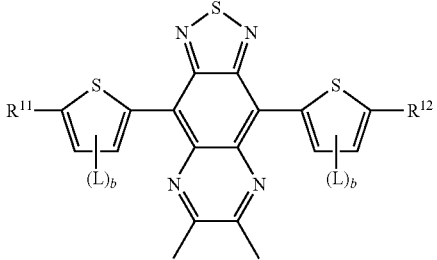

I-1-3-2

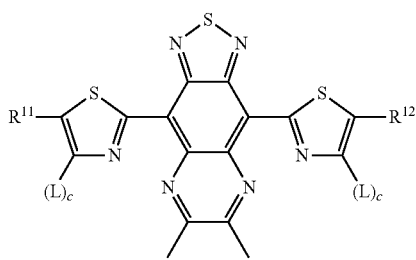

I-1-3-3

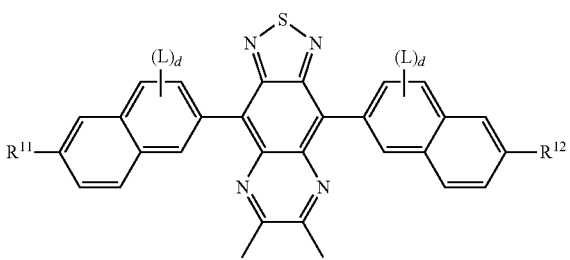

I-1-3-4

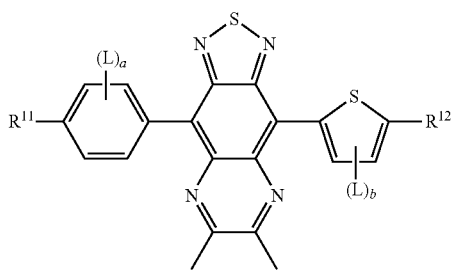

I-1-3-5

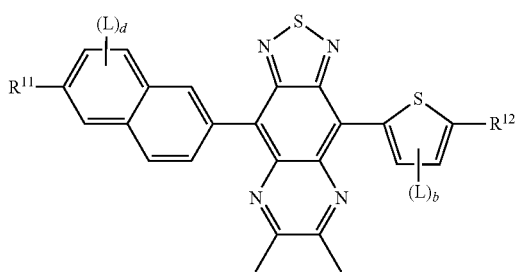

I-1-3-6

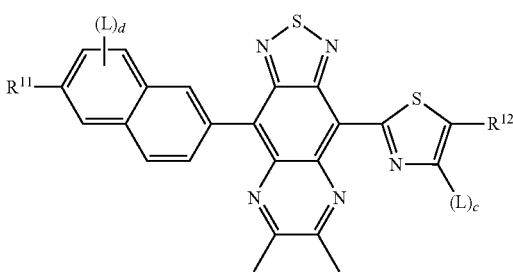

I-1-3-7

I-1-3-8

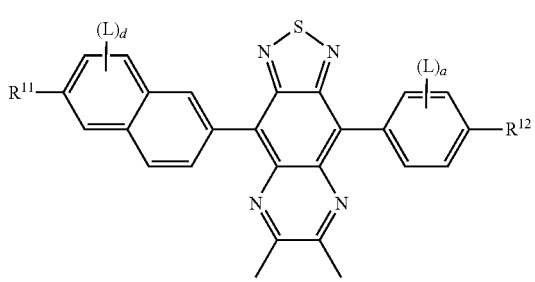

I-1-3-9

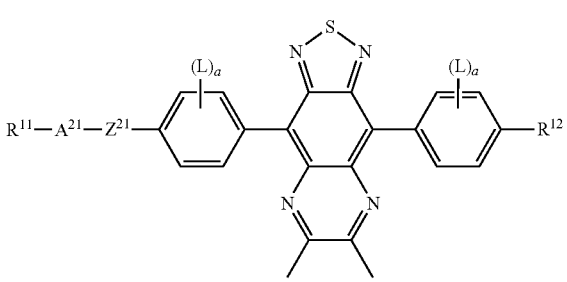

I-2-4-1

-continued
I-2-4-2
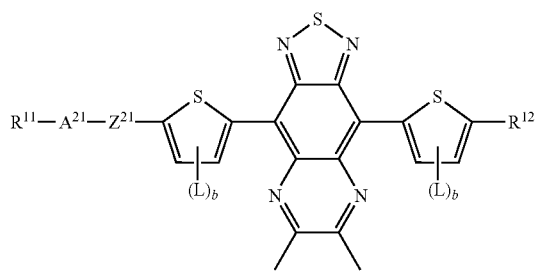
I-2-4-3
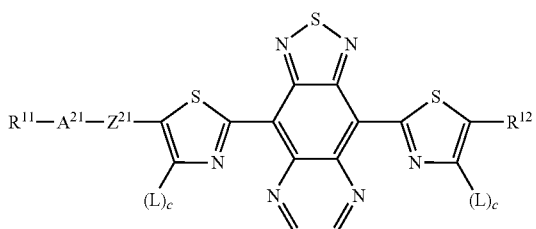
I-2-4-4
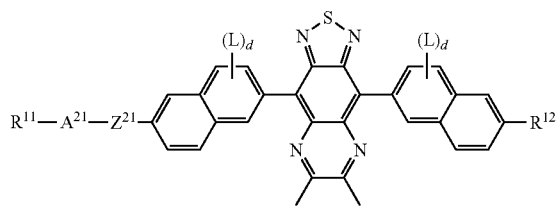
I-2-4-5
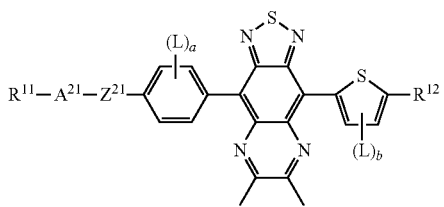
I-2-4-6
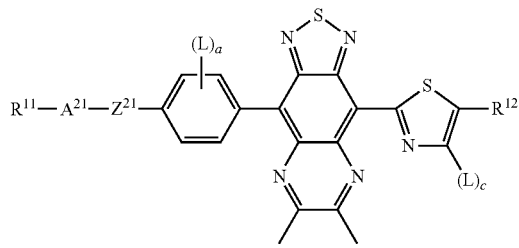
I-2-4-7
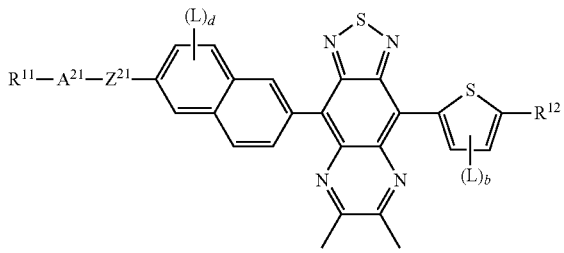
I-2-4-8
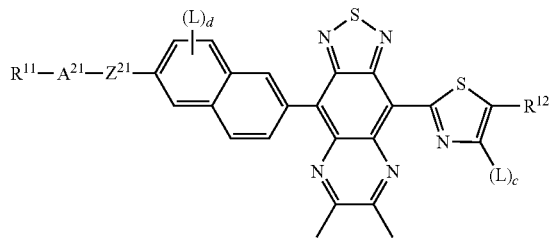
I-2-4-9
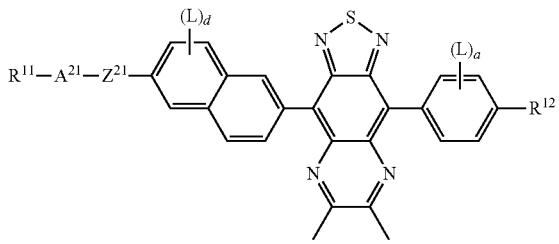
I-2-4-10
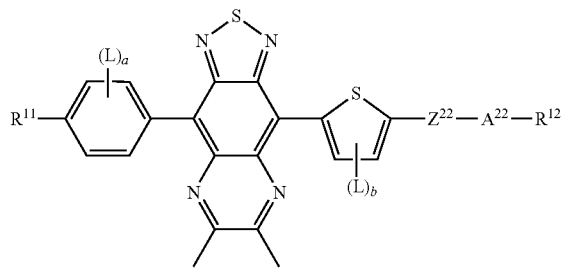
I-2-4-11
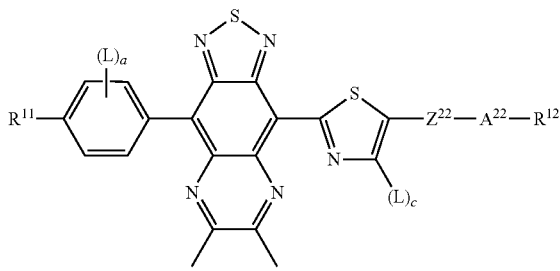
I-2-4-12
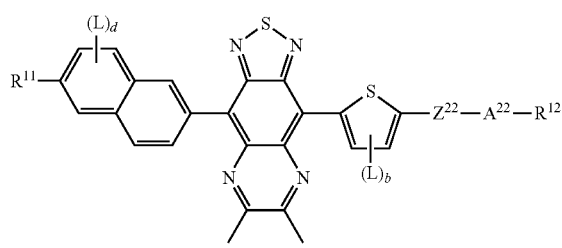
I-2-4-13
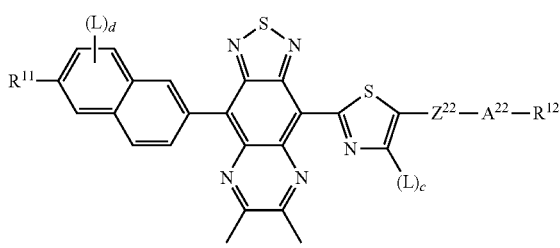

-continued
I-2-4-14
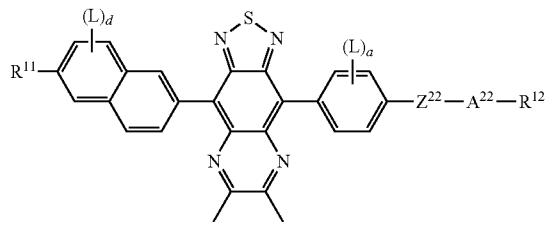
I-3-3-1
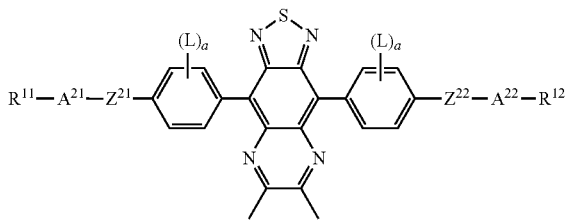
I-3-3-2
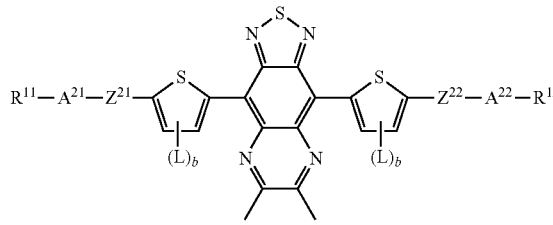
I-3-3-3
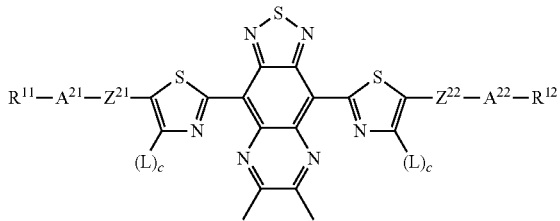
I-3-3-4
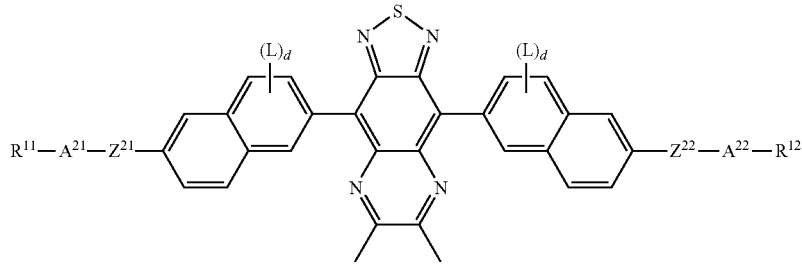
I-3-3-5
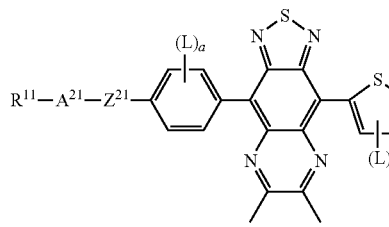
I-3-3-6
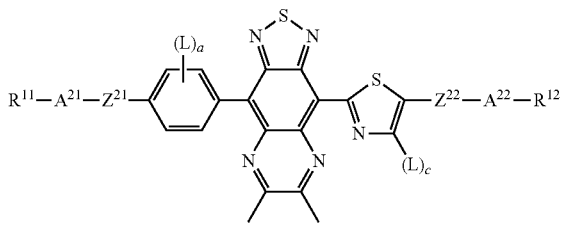
I-3-3-7
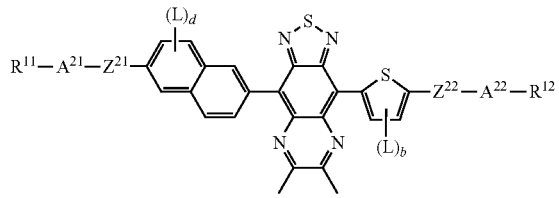
I-3-3-8
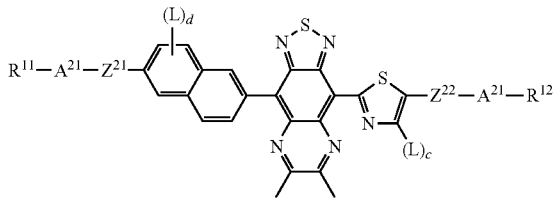
I-3-3-9
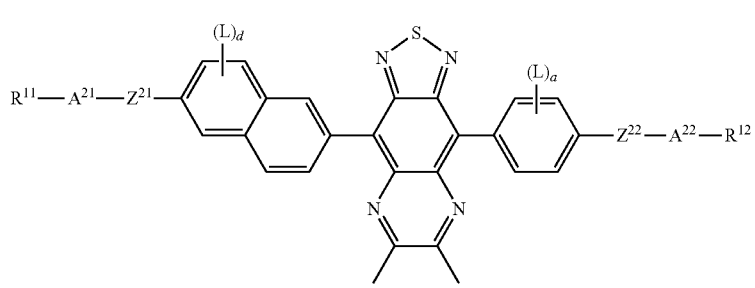

in which

R$^{11}$, R$^{12}$, independently of one another, denote F, a straight-chain alkyl or alkoxy group having 1 to 15 C atoms or a branched alkyl or alkoxy group having 3 to 20 C atoms, in which, in addition, one or more H atoms may be replaced by F, A$^{11}$, A$^{12}$, A$^{21}$, A$^{22}$ each, independently of one another, denote 1,4-phenylene, 2,6-naphthylene, thiophene-2,5-diyl or thiazole-2,5-diyl, Z$^{21}$, Z$^{22}$, independently of one another, denote —CH$_2$CH$_2$—, —CF$_2$CF$_2$—, —CH=CH—, —CF=CF—, —OCH$_2$—, —CH$_2$O—, —OCF$_2$—, —CF$_2$O— or a single bond, L on each occurrence, identically or differently, denotes OH, CH$_2$OH, F, Cl, I, —CN, —NO$_2$, SF$_5$, —NCO, —NCS, —OCN, —SCN, —C(=O)N(R$^z$)$_2$, —C(=O)R$^z$, —N(R$^z$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, a, independently of one another, denotes 0, 1, 2, 3 or 4, b, independently of one another, denotes 0, 1 or 2, c, independently of one another, denotes 0 or 1, and d, independently of one another, denotes 1, 2, 3, 4, 5 or 6.

8. A liquid crystalline medium according to claim 1, wherein in formula I, Z$^{21}$ and Z$^{22}$ denote a single bond.

9. A method which comprises including a liquid crystalline medium according to claim 1 in electro-optical displays, devices for regulating the passage of energy from an outside space into an inside space, electrical semiconductors, organic field-effect transistors (OFETs), printed circuits, radio frequency identification elements (RFIDs), organic light-emitting diodes (OLEDs), lighting elements, photovoltaic devices, optical sensors, effect pigments, decorative elements or as dye for colouring polymers.

10. A process wherein compounds of the formula III are converted into compounds of the formula I according to claim 1,

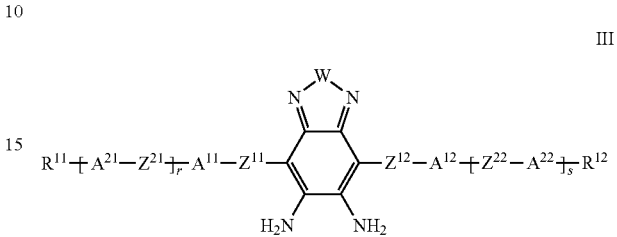

in which W, R$^{11}$, R$^{12}$, A$^{11}$, A$^{12}$, A$^{21}$, A$^{22}$, Z$^{11}$, Z$^{12}$, Z$^{21}$, Z$^{22}$, r and s have the meanings indicated for formula I in claim 1.

11. A process for the preparation of the LC media according to claim 1, wherein two or more mesogenic compounds are mixed with one another, and one or more dyes of the formula I are added in a further process step.

12. A device for regulating the passage of energy from an outside space into an inside space, where the device contains a switching layer comprising an LC medium according to claim 1.

13. A window containing a device according to claim 12.

* * * * *